United States Patent
Zhang et al.

(10) Patent No.: US 9,800,857 B2
(45) Date of Patent: Oct. 24, 2017

(54) INTER-VIEW RESIDUAL PREDICTION IN MULTI-VIEW OR 3-DIMENSIONAL VIDEO CODING

(71) Applicant: QUALCOMM Incorporated, San Diego, CA (US)

(72) Inventors: Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 855 days.

(21) Appl. No.: 14/149,260

(22) Filed: Jan. 7, 2014

(65) Prior Publication Data

US 2014/0253681 A1 Sep. 11, 2014

Related U.S. Application Data

(60) Provisional application No. 61/775,352, filed on Mar. 8, 2013, provisional application No. 61/803,368, filed
(Continued)

(51) Int. Cl.
*H04N 13/00* (2006.01)
*H04N 19/597* (2014.01)
(Continued)

(52) U.S. Cl.
CPC ....... *H04N 13/0048* (2013.01); *H04N 19/105* (2014.11); *H04N 19/172* (2014.11);
(Continued)

(58) Field of Classification Search
CPC .......................... H04N 19/00; H04N 13/0048
(Continued)

(56) References Cited

U.S. PATENT DOCUMENTS

2004/0146109 A1  7/2004  Kondo et al.
2004/0246374 A1*  12/2004  Mishima ............. H04N 7/0132
348/441
(Continued)

FOREIGN PATENT DOCUMENTS

GB  2488816 A  9/2012
JP  GB 2488816 A *  9/2012  ............. H04N 19/52
(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.
(Continued)

*Primary Examiner* — Dave Czekaj
*Assistant Examiner* — Shanika Brumfield
(74) *Attorney, Agent, or Firm* — Shumaker & Sieffert, P.A.

(57) ABSTRACT

A video coder scales a motion vector of a current prediction unit (PU) of a current picture in order to compensate for a difference in temporal distance. In addition, the video coder determines a predictive block for the current PU, determines a disparity reference block based on samples of the disparity reference picture at a location indicated by a disparity vector of the current PU, and determines, based on samples of the fixed reference picture at a location indicated by the scaled motion vector, a temporal-disparity reference block for the current PU. The video coder then determines a residual predictor for the current PU. Each sample of the residual predictor for the current PU indicates a difference between a sample of the temporal-disparity reference block for the current PU and a corresponding sample of the disparity reference block.

44 Claims, 13 Drawing Sheets

Related U.S. Application Data on Mar. 19, 2013, provisional application No. 61/832,623, filed on Jun. 7, 2013.

(51) Int. Cl.
*H04N 19/105* (2014.01)
*H04N 19/172* (2014.01)
*H04N 19/513* (2014.01)
*H04N 19/80* (2014.01)
*H04N 19/573* (2014.01)
*H04N 19/577* (2014.01)

(52) U.S. Cl.
CPC ......... *H04N 19/513* (2014.11); *H04N 19/573* (2014.11); *H04N 19/577* (2014.11); *H04N 19/597* (2014.11); *H04N 19/80* (2014.11)

(58) Field of Classification Search
USPC ........................................ 375/240.02–240.2
See application file for complete search history.

(56) References Cited

U.S. PATENT DOCUMENTS

| | | | |
|---|---|---|---|
| 2010/0118939 A1* | 5/2010 | Shimizu | H04N 19/00569 375/240.12 |
| 2012/0224634 A1 | 9/2012 | Yamori | |
| 2012/0269270 A1 | 10/2012 | Chen et al. | |
| 2012/0269271 A1 | 10/2012 | Chen et al. | |
| 2013/0188715 A1 | 7/2013 | Seregin et al. | |
| 2013/0272409 A1 | 10/2013 | Seregin et al. | |
| 2014/0015925 A1 | 1/2014 | Li et al. | |
| 2014/0133560 A1* | 5/2014 | Kim | H04N 19/577 375/240.12 |

FOREIGN PATENT DOCUMENTS

| | | |
|---|---|---|
| WO | 2006126694 A2 | 11/2006 |
| WO | 2012171442 A1 | 12/2012 |
| WO | 2013113134 A1 | 8/2013 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (for FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Han, et al., "Improved Video Compression Efficiency Through Flexible Unit Representation and Corresponding Extension of Coding Tools", IEEE Transaction on Circuits and Systems for Video Technology, vol. 20, No. 12, Dec. 2010, pp. 1709-1720.
Hong, et al. "Scalability Support in HEVC", Joint Collaborative Team on Video Coding (JCT-VC) of ITU-T SG16 WP3 and ISO/IEC JTC1/SC29/WG11, JCTVC-F290, Torino, Italy, Jul. 2011, 15 pp.
Paul, et al., "Video coding using the most common frame in scene", Acoustics Speech and Signal Processing (ICASSP), 2010 IEEE International Conference on, IEEE, Piscataway, NJ, USA, Mar. 14, 2010, XP031697008, pp. 734-737.
Tech, et al., "3D-HEVC Test Model 2," Joint Collaborative Team on 3D Video Coding Extension Development of ITU-T SG 16 WP 3 and ISO/IEC JTC 1/SC 29/WG 11, Document: JCT3V- B1005_d0, 2nd Meeting: Shanghai, CN, XP030130414, Oct. 13-19, 2012, 118 pp.
Zhang, et al., "3D-CE4—Advanced residual prediction for multiview coding", JCT-3V Meeting, MPEG Meeting, Jan. 17-23, 2013, Geneva, (The Joint Collaborative Team on 3D Video Coding Extension Development of ISO/IEC JTC1/SC29/WG11 and ITU-T SG.16 ), URL: http://phenix.int-evry.fr/jct2/,, No. JCT3V-C0049, XP030130465, 6 pp.
Zou, et al., "An Adaptive Motion Data Storage Reduction Method for Temporal Predictor", Jan. 2012, Advances in Image and Video Technology, Proceedings of the 5th Pacific Rim Symposium, PSIVT 2011, Gwangju, South Korea, XP019170065, pp. 48-59.
Zhang, et al., "3D-CE5.h related: Advanced residual prediction for multiview coding," Qualcomm Incorporated, Joint Collaborative Team on 3D Video Coding Extension Development of ITU-T SG 16 WP 3 and ISO/IEC JTC 1/SC 29/WG 11, JCT3V-B0051, 2nd Meeting: Shanghai, CN, Oct. 13-19, 2012, 4 pp.
Zhang, et al., "3D-CE4: Advanced residual prediction for multiview coding," Joint Collaborative Team on 3D Video Coding Extension Development of ITU-T SG 16 WP 3 and ISO/IEC JTC 1/SC 29/WG 11, JCT3V-00049, 3rd Meeting: Geneva, CH, Jan. 17-23, 2013, 5 pp.
An, et al., "3D-CE4.h results on removal of parsing dependency for inter-view residual prediction", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-C0138, XP030130554, 4 pp.
International Search Report and Written Opinion from International Application No. PCT/US2014/017132, dated Jun. 2, 2014, 15 pp.
Response to Written Opinion dated Jun. 2, 2014, from International Application No. PCT/US2014/017132, filed on Sep. 9, 2014, 6 pp.
Second Written Opinion from International Application No. PCT/US2014/017132, dated Mar. 16, 2015, 23 pp.
Response to Second Written Opinion dated Mar. 16, 2015, from International Application No. PCT/US2014/017132, filed on May 13, 2015, 40 pp.
International Preliminary Report on Patentability from International Application No. PCT/US2014/017132, dated Jun. 12, 2015, 13 pp.
Zhang, et al., "Proposed text for JCT3V-C0049 based on 3D-HEVC Test Model 2," (The Joint Collaborative Team on 3D Video Coding

(56) References Cited

OTHER PUBLICATIONS

Extension Development of ISO/IEC JTC1/SC29/WG11 and ITU-T SG.16); Jan. 17-23, 2013, Document: JCT3V-00049_proposed text, 6 pp.

* cited by examiner

INTER-VIEW RESIDUAL PREDICTION IN MULTI-VIEW OR 3-DIMENSIONAL VIDEO CODING

This application claims the benefit of U.S. Provisional Patent Application No. 61/775,352, filed Mar. 8, 2013, U.S. Provisional Patent Application No. 61/803,368, filed Mar. 19, 2013, and U.S. Provisional Patent Application No. 61/832,623, filed Jun. 7, 2013, the entire content of each of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into blocks. Blocks in an intra-coded (I) slice of a picture are encoded using spatial prediction with respect to reference samples in neighboring blocks in the same picture. Blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure relates to advanced residual prediction for multi-view codecs and 3-dimensional video (3DV) codecs based on 2-dimensional codecs, such as High Efficiency Video Coding (HEVC). In accordance with the techniques of this disclosure, a video coder scales a motion vector of a current prediction unit (PU) of a current picture in order to compensate for a temporal distance between a fixed reference picture and a temporal reference picture. In addition, the video coder determines a predictive block for the current PU, determines a disparity reference block based on samples of the disparity reference picture at a location indicated by a disparity vector of the current PU, and determines, based on samples of the fixed reference picture at a location indicated by the scaled motion vector and the disparity vector of the current PU, a temporal-disparity reference block for the current PU. The video coder then determines a residual predictor for the current PU. Each sample of the residual predictor for the current PU indicates a difference between a sample of the temporal-disparity reference block for the current PU and a corresponding sample of the disparity reference block.

In one example, this disclosure describes a method of decoding video data, the method comprising: scaling a motion vector of a current prediction unit (PU) of a current picture in order to compensate for a difference between a Picture Order Count (POC) distance between the current picture and a temporal reference picture and a POC distance between the current picture and a fixed picture, wherein the current picture is in a current view and is in a current access unit, a disparity reference picture is in a reference view and is in the current access unit, the temporal reference picture is in the current view but is not in the current access unit, and a reference index of the current PU indicates a position of the temporal reference picture within a reference picture list of the current picture; determining a predictive block for the current PU; determining a disparity reference block based on samples of the disparity reference picture that are associated with a location indicated by a disparity vector of the current PU; determining, based on samples of the fixed reference picture that are associated with a location indicated by the scaled motion vector and the disparity vector of the current PU, a temporal-disparity reference block for the current PU; determining a residual predictor for the current PU, wherein each sample of the residual predictor for the current PU indicates a difference between a sample of the temporal-disparity reference block for the current PU and a corresponding sample of the disparity reference block; and reconstructing a coding block based on a signaled residual block, the residual predictor for the current PU, and the predictive block for the current PU.

In another example, this disclosure describes a method of encoding video data, the method comprising: scaling a motion vector of a current prediction unit (PU) of a current coding unit (CU) of a current picture in order to compensate for a difference between a Picture Order Count (POC) distance between the current picture and a temporal reference picture and a POC distance between the current picture and a fixed picture, wherein the current picture is in a current view and is in a current access unit, a disparity reference picture is in a reference view and is in the current access unit, the temporal reference picture is in the current view but is not in the current access unit, and a reference index of the current PU indicates a position of the temporal reference picture within a reference picture list of the current picture; determining a predictive block for the current PU; determining a disparity reference block based on samples of the disparity reference picture that are associated with a location indicated by a disparity vector of the current PU; determining, based on samples of the fixed reference picture that are associated with a location indicated by the scaled motion vector and the disparity vector of the current PU, a temporal-disparity reference block for the current PU; determining a residual predictor for the current PU, wherein each sample of the residual predictor for the current PU indicates a difference between a sample of the temporal-disparity reference block for the current PU and a corresponding sample of the disparity reference block; determining a final residual block for the current CU, wherein the final residual block comprises samples that indicate differences between samples in a coding block for the current CU, samples in the prediction block for the current PU, and samples in the residual predictor for the current PU; and including, in a bitstream, data that represent the final residual block for the current CU.

In another example, this disclosure describes a video coding device comprising a memory that stores reference pictures; and one or more processors configured to: scale a motion vector of a current prediction unit (PU) of a current coding unit (CU) of a current picture in order to compensate for a difference between a Picture Order Count (POC) distance between the current picture and a temporal reference picture and a POC distance between the current picture and a fixed picture, wherein the current picture is in a current view and is in a current access unit, a disparity reference picture is in a reference view and is in the current access unit, the temporal reference picture is in the current view but is not in the current access unit, and a reference index of the current PU indicates a position of the temporal reference picture within a reference picture list of the current picture; determine a predictive block for the current PU; determine a disparity reference block based on samples of the disparity reference picture that are associated with a location indicated by a disparity vector of the current PU; determine, based on samples of the fixed reference picture that are associated with a location indicated by the scaled motion vector and the disparity vector of the current PU, a temporal-disparity reference block for the current PU; and determine a residual predictor for the current PU, wherein each sample of the residual predictor for the current PU indicates a difference between a sample of the temporal-disparity reference block for the current PU and a corresponding sample of the disparity reference block.

In another example, this disclosure describes a video coding device comprising: means for scaling a motion vector of a current prediction unit (PU) of a current coding unit (CU) of a current picture in order to compensate for a difference between a Picture Order Count (POC) distance between the current picture and a temporal reference picture and a POC distance between the current picture and a fixed picture, wherein the current picture is in a current view and is in a current access unit, a disparity reference picture is in a reference view and is in the current access unit, the temporal reference picture is in the current view but is not in the current access unit, and a reference index of the current PU indicates a position of the temporal reference picture within a reference picture list of the current picture; means for determining a predictive block for the current PU; means for determining a disparity reference block based on samples of the disparity reference picture that are associated with a location indicated by a disparity vector of the current PU; means for determining, based on samples of the fixed reference picture that are associated with a location indicated by the scaled motion vector and the disparity vector of the current PU, a temporal-disparity reference block for the current PU; and means for determining a residual predictor for the current PU, wherein each sample of the residual predictor for the current PU indicates a difference between a sample of the temporal-disparity reference block for the current PU and a corresponding sample of the disparity reference block.

In another example, this disclosure describes a non-transitory computer-readable storage medium having instructions stored thereon that, when executed, configure a video coding device to: scale a motion vector of a current prediction unit (PU) of a current coding unit (CU) of a current picture in order to compensate for a difference between a Picture Order Count (POC) distance between the current picture and a temporal reference picture and a POC distance between the current picture and a fixed picture, wherein the current picture is in a current view and is in a current access unit, a disparity reference picture is in a reference view and is in the current access unit, the temporal reference picture is in the current view but is not in the current access unit, and a reference index of the current PU indicates a position of the temporal reference picture within a reference picture list of the current picture; determine a predictive block for the current PU; determine a disparity reference block based on samples of the disparity reference picture that are associated with a location indicated by a disparity vector of the current PU; determine, based on samples of the fixed reference picture that are associated with a location indicated by the scaled motion vector and the disparity vector of the current PU, a temporal-disparity reference block for the current PU; and determine a residual predictor for the current PU, wherein each sample of the residual predictor for the current PU indicates a difference between a sample of the temporal-disparity reference block for the current PU and a corresponding sample of the disparity reference block.

The details of one or more examples of the disclosure are set forth in the accompanying drawings and the description below. Other features, objects, and advantages will be apparent from the description, drawings, and claims.

DETAILED DESCRIPTION

Figure 1:
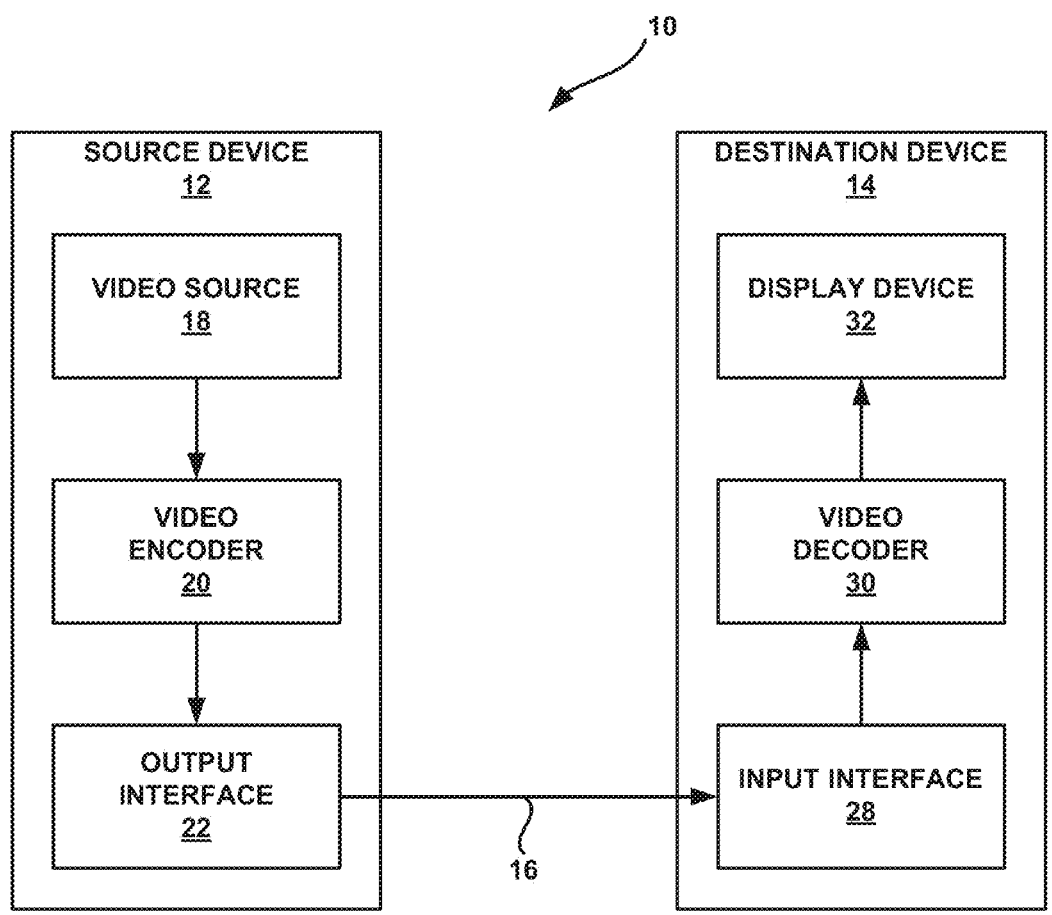
FIG. 1 is a block diagram illustrating an example video coding system that may utilize the techniques described in this disclosure.

High-Efficiency Video Coding (HEVC) is a newly-developed video coding standard. 3D-HEVC is an extension of HEVC for 3-dimensional (3D) video data. 3D-HEVC provides for multiple views of the same scene from different viewpoints. The standardization efforts for 3D-HEVC include the standardization of a multiview video codec based on HEVC. In 3D-HEVC, inter-view prediction based on the reconstructed view components from different views is enabled. Advanced residual prediction (ARP) may further improve efficiency in 3D-HEVC.

In ARP, a video coder determines a predictive block for a current prediction unit (PU) of a current coding unit (CU). The predictive block for the current PU may be based on samples of a temporal reference picture that are associated with a location indicated by a motion vector of the current PU. In some examples, a block may be associated with a location if a top-left corner of the block is at the location. Furthermore, in some instances, when samples of a block are based on samples of a particular picture, the samples may be based on actual or interpolated samples of the particular picture. The temporal reference picture is in the same view as the current picture but is in a different time instance than the current picture. Furthermore, in ARP, the video coder determines a disparity reference block based on samples of a disparity reference picture that are at a location indicated by a disparity vector of the current PU. The disparity reference picture is in a different view (i.e., a reference view) than the current picture, but is in the same time instance as the current picture. The video coder also determines, based on samples of a temporal-disparity reference picture that are associated with a location indicated by the motion vector of the current PU and the disparity vector, a temporal-disparity reference block for the current PU. The temporal-disparity reference picture is in the same view as the disparity reference picture and is in the same access unit as the temporal reference picture. The video coder then determines a residual predictor for the current PU. Each sample of the residual predictor for the current PU indicates a difference between a sample of the temporal-disparity reference block for the current PU and a corresponding sample of the disparity reference block.

Furthermore, in instances where the video coder is a video encoder, the video encoder may determine a final residual block for the current CU. The final residual block comprises samples that indicate differences between samples in a coding block for the current CU, samples in the prediction block for the current PU, and samples in the residual predictor for the current PU. The video encoder may include, in a bitstream, data that represent the final residual block for the current CU. In instances where the video coder is a video decoder, the video decoder may reconstruct a coding block for the current CU based on the final residual block, the residual predictor for the current PU, and the predictive block for the current PU.

Although ARP has improved the coding efficiency of inter-view residual prediction significantly, ARP may have several problems. For example, different inter-coded PUs within one picture may have different temporal reference pictures. Therefore, a video coder may need to access different pictures from the reference view to determine temporal-disparity reference blocks for the PUs. Because a video coder only stores a limited number of reference pictures in a cache, the cache miss rate might be higher when greater numbers of reference pictures are used. In other words, since greater numbers of reference pictures are used when ARP is enabled, the use of ARP may increase the cache miss rate. When there is a high cache miss rate, the coding process slows and/or memory bandwidth requirements increase.

In accordance with one or more techniques of this disclosure, when a video coder performs motion compensation to generate residual predictors for PUs of a current picture/slice, the video coder may scale the motion vectors of each of the PUs towards the same reference picture (i.e., a "fixed reference picture"). The fixed reference picture may be in the same view (i.e., the "reference view") as the disparity reference blocks for the PUs of the current picture. Because the video coder uses the same fixed reference picture for each of the PUs of the current picture, the cache miss rate may be lower.

For example, the video coder may scale a motion vector of a current PU of a current picture in order to compensate for a difference between a Picture Order Count (POC) distance between the current picture and a temporal reference picture and a POC distance between the current picture and a fixed picture. In this example, the current picture is in a current view and is in a current access unit, the temporal reference picture is in the current view but is not in the current access unit, a reference index of the current PU indicates a position of the temporal reference picture within a reference picture list, and the disparity reference picture is in a reference view and is in the current access unit. In addition, the video coder may determine a predictive block for the current PU, determine a disparity reference block based on samples of the disparity reference picture at a location indicated by a disparity vector of the current PU, and determine, based on samples of the fixed reference picture at a location indicated by the scaled motion vector and the disparity vector of the current PU, a temporal-disparity reference block for the current PU. The video coder may then determine a residual predictor for the current PU. Each sample of the residual predictor for the current PU may indicate a difference between a sample of the temporal-disparity reference block for the current PU and a corresponding sample of the disparity reference block.

Furthermore, in accordance with one or more example techniques of this disclosure, the video coder may use a bi-linear filter even when generating a motion-compensated block of the current PU (i.e., the predictive block mentioned above) to reduce the memory access and computational complexity. In contrast, HEVC may use an 8/4-tap luma/chroma interpolation filter for a fractional sample interpolation process when determining motion compensated blocks. In other examples, the bi-linear filter is applied to only the luma or only the chroma component when generating a motion compensated block of current PU.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In some instances, any bitstream conforming to the MVC-based 3DV extension of H.264/AVC always contains a sub-bitstream that is compliant to the MVC extension of H.264/AVC. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, and ITU-T H.264, ISO/IEC Visual.

In other examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 9" is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11$^{th}$ Meeting, Shanghai, China, October 2012. Furthermore, there are ongoing efforts to produce scalable video coding, multi-view coding, and 3DV extensions for HEVC. The scalable video coding extension of HEVC may be referred to as SHEVC. Video encoder 20 and video decoder 30 may operate according to such extensions to the HEVC standard.

Currently, a Joint Collaboration Team on 3D Video Coding (JCT-3C) of VCEG and MPEG is developing a 3DV standard based on HEVC, for which part of the standardization efforts includes the standardization of the multi-view video codec based on HEVC (MV-HEVC) and another part for 3D video coding based on HEVC (3D-HEVC). For 3D-HEVC, new coding tools, including those in the coding unit/prediction unit level, for both texture and depth views may be included and supported. As of Sep. 17, 2013, software for 3D-HEVC (i.e., 3D-HTM version 6.0) can be downloaded from the following link: [3D-HTM]: https://hevc.hhi.fraunhofer.de/svn/svn_3DVCSoftware/tags/HTM-6.0/.

In general, the motion compensation loop of HEVC is the same as that in H.264/AVC. For example, the reconstruction of a current frame $\hat{I}$ in the motion compensation loop may equal de-quantized coefficients r plus temporal prediction P:

$$\hat{I} = r + P.$$

In the formula above, P indicates uni-predictive inter prediction for P frames or bi-predictive inter prediction for B frames.

However, the unit of motion compensation in HEVC is different from that in previous video coding standards. For example, the concept of a macroblock in previous video coding standards does not exist in HEVC. Rather, macroblocks are replaced by a highly flexible hierarchical structure based on a generic quadtree scheme. Within this scheme, three types of blocks, i.e., coding units (CUs), prediction units (PUs), and transform units (TUs), are defined. A CU is a basic unit of region splitting. The concept of a CU is analogous to the concept of macroblock, but a CU is not restricted to a maximum size and a CU allows recursive splitting into four equally-sized CUs to improve the content adaptivity. A PU is a basic unit of inter/intra prediction. In some examples, a PU may contain multiple arbitrarily-shaped partitions in a single PU to effectively code irregular image patterns. A TU is a basic unit of transform. TUs of a CU can be defined independently from PUs of the CU. However, a size of a TU is limited to the CU to which the TU belongs. This separation of the block structure into three different concepts may allow each to be optimized according to its role, which may result in improved coding efficiency.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more CUs. A slice may include an integer number of CTUs ordered consecutively in a raster scan order.

A coded slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units or blocks may include CTUs, CUs, PUs, transform units (TUs), macroblocks, macroblock partitions, and so on. In some contexts, discussion of PUs may be interchanged with discussion of macroblocks of macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU. Hence, in this disclosure, a CU may be said to be partitioned into one or more PUs. For ease of explanation, this disclosure may refer to the size of a prediction block of a PU as simply the size of the PU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on samples of the picture associated with the PU. In this disclosure, the phrase "based on" may indicate "based at least in part on."

If video encoder 20 uses inter prediction to generate the predictive blocks of a PU, video encoder 20 may generate the predictive blocks of the PU based on decoded samples of one or more pictures other than the picture associated with the PU. When inter prediction is used to generate the predictive blocks of a block (e.g., a PU), this disclosure may refer to the block as "inter-coded" or "inter predicted." Inter prediction may be uni-predictive (i.e., uni-prediction) or bi-predictive (i.e., bi-prediction). To perform uni-prediction or bi-prediction, video encoder 20 may generate a first reference picture list (RefPicList0) and a second reference picture list (RefPicList1) for a current picture. Each of the reference picture lists may include one or more reference pictures. After a reference picture list is constructed (namely RefPicList0 and RefPicList1 if available), a reference index to a reference picture list can be used to identify any reference picture included in the reference picture list.

When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive blocks for the PU. Moreover, when using uni-prediction, video encoder 20 may generate a single motion vector that indicates a spatial displacement between a prediction block of the PU and the reference location. The motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may generate, based at least in part on samples corresponding to the first and second reference locations, the predictive blocks for the PU. Moreover, when using bi-prediction to encode the PU, video encoder 20 may generate a first motion vector indicating a spatial displacement between a prediction block of the PU and the first reference location and a second motion vector indicating a spatial displacement between the prediction block of the PU and the second reference location.

If video encoder 20 uses inter prediction to generate the predictive blocks of a PU, video encoder 20 may generate the predictive blocks of the PU based on samples of one or more pictures other than the picture associated with the PU. For instance, video encoder 20 may perform uni-predictive inter prediction (i.e., uni-prediction) or bi-predictive inter prediction (i.e., bi-prediction) on a PU.

In instances where video encoder 20 performs uni-prediction on a PU, video encoder 20 may determine, based on a motion vector of the PU, a reference location in a reference picture. Video encoder 20 may then determine a predictive block for the PU. Each sample in the predictive block for the PU may be associated with the reference location. In some examples, a sample in a predictive block for a PU may be associated with a reference location when the sample is within a block of samples having the same size as the PU and whose top-left corner is the reference location. Each sample in the predictive block may be an actual or interpolated sample of the reference picture. In instances where luma samples of the predictive block are based on interpolated luma samples of the reference picture, video encoder 20 may generate the interpolated luma samples by applying an 8-tap interpolation filter to actual luma samples of the reference picture. In instances where chroma samples of the predictive block are based on interpolated chroma samples of the reference picture, video encoder 20 may generate the interpolated chroma samples by applying a 4-tap interpolation filter to actual chroma samples of the reference picture. In general, the number of taps of a filter indicates the number of coefficients required to represent the filter mathematically. A filter with a higher tap number is generally more complex than a filter having a lower tap number.

In instances where video encoder 20 performs bi-prediction on a PU, the PU has two motion vectors. Video encoder 20 may determine, based on the motion vectors of the PU, two reference locations in two reference pictures. Video encoder 20 may then determine, in the manner described above, reference blocks associated with the two reference locations. Video encoder 20 may then determine a prediction block for the PU. Each sample in the prediction block may be a weighted average of corresponding samples in the reference blocks. The weighting of the samples may be based on temporal distances of the reference pictures from the picture containing the PU.

Video encoder 20 may partition a CU into one or more PUs according to various partitioning modes. For instance, if intra prediction is used to generate predictive blocks for the PUs of a CU, the CU may be partitioned according to a PART_2N×2N mode or a PART_N×N mode. In the PART_2N×2N mode, the CU only has one PU. In the PART_N×N mode, the CU has four equally-sized PUs having rectangular prediction blocks. If inter prediction is used to generate predictive blocks for the PUs of a CU, the CU may be partitioned according to the PART_2N×2N mode, the PART_N×N mode, a PART_2N×N mode, a PART_N×2N mode, a PART_2N×nU mode, a PART_2N× uD mode, a PART_nL×2N mode, or a PART_nR×2N mode. In the PART_2N×N mode and the PART_N×2N mode, the CU is partitioned into two equally-sized PUs having rectangular prediction blocks. In each of the PART_2N×nU mode, the PART_2N×uD mode, the PART_nL×2N mode, and the PART_nR×2N mode, the CU is partitioned into two unequally-sized PUs having rectangular prediction blocks.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A TU of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), video encoder 20 may quantize the coefficient block. Quantization generally refers to a process in which transform coefficients are quantized to possibly reduce the amount of data used to represent the transform coefficients, providing further compression. Video encoder 20 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. In some examples, the QP value associated with the CU may be associated with the current picture or slice as a whole. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of video data (i.e., coded pictures and associated data). The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL units may encapsulate different RBSPs for video parameter sets (VPSs), sequence parameter sets (SPSs), picture parameter sets (PPSs), coded slices, SEI, and so on. NAL units that encapsulate RBSPs for video coding data (as opposed to RBSPs for parameter sets and SEI messages) may be referred to as video coding layer (VCL) NAL units.

In HEVC, SPSs may contain information that applies to all slices of a coded video sequence (CVS). In HEVC, a CVS may start from an instantaneous decoding refresh (IDR) picture, or a broken link access (BLA) picture, or a clean random access (CRA) picture that is the first picture in the bitstream, including all subsequent pictures that are not an IDR or BLA picture. That is, in HEVC, a CVS may comprise a sequence of access units that may consist, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A VPS is a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 may signal the motion information of a PU using merge mode or advanced motion vector prediction (AMVP) mode. In other words, in HEVC, there are two modes for the prediction of motion parameters, one being the merge/skip mode and the other being AMVP. Motion prediction may comprise the determination of motion information of a video unit (e.g., a PU) based on motion information of one or more other video units. The motion information (i.e., the motion parameters) of a PU may include motion vector(s) of the PU, reference index(s) of the PU, and one or more prediction direction indicators.

When video encoder 20 signals the motion information of a current PU using merge mode, video encoder 20 generates a merge candidate list. In other words, video encoder 20 may perform a motion vector predictor list construction process. The merge candidate list includes a set of merge candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index (i.e., a merging candidate index) that indicates a position within the candidate list of the selected merge candidate. Video decoder 30 may obtain, from the bitstream, the index into the candidate list (i.e., the merging candidate index). In addition, video decoder 30 may generate the same merge candidate list and may determine, based on the merging candidate index, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion information (e.g., the motion vector) for the current PU. In this way, at the decoder side, once the index is decoded, all motion parameters of the corresponding block where the index points may be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may determine, without use of residual data, a prediction block for the PU based on a reference block indicated by the motion information of a selected candidate in the merge candidate list. Because skip mode has the same motion vector derivation process as merge mode, techniques described in this document may apply to both merge and skip modes.

AMVP mode is similar to merge mode in that video encoder 20 may generate a candidate list and may select a candidate from the candidate list. However, when video encoder 20 signals the RefPicListX (where X is 0 or 1) motion information of a current PU using AMVP mode, video encoder 20 may signal a RefPicListX motion vector difference (MVD) for the current PU and a RefPicListX reference index for the current PU in addition to signaling a RefPicListX motion vector predictor (MVP) flag for the current PU. The RefPicListX MVP flag for the current PU may indicate the position of a selected AMVP candidate in the AMVP candidate list. The RefPicListX MVD for the current PU may indicate a difference between a RefPicListX motion vector of the current PU and a motion vector of the selected AMVP candidate. In this way, video encoder 20 may signal the RefPicListX motion information of the current PU by signaling a RefPicListX MVP flag, a RefPicListX reference index value, and a RefPicListX MVD. In other words, the data in the bitstream representing the motion vector for the current PU may include data representing a reference index, an index to a candidate list, and an MVD. Thus, the chosen motion vectors may be signaled by transmitting an index into the candidate list. In addition, the reference index values and motion vector differences may also be signaled.

Furthermore, when the motion information of a current PU is signaled using AMVP mode, video decoder 30 may obtain, from the bitstream, a MVD for a current PU and a MVP flag. Video decoder 30 may generate the same AMVP candidate list and may determine, based on the MVP flag, the selected AMVP candidate. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

When a video coder generates an AMVP candidate list for a current PU, the video coder may derive one or more AMVP candidates based on the motion information of PUs that cover locations that spatially neighbor the current PU (i.e., spatially-neighboring PUs) and one or more AMVP candidates based on motion information of PUs that temporally neighbor the current PU (i.e., temporally-neighboring PUs). In AMVP, a candidate list of motion vector predictors for each motion hypothesis may be derived based on a coded reference index. In this disclosure, a PU (or other type of video unit) may be said to "cover" a location if a prediction block associated with the PU (or other type of sample block associated with the video unit) includes the location. The candidate list includes motion vectors of neighboring blocks that are associated with the same reference index as well as a temporal motion vector predictor which is derived based on the motion parameters (i.e., motion information) of the neighboring block of the co-located block in a temporal reference picture.

Figure 2:
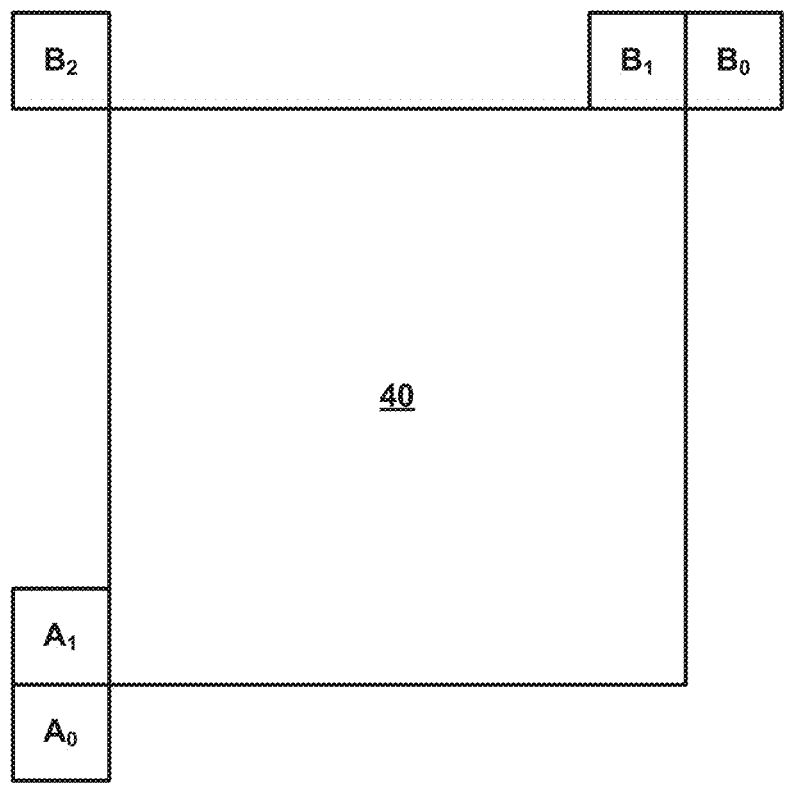
FIG. 2 is a conceptual diagram illustrating example spatially-neighboring prediction units (PUs) relative to a current PU.

FIG. 2 is a conceptual diagram illustrating example spatially-neighboring PUs relative to a current PU 40. In the example of FIG. 2, the spatially-neighboring PUs may be PUs that cover the locations indicated as $A_0$, $A_1$, $B_0$, $B_1$, and $B_2$.

A candidate in a merge candidate list or an AMVP candidate list that is based on the motion information of a PU that temporally neighbors a current PU (i.e., a PU that is in a different time instance than the current PU) may be referred to as a TMVP. A TMVP may be used to improve the coding efficiency of HEVC and, different from other coding tools, a TMVP may need to access a motion vector of a frame in a decoded picture buffer, more specifically in a reference picture list.

The use of TMVPs may be enabled or disabled on a CVS-by-CVS basis, a slice-by-slice basis, or on another basis. A syntax element (e.g., sps_temporal_mvp_enable_flag) in a SPS may indicate whether the use of TMVPs is enabled for a CVS. Furthermore, when the use of TMVPs is enabled for a CVS, the use of TMVPs may be enabled or disabled for particular slices within the CVS. For instance, a syntax element (e.g., slice_temporal_mvp_enable_flag) in a slice header may indicate whether the use of TMVPs is enabled for a slice. Thus, in an inter predicted slice, when the TMVP is enabled for a whole CVS (e.g., sps_temporal_mvp_enable_flag in a SPS is set to 1), slice_temporal_mvp_enable_flag is signaled in the slice header to indicate whether the use of TMVPs is enabled for the current slice.

To determine a TMVP, a video coder may firstly identify a reference picture that includes a PU that is co-located with the current PU. In other words, the video coder may identify a so-called "co-located picture." If the current slice of the current picture is a B slice (i.e., a slice that is allowed to include bi-predictive inter predicted PUs), video encoder 20 may signal, in a slice header, a syntax element (e.g., collocated_from_10_flag) that indicates whether the co-located picture is from RefPicList0 or RefPicList1. In other words, when the use of TMVPs is enabled for a current slice, and the current slice is a B slice (e.g., a slice that is allowed to include bi-predictive inter predicted PUs), video encoder 20 may signal a syntax element (e.g., collocated_from_10_flag) in a slice header to indicate whether the co-located picture is in RefPicList0 or RefPicList1. After video decoder 30 identifies the reference picture list that includes the co-located picture, video decoder 30 may use another syntax element (e.g., collocated_ref_idx), which may be signaled in a slice header, to identify a picture (i.e., the co-located picture) in the identified reference picture list. That is, after a reference picture list is identified, collocated_ref_idx, signaled in a slice header is used to identify the picture in the reference picture list.

The video coder may identify a co-located PU by checking the co-located picture. The TMVP may indicate either the motion information of a right-bottom PU of the CU containing the co-located PU, or the motion information of the right-bottom PU within the center PUs of the CU containing this PU. Thus, either the motion of the right-bottom PU of the CU containing this PU, or the motion of the right-bottom PU within the center PUs of the CU containing this PU is used. The right-bottom PU of the CU containing the co-located PU may be a PU that covers a location immediately below and right of a bottom-right sample of a prediction block of the PU. In other words, the TMVP may indicate the motion information of a PU that is in the reference picture and that covers a location that is co-located with a bottom right corner of the current PU, or the TMVP may indicate the motion information of a PU that is in the reference picture and that covers a location that is co-located with a center of the current PU.

When motion vectors identified by the above process (i.e., motion vectors of a TMVP) are used to generate a motion candidate for merge mode or AMVP mode, the video coder may scale a motion vector of the current PU based on the temporal location (reflected by POC value) of the reference pictures. In other words, the video coder may scale a motion vector of the current PU based on a POC distance between the current picture and the reference picture. For instance, when a video coder scales a motion vector based on a POC distance between a first picture and a second picture, the video coder may increase the magnitude of the motion vector by greater amounts when a difference between the POC values of the first picture and the second picture is greater than when a difference between the POC values of the first picture and the second picture is less.

The target reference index of all possible reference picture lists for the temporal merging candidate derived from a TMVP may be always set to 0. However, for AMVP, the target reference index of all possible reference pictures is set equal to the decoded reference index. In HEVC, a SPS may include a flag (e.g., sps_temporal_mvp_enable_flag) and the slice header may include a flag (e.g., pic_temporal_mvp_enable_flag) when sps_temporal_mvp_enable_flag is equal to 1. When both pic_temporal_mvp_enable_flag and a temporal_id are equal to 0 for a particular picture, no motion vector from pictures before that particular picture in decoding order are used as a TMVP in decoding of the particular picture or a picture after the particular picture in decoding order.

In multi-view coding, there may be multiple views of the same scene from different viewpoints. The term "access unit" is used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier.

Multi-view coding supports inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In contrast, conventional inter prediction only uses pictures in different access units as reference pictures. Thus, in MVC, inter-view prediction is allowed among pictures in the same access unit (i.e., in the same time instance).

In multi-view coding, a bitstream may have a plurality of layers. The layers may correspond to different views. A view may be referred to as a "base view" if a video decoder (e.g., video decoder 30) can decode pictures in the view without reference to pictures in any other view. A view may be referred to as a non-base view if decoding of the view is dependent on decoding of pictures in one or more other views.

For instance, NAL units may include headers (i.e., NAL unit headers) and payloads (e.g., RBSPs). The NAL unit headers may include nuh_reserved_zero_6bits syntax elements. NAL units that have nuh_reserved_zero_6bit syntax elements that specify different values belong to different "layers" of a bitstream. Thus, in multi-view coding, 3DV, or SVC, the nuh_reserved_zero_6bits syntax element of a NAL unit specifies a layer identifier (i.e., a layer ID) of the NAL unit. In some examples, the nuh_reserved_zero_6bits syntax element of a NAL unit is equal to 0 if the NAL unit relates to a base layer in multi-view coding, 3DV coding, or SVC. Data in a base layer of a bitstream may be decoded without reference to data in any other layer of the bitstream. If the NAL unit does not relate to a base layer in multi-view coding, 3DV, or SVC, the nuh_reserved_zero_6bits syntax element may have a non-zero value. As indicated above, in multi-view coding and 3DV coding, different layers of a bitstream may correspond to different views. In SVC, layers other than the base layer may be referred to as "enhancement layers" and may provide information that enhances the visual quality of video data decoded from the bitstream.

Furthermore, some pictures within a layer may be decoded without reference to other pictures within the same layer. Thus, NAL units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer" or a "temporal sub-layer."

NAL units may also include temporal_id syntax elements. The temporal_id syntax element of a NAL unit specifies a temporal identifier of the NAL unit. The temporal identifier of a NAL unit identifies a sub-layer with which the NAL unit is associated. Thus, each sub-layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

When coding a picture in one of the non-base views, a video coder (such as video encoder 20 or video decoder 30) may add a picture into a reference picture list if the picture is associated with a different view than the picture that the video coder is current coding but is in a same time instance (i.e., access unit) as the picture that the video coder is currently coding. Like other inter prediction reference pictures, the video coder may insert an inter-view prediction reference picture at any position of a reference picture list.

Figure 3:
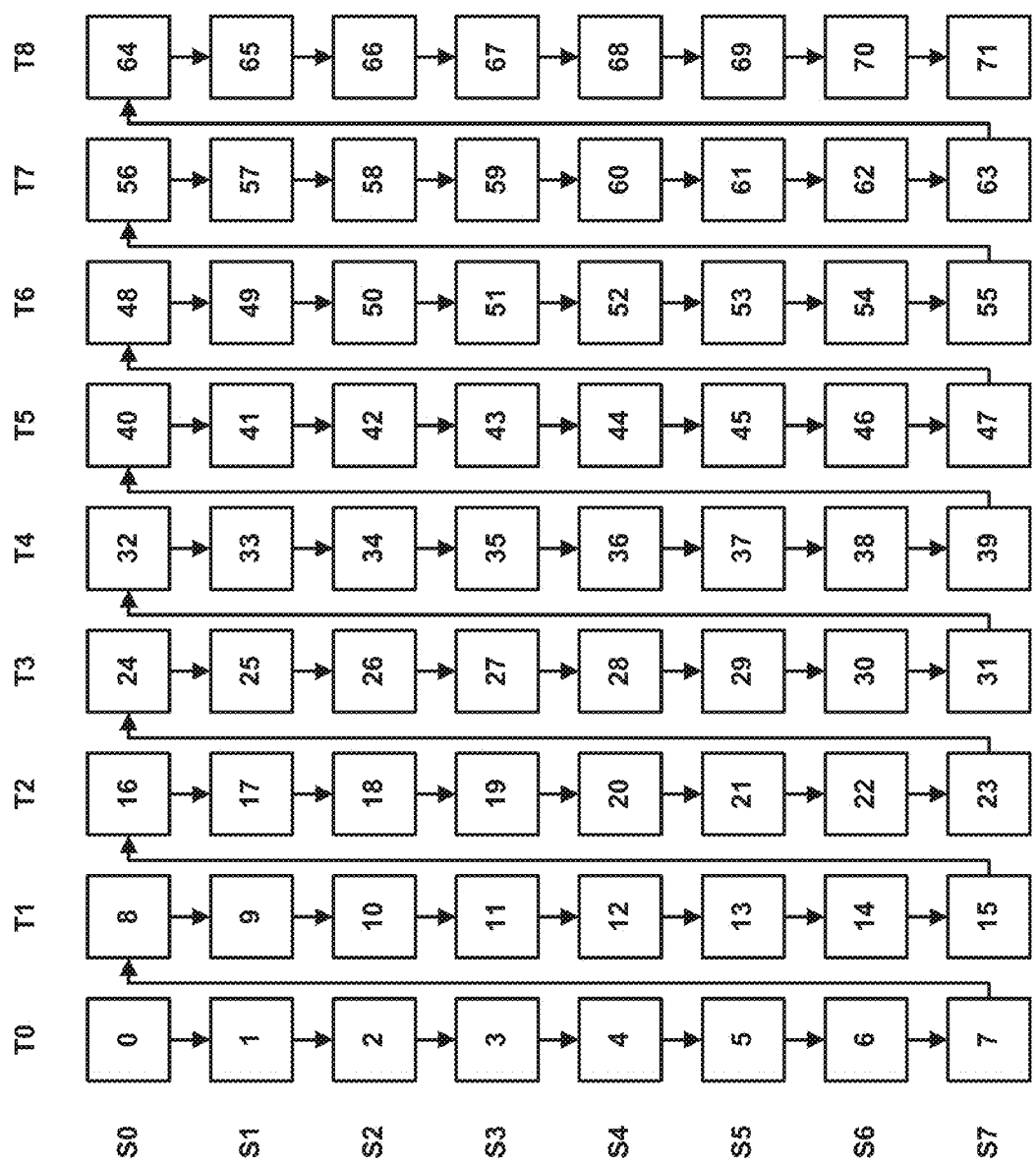
FIG. 3 is a conceptual diagram illustrating an example multi-view decoding order.

FIG. 3 is a conceptual diagram illustrating an example multi-view decoding order. The multi-view decoding order may be a bitstream order. In the example of FIG. 3, each square corresponds to a view component. Columns of squares correspond to access units. Each access unit may be defined to contain the coded pictures of all the views of a time instance. Rows of squares correspond to views. In the example of FIG. 3, the access units are labeled T0 . . . T11 and the views are labeled S0 . . . S7. Because each view component of an access unit is decoded before any view component of the next access unit, the decoding order of FIG. 3 may be referred to as time-first coding. The decoding order of access units may not be identical to the output or display order.

Multi-view coding may support inter-view prediction. Inter-view prediction is similar to the inter prediction used in H.264/AVC, HEVC, or other video coding specifications and may use the same syntax elements. However, when a video coder performs inter-view prediction on a current video unit (such as a macroblock or PU), the video coder may use, as a reference picture, a picture that is in the same access unit as the current video unit, but in a different view. In contrast, conventional inter prediction only uses pictures in different access units as reference pictures.

Figure 4:
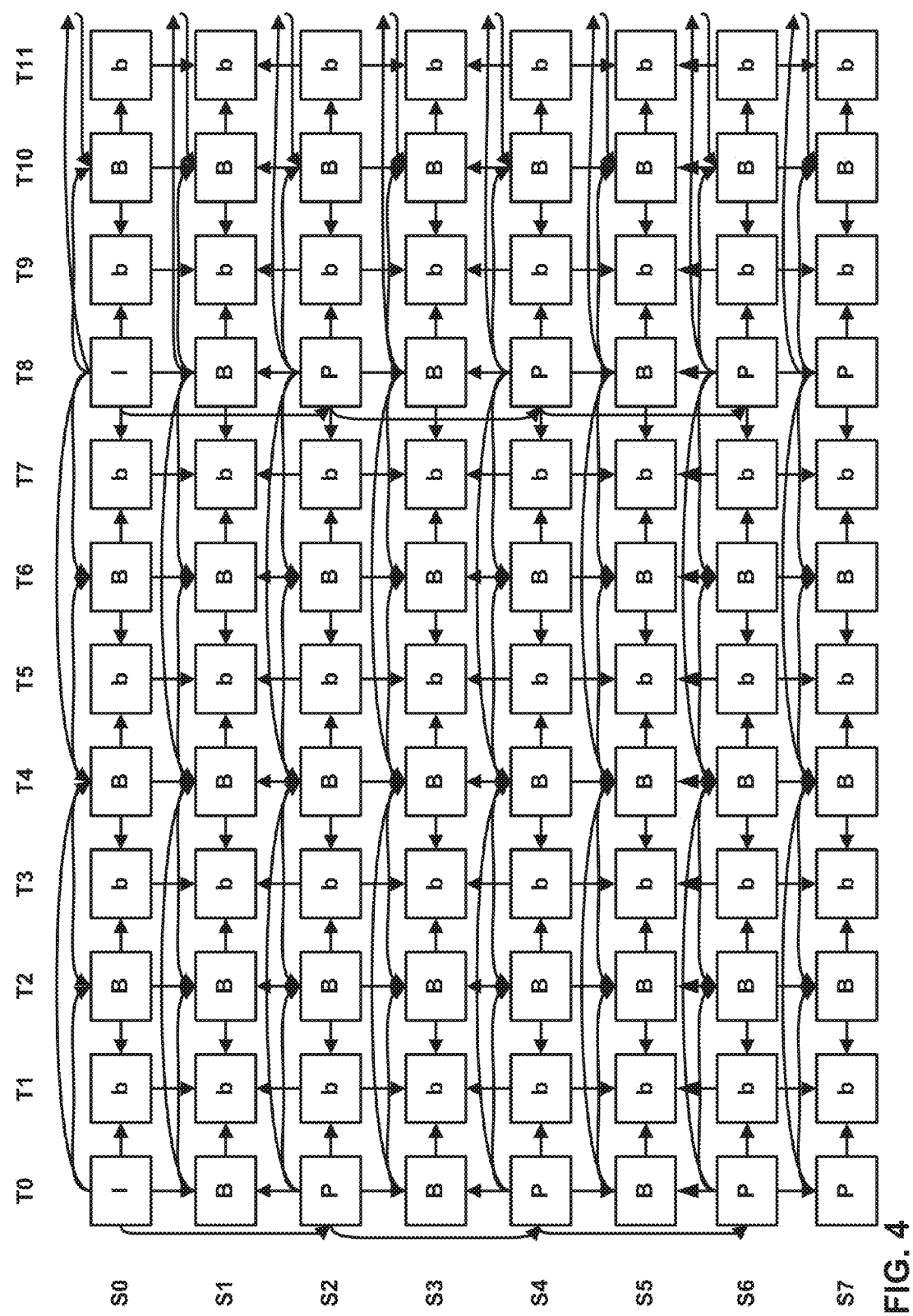
FIG. 4 is a conceptual diagram illustrating an example prediction structure for multi-view coding.

FIG. 4 is a conceptual diagram illustrating an example prediction structure for multi-view coding. The multi-view prediction structure of FIG. 4 includes temporal and inter-view prediction. In the example of FIG. 4, each square corresponds to a view component. In the example of FIG. 4, access units are labeled T0 . . . T11 and views are labeled S0 . . . S7. Squares labeled "I" are intra predicted view components. Squares labeled "P" are uni-predictive inter predicted view components. Squares labeled "B" and "b" are bi-predictive inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 4, view components in different views of the same access unit may be available as reference pictures. The use of one view component of an access unit as a reference picture for another view component of the same access unit may be referred to as inter-view prediction.

In the MVC extension of H.264/AVC, inter-view prediction is supported by disparity motion compensation, which uses the syntax of the H.264/AVC motion compensation, but allows a picture in a different view to be used as a reference picture. Coding of two views may also be supported by the MVC extension of H.264/AVC. One of the advantages of the MVC extension of H.264/AVC is that an MVC encoder may take more than two views as a 3D video input and an MVC decoder may decode such a multiview representation. Consequently, any renderer with a MVC decoder may expect 3D video contents with more than two views.

In the context of multiview video coding, there are two kinds of motion vectors. One kind of motion vector is a normal motion vector that points to a temporal reference picture. The type of inter prediction corresponding to a normal, temporal motion vector may be referred to as motion-compensated prediction (MCP). When an inter-view prediction reference picture is used for motion compensation, the corresponding motion vector is referred to as a "disparity motion vector." In other words, a disparity motion vector points to a picture in a different view (i.e., a disparity reference picture or an inter-view reference picture). The type of inter prediction corresponding to a disparity motion vector may be referred to as "disparity-compensated prediction" or "DCP."

As mentioned above, a multi-view extension of HEVC (i.e., MV-HEVC) and a 3DV extension of HEVC (i.e., 3D-HEVC) are under development. MV-HEVC and 3D-HEVC may improve coding efficiency using inter-view motion prediction and inter-view residual prediction. In inter-view motion prediction, a video coder may determine (i.e., predict) the motion information of a current PU based on the motion information of a PU in a different view than the current PU. In inter-view residual prediction, a video coder may determine residual blocks of a current CU based on residual data in a different view than the current CU.

To enable inter-view motion prediction and inter-view residual prediction, a video coder may determine disparity vectors for blocks (e.g., PUs, CUs, etc.). In general, a disparity vector is used as an estimator of the displacement between two views. A video coder may use a disparity vector for a block either to locate a reference block in another view for inter-view motion or residual prediction, or the video coder may convert the disparity vector to a disparity motion vector for inter-view motion prediction.

In some examples, the video coder may use the method of Neighboring Blocks Based Disparity Vector (NBDV) to derive a disparity vector for a block. For instance, to derive a disparity vector for a current PU, a process called NBDV may be used in a test model for 3D-HEVC (i.e., 3D-HTM). The NBDV process uses disparity motion vectors from spatial and temporal neighboring blocks to derive the disparity vector for a current block. Because neighboring blocks (e.g., blocks that spatially or temporally neighbor the current block) are likely to share almost the same motion and disparity information in video coding, the current block can use the motion vector information in the neighboring blocks as predictors of the disparity vector of the current block.

When a video coder performs the NBDV process, the video coder may check, in a fixed checking order, motion vectors of spatially-neighboring and temporally-neighboring blocks. When the video coder checks the motion vector(s) of a spatially-neighboring or temporally-neighboring block, the video coder may determine whether the motion vector(s) of the spatially-neighboring or temporally-neighboring block are disparity motion vectors. A disparity motion vector of a block of a picture is a motion vector pointing to a location within a disparity reference picture of the picture. A disparity reference picture of a given picture may be a picture that is in the same access unit as the given picture, but is in a different view than the given picture. When the video coder identifies a disparity motion vector, the video coder may terminate the checking process. The video coder may convert the returned disparity motion vector to a disparity vector and may use the disparity vector for inter-view motion prediction and inter-view residual prediction. For example, the video coder may set a horizontal component of the disparity vector for the current block equal to a horizontal component of the disparity motion vector and may set the vertical component of the disparity vector to 0.

In some designs of 3D-HEVC (e.g., 3D-HTM 6.0), when the video coder performs the NBDV process to determine a disparity vector for a current block (e.g., a PU), the video coder checks disparity motion vectors in the temporal neighboring blocks, disparity motion vectors in the spatial neighboring blocks, and then Implicit Disparity Vectors (IDVs) in order. Thus, the video coder may firstly check temporal neighboring blocks, followed by spatial neighboring blocks. Once the video coder finds a disparity vector for the current block, the video coder may terminate the NBDV process. When the video coder is unable to determine a disparity vector for the current block by performing the NBDV process (i.e., when there is no disparity motion vector or no IDV found during the NBDV process), the disparity vector for the current block may be marked as unavailable. In other words, it can be considered that the NBDV process returns an unavailable disparity vector.

If the video coder is unable to derive a disparity vector for the current block (i.e., if no disparity vector is found) by performing the NBDV process, the video coder may use a zero disparity vector as the disparity vector for the current block. The zero disparity vector is a disparity vector having both horizontal and vertical components equal to 0. Thus, even when the NBDV process returns an unavailable result, other coding processes of the video coder that require a disparity vector may use a zero disparity vector for the current block. In some examples, if the video coder is unable to derive a disparity vector for the current block by performing the NBDV process, the video coder may disable inter-view residual prediction for the current block. However, regardless of whether the video coder is able to derive a disparity vector for the current block by performing the NBDV process, the video coder may use inter-view motion prediction for the current PU. That is, if no disparity vector is found after checking all the pre-defined neighboring blocks, a zero disparity vector may be used for inter-view motion prediction while inter-view residual prediction may be disabled for the corresponding CU.

Furthermore, as mentioned above, a video coder may check temporally-neighboring PUs as part of the process of determining a disparity vector for a current block (e.g., a current PU). When the video coder checks temporal neighboring blocks (e.g., temporal neighboring PUs), the video coder may first construct a candidate picture list. In some examples, the candidate picture list may include up to two reference pictures in the current view (i.e., the view associated with the current block). The first reference picture in the candidate picture list may be a so-called co-located picture. The co-located picture may be used for temporal motion vector prediction in HEVC without a low delay check (i.e., whether the POC value associated with each of the reference pictures in two reference picture lists is smaller or equal to that of current picture). One or more syntax elements in a slice header of a slice containing the current block may indicate the co-located picture.

The video coder may derive the second reference picture in the candidate picture list as follows. First, the video coder may search for a random access point (RAP) picture in the reference picture lists associated with the current block. Random access refers to a decoding of a bitstream starting from a coded picture that is not the first coded picture in the bitstream. The insertion of RAP pictures into a bitstream at regular intervals may enable random access. Example types of RAP pictures include IDR pictures, CRA pictures, and BLA pictures. Hence, IDR pictures, CRA pictures and BLA pictures are collectively referred to as RAP pictures. If the video coder finds a RAP picture, the video coder may place the RAP in the candidate picture list as the second picture in the candidate picture list. Otherwise, if the video coder does not find a random access point in the reference picture lists, the video coder may search for a picture with a lowest temporal identifier in the current block's reference picture lists and place this picture in the candidate picture list as the second picture in the candidate picture list. If there are multiple pictures in the current block's reference picture lists with the same lowest temporal identifier, the video coder may place into the candidate picture list whichever of the pictures with the lowest temporal identifier has the smallest POC distance with the current picture. In this disclosure, a POC distance between two pictures may indicate a difference between POC values of the two pictures. Conceptually, the POC distance between two pictures may be an indication of an amount of difference in output times between the two pictures.

After generating the candidate picture list, the video coder may determine candidate regions within the candidate pictures in the candidate picture list. The video coder may use the candidate regions to determine temporally-neighboring blocks. As indicated above, the video coder may derive a disparity vector for the current block based on a disparity motion vector or an IDV of a temporally-neighboring block. In some examples, for each candidate picture in the candidate picture list, the video coder may determine three candidate regions. The three candidate regions may be defined as follows:

CPU: A co-located region of the current PU or current CU.
CLCU: A largest coding unit (LCU) covering the co-located region of the current PU.
BR: A bottom-right 4×4 block of the CPU.

The video coder may check each of the candidate regions of a candidate picture. In one example, if the candidate picture is in a first non-base view, the video coder may check the candidate regions in the order of CPU, CLCU, and BR. In this example, if the candidate picture is in a second non-base view, the video coder may check the candidate regions in the order of BR, CPU, CLCU. In this example, decoding of pictures in the first non-base view may depend on decoding of pictures in a base view, but not pictures in other views. Furthermore, in this example, decoding of pictures in the second non-base view may also only depend on decoding of pictures in the base view. In other examples, decoding of pictures in the second non-base view may further depend on the first non-base view, but not pictures in other views, if present. When a candidate region covers more than one 16×16 block, the video coder may check all 16×16 blocks in the candidate region according to a raster scan order. When the video coder checks a candidate region (or a 16×16 block within a candidate region), the video coder may determine whether a PU that covers the candidate region specifies a disparity motion vector. If the PU that covers the candidate region specifies a disparity motion vector, the video coder may determine the disparity vector of the current video unit based on the disparity motion vector of the PU.

As mentioned above, a video coder may check spatially-neighboring blocks (e.g., PUs) as part of the process of determining the disparity vector for a current block. In some versions of the NBDV process, the video coder uses five spatial neighboring blocks for disparity vector derivation. For instance, the video coder may check the following spatially-neighboring blocks: the below-left spatially-neighboring block, the left spatially-neighboring block, the above-right spatially-neighboring block, the above spatially-neighboring block, and the above-left spatially-neighboring block. In some versions of the NBDV process, the five spatially-neighboring blocks are used for disparity vector derivation blocks may cover the locations $A_0$, $A_1$, $B_0$, $B_1$, and $B_2$, respectively, as indicated in FIG. 2. In some examples, because these five spatially-neighboring blocks are the same as the spatially-neighboring blocks used in the merge mode in HEVC, no additional memory access is required. The video coder may check the five spatially-neighboring blocks in the order of $A_1$, $B_1$, $B_0$, $A_0$, and $B_2$. If one of the spatially-neighboring blocks has a disparity motion vector, the video coder may terminate the checking process and the video coder may use the disparity motion vector as the final disparity vector for the current PU.

When the video coder checks a spatially-neighboring PU, the video coder may first check whether the neighboring PU has a disparity motion vector. If none of the spatially-neighboring PUs has a disparity motion vector, the video coder may determine whether any of the spatially-neighboring PUs has an IDV. An IDV may be a disparity vector of a spatially- or temporally-neighboring PU that is coded using inter-view prediction. An IDV may be generated when a block employs inter-view motion vector prediction, i.e., the candidate for AMVP or merge modes is derived from a reference block in the other view with the help of a disparity vector. A video coder may use an IDV as an inter-view disparity motion vector candidate. Such a disparity vector is called IDV. An IDV may be stored to the block for the purpose of disparity vector derivation. Furthermore, when the video coder identifies a disparity motion vector or an IDV, the video coder may return the identified disparity motion vector or IDV.

When the video coder determines whether any of the spatially-neighboring PUs has an IDV, the video coder may check the spatially-neighboring PUs in the order of $A_0$, $A_1$, $B_0$, $B_1$, and $B_2$. Thus, the video coder may check the spatially-neighboring PUs in the order of $A_1$, $B_1$, $B_0$, $A_0$ and $B_2$ for disparity motion vectors and check the spatially-neighboring PUs in the order of $A_0$, $A_1$ $B_0$, $B_1$, and $B_2$ for IDVs. If one of the spatially-neighboring PUs has an IDV and the IDV is coded as merge/skip mode, the video coder may terminate the checking process and may use the IDV as the final disparity vector for the current PU.

In 3D-HEVC, a video coder may generate merge candidate lists and AMVP candidate lists in a manner that differs somewhat from the manner used to generate merge candidate lists and AMVP candidate lists in the base HEVC specification. For example, inter-view motion prediction can be applied to both AMVP and merge/skip modes. The basic idea of inter-view motion prediction is add one or more candidates which may be derived from the disparity vector or from the motion information of the corresponding block located by the disparity vector in a reference view.

For instance, the video coder may determine, based on a disparity vector for a current PU, an inter-view predicted motion vector candidate (IPMVC). If the IPMVC is available, the video coder may add the IPMVC to a merge candidate list for the current PU or an AMVP candidate list for the current PU. The IPMVC, if available, may specify a temporal motion vector (i.e., a motion vector that indicates a location in a reference picture in the same view as, but different time instance, than the current PU).

In 3D-HEVC, a video coder may generate a merge candidate list for a current PU as follows. As indicated above, the video coder may derive an IPMVC for insertion into the merge candidate list. To derive the IPMVC for insertion in the merge candidate list, the video coder may locate, based at least in part on a disparity vector of a current PU, a reference block of the current PU. The reference PU of the current PU is in a reference view (i.e., a different view than the current PU) and is in the same access unit as the current video unit. In other words, a reference block of the current PU in a reference view of the same access unit is located by the disparity vector.

Furthermore, to derive the IPMVC for insertion in a merge candidate list, the video coder may determine whether the reference PU is intra coded. If the reference PU is not intra coded, the reference PU may be uni-predictive or bi-predictive. If the reference PU is uni-predictive, the reference index of the reference PU indicates the reference PU's reference picture. The reference PU's reference picture is in a particular reference picture list (i.e., RefPicListX, where X is equal to 0 or 1) for the reference PU. Furthermore, if the reference PU is uni-predictive, the video coder may determine whether a POC value of the reference PU's reference picture matches a POC value of a reference picture in RefPicListX for the current PU. If the POC value of the reference PU's reference picture matches the POC value of a reference picture in RefPicListX for the current PU, the video coder may generate the IPMVC such that a prediction direction indicator of the IPMVC is equal to the prediction direction indicator of the reference PU, a motion vector of the IPMVC is equal to a motion vector of the reference PU, and a reference index of the IPMVC indicates a position in RefPicListX for the current PU of the reference picture whose POC value matches the POC value of the reference PU's reference picture.

If the reference PU is bi-predictive, the reference PU has two reference indexes and two motion vectors. Hence, the reference PU has a first reference picture in the reference PU's RefPicList0 and a second reference picture in the reference PU's RefPicList1. If the POC value of the reference PU's first reference picture matches a POC value of a reference picture in the current PU's RefPicList0 and if the POC value of the reference PU's second reference picture matches a POC value of a reference picture in the current PU's RefPicList1, the video coder may generate the IPMVC for insertion in the merge candidate list such that a prediction direction indicator for the IPMVC matches the prediction direction indicator for the reference block and motion vectors of the IPMVC match motion vectors for the reference block. Furthermore, if this condition is true, a first reference index of the IPMVC indicates a position in the current PU's RefPicList0 of the reference picture whose POC value matches the POC value of the reference PU's first reference picture. In addition, if this condition is true, a second reference index of the IPMVC indicates a position in the current PU's RefPicList1 of the reference picture whose POC value matches the POC value of the reference PU's second reference picture. Thus, if the reference block is not intra-coded and not inter-view predicted and its reference picture RefPicListX[ref_idx_lx] has a POC value equal to that of one entry RefPicListX[RefIdxLx] in the same reference picture list of the current PU, its motion information (e.g., prediction direction, reference pictures, and motion vectors), after converting the reference index based on POC (i.e., RefIdxLx) is derived to be the IPMVC for inclusion in a merge candidate list.

Figure 5:
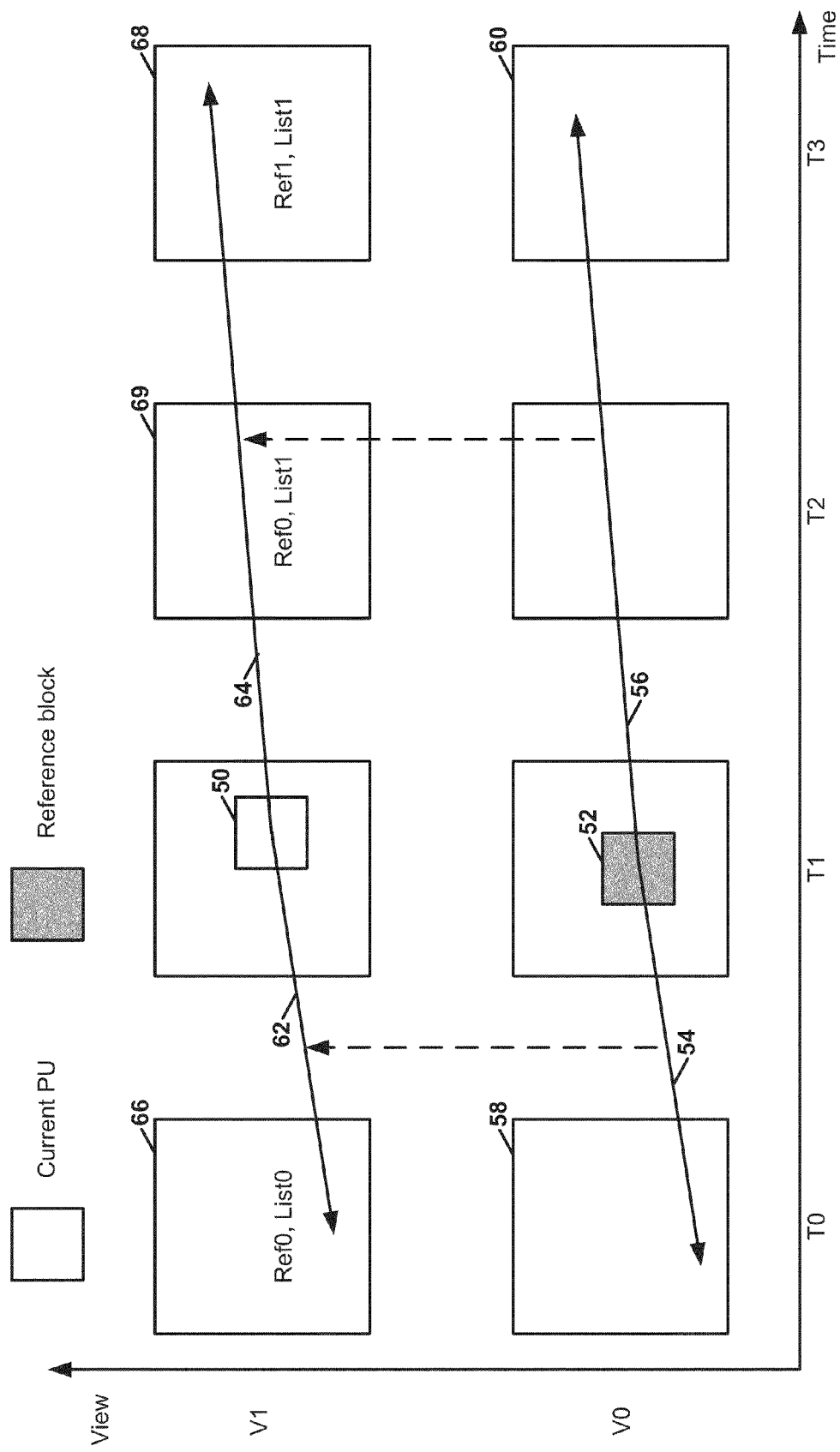
FIG. 5 is a conceptual diagram illustrating an example derivation of an inter-view predicted motion vector candidate (IPMVC) for merge/skip mode.

FIG. 5 is a conceptual diagram illustrating an example derivation of an IPMVC for merge/skip mode. In the example of FIG. 5, a current PU 50 occurs in view V1 at a time instance T1. A reference PU 52 for current PU 50 is in a different view than current PU 50 (i.e., view V0) and in the same time instance as current PU 50 (i.e., time instance T1). In the example of FIG. 5, reference PU 52 is bi-predictive. Hence, reference PU 52 has a first motion vector 54 and a second motion vector 56. Motion vector 54 indicates a position in a reference picture 58. Reference picture 58 is in view V0 and in time instance T0. Motion vector 56 indicates a position in reference picture 60. Reference picture 60 occurs in view V0 and in time instance T3.

The video coder may generate, based on the motion information of reference PU 52, an IPMVC for inclusion in a merge candidate list of current PU 50. The IPMVC may have a first motion vector 62 and a second motion vector 64. Motion vector 62 matches motion vector 54 and motion vector 64 matches motion vector 56. The video coder generates the IPMVC such that a first reference index of the IPMVC indicates a position in RefPicList0 for current PU 50 of a reference picture (i.e., reference picture 66) occurring in the same time instance as reference picture 58 (i.e., time instance T0). In the example of FIG. 5, reference picture 66 occurs in the first position (i.e., Ref0) in RefPicList0 for current PU 50. Furthermore, the video coder generates the IPMVC such that a second reference index of the IPMVC indicates a position in RefPicList1 for current PU 50 of a reference picture (i.e., reference picture 68) occurring in the same time instance as reference picture 60. Thus, in the example of FIG. 5, the RefPicList0 reference index of the IPMVC may be equal to 0. In the example of FIG. 5, a reference picture 69 occurs in the first position (i.e., Ref0) in RefPicList1 for current PU 50 and reference picture 68 occurs in the second position (i.e., Ref1) in RefPicList1 for current PU 50. Thus, the RefPicList1 reference index of the IPMVC may be equal to 1.

In addition to generating the IPMVC and including the IPMVC in the merge candidate list, the video coder may convert the disparity vector for the current PU into an inter-view disparity vector candidate (IDMVC) and may include the IDMVC in a merge candidate list for the current PU in a different position than the IPMVC. In other words, the video coder may include, in the merge candidate list for the current PU, a merge candidate that specifies the disparity vector of the current PU. Thus, the IDMVC may indicate a position in a reference picture in a different view than the current PU. The video coder may add the IDMVC to the merge candidate list in a different position than the IPMVC. The term "inter-view candidate" may be used to refer to either an IPMVC or an IDMVC.

If the video coder is able to determine an IPMVC for the current PU, the IPMVC is considered to be available. Thus, if the reference PU for the current PU is intra predicted or a POC value of a reference picture indicated by a reference index of the reference PU does not match the POC value of any reference picture in a corresponding reference picture list for the current PU, the IPMVC for the current PU may be considered to be unavailable. If the IPMVC is available, the video coder may insert the IPMVC before all spatial and temporal merging candidates in the merge candidate list for the current PU. The video coder may insert, into the merge candidate list for the current PU, the IDMVC before a spatial merging candidate derived from position $A_0$. Furthermore, the inter-view predicted motion vector or inter-view disparity motion vector may always be inserted before all spatial and temporal candidates in an AMVP candidate list.

In some instances, a video coder may perform CU-level inter-view residual prediction (IVRP) based on a derived disparity vector for each CU. When the video coder performs IVRP for a current CU of a current picture, the video coder may use motion vectors of PUs of the current CU to determine a motion compensated block for the current CU. In other words, the motion compensated block for the current CU may comprise the predictive blocks of the PUs of the current CU. The motion compensated block of the current CU may be denoted as $P_e$. Each sample in a residual block ($r_e$) for the current CU may indicate a difference between a sample in an original coding block of the current CU and a corresponding sample in $P_e$. In addition, the video coder may use a disparity vector of the current CU to determine a disparity reference CU in a reference picture. The reference picture is in a different view than the current picture. A residual block of the disparity reference CU may be denoted as $r_b$. Each sample of the residual block of the disparity reference CU ($r_b$) may indicate a difference between an original sample of a coding block for the disparity reference CU and a corresponding predictive sample in a predictive block for a PU of the disparity reference CU.

Video encoder 20 may include, in the bitstream, data indicating a final residual block. Each sample in the final residual block may indicate a difference between a sample in $r_b$ and a corresponding sample in $r_e$. Therefore, when inter-view residual prediction is used, motion compensation can be expressed by the following equation:

$$\hat{I}_e = r_e + P_e + r_b$$

where the reconstruction of the current block $\hat{I}_e$ equals de-quantized coefficients $r_e$ plus prediction $P_e$ and quantization normalized residual coefficients $r_b$. Video coders may treat $r_b$ as the residual predictor. Thus, similar to motion compensation, $r_b$ may be subtracted from the current residual and only the resulting difference signal is transform coded.

In some examples, video encoder 20 signals an IVRP flag for each CU to indicate whether residual prediction is applied or not. In some such examples, when the IVRP flag is equal to 1, the residual block of the corresponding block in the reference view located the disparity vector is used for predicting the residual of the current block (i.e., the current CU). However, due to the adoption of An et al., "3D-CE4.h results on removal of parsing dependency for inter-view residual prediction," Joint Collaborative Team on 3D Video Coding Extension Development of ITU-T SG 16 WP 3 and ISO/IEC JTC 1/SC 29/WG 11, 3rd Meeting: Geneva, CH, 17-23 Jan. 2013, document JCT3V-C0138 (hereinafter JCT3V-C0138), the IVRP flag is not needed any more because the residual prediction may always and only be performed for IPMVC in skip/merge mode when the partition size is equal to 2N×2N. In other words, the following apply: if the partition size of the current CU is equal to 2N×2N and the current PU uses skip/merge mode and the decoded merge index is equal to 0 and the decoded merge index corresponds to the IPMVC, inter-view residual prediction is applied without applying weighting, (i.e., the weighting factor of residual predictor is treated as 1). Otherwise, inter-view residual prediction is not applied (i.e., the weighting factor of residual predictor is treated as 0).

U.S. Provisional Application No. 61/670,075, filed Jul. 10, 2012, and U.S. Provisional Application No. 61/706,692, filed Sep. 27, 2012, the entire content of which is incorporated by reference, propose a generalized residual prediction (GRP) for scalable video coding. Although these provisional patent applications focus on scalable video coding, the GRP techniques described in these provisional patent applications may be applicable to multi-view video coding (e.g., MV-HEVC and 3D-HEVC).

The general idea of GRP can be formulated, in the context of uni-prediction, as:

$$I_c = r_c + P_c + w * r_r$$

In the formula above, $I_c$ denotes the reconstruction of a current frame in a current layer (or view), $P_c$ represents a temporal prediction from the same layer (or view), $r_c$ indicates a signaled residual, $r_r$ indicates a residual prediction from a reference layer, and w is a weighting factor. In some examples, the weighting factor may need to be coded in a bitstream or derived based on previously-coded information. This framework for GRP can be applied in cases of both single-loop decoding and multi-loop decoding. Multiple-loop decoding involves an unrestricted version of prediction of a block using the reconstructed and up-sampled lower resolution signal. To decode one block in an enhancement layer, multiple blocks in previous layers need to be accessed.

For instance, when video decoder 30 uses multi-loop decoding, GRP can be further formulated as:

$$I_c = r_c + P_c + w * (I_r - P_r),$$

In the formula above, $P_r$ indicates the temporal prediction for the current picture in the reference layer, $P_c$ represents a temporal prediction from the same layer (or view), $r_c$ indicates a signaled residual, w is a weighting factor, and $I_r$ denotes the full reconstruction of the current picture in the reference layer.

The formulas above include a weighting factor that may be signaled in a bitstream or derived based on previously-coded information. In some examples, video encoder 20 may signal, in a bitstream, on a CU-by-CU basis, weighting indices used in GRP. Each weighting index may correspond to one weighting factor which is greater than or equal to 0. When a weighting factor for a current CU is equal to 0, the residual block of the current CU is coded using conventional HEVC transform coding. Otherwise, when the weighting factor for the current CU is greater than 0, the current residual signal (i.e., the residual block for the current CU) may be predicted using a reference residual signal multiplied by the weighting factor and only the difference is transmitted using transform coding. In some examples, the reference residual signal is interpolated.

L. Zhang et al., "3D-CE5.h related: Advanced residual prediction for multiview coding," Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, document JCT3V-B0051 (hereinafter, "JCT3V-B0051"), proposed an advanced residual prediction (ARP) method to further improve the coding efficiency of inter-view residual prediction. In contrast to the residual prediction scheme described above, ARP may be performed at a PU level instead of a CU level. To distinguish the residual prediction scheme described above from ARP, the residual prediction scheme described above may be referred to as "CU-based inter-view residual prediction."

Figure 6:
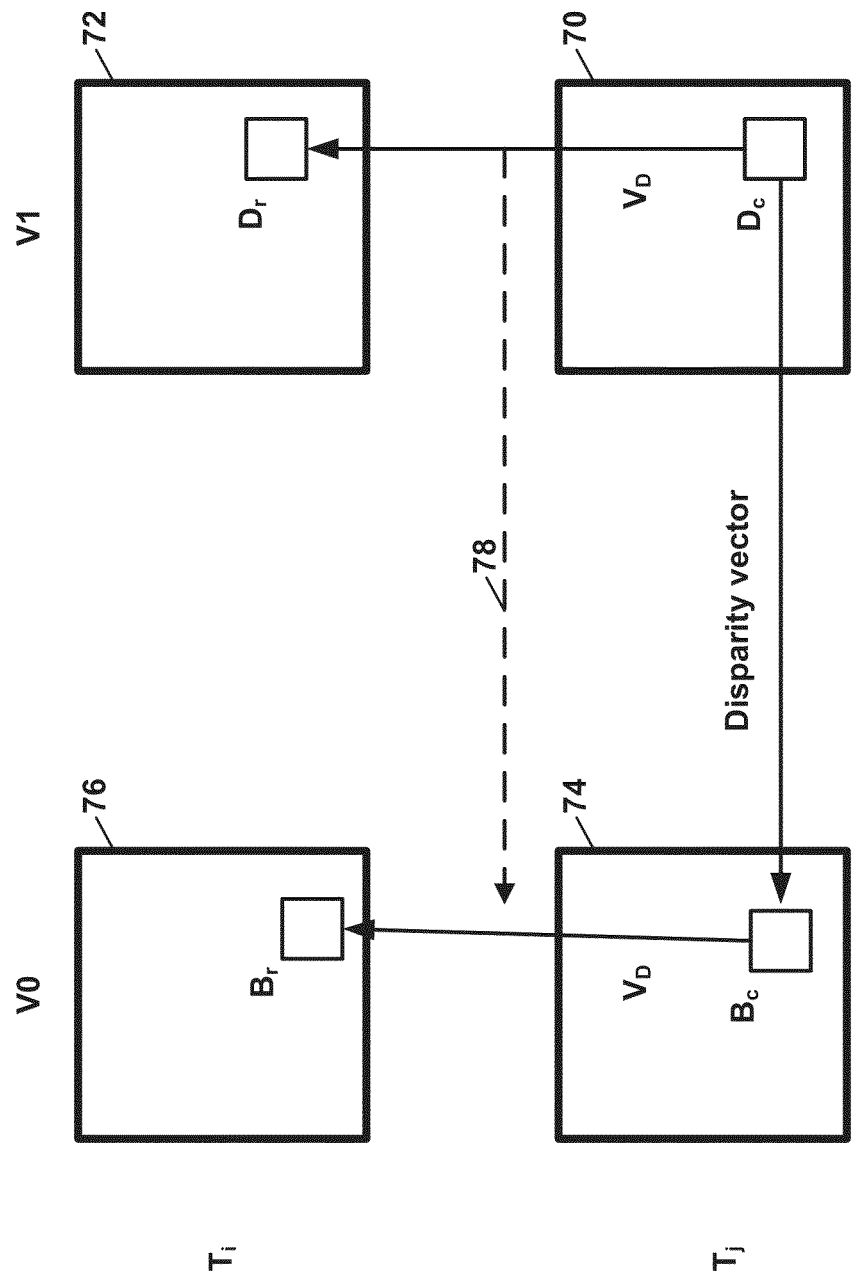
FIG. 6 is a conceptual diagram illustrating an example prediction structure of advanced residual prediction (ARP) in multi-view video coding.

FIG. 6 is a conceptual diagram illustrating an example prediction structure of ARP in multi-view video coding. FIG. 6 includes four pictures: a current picture 70, a temporal reference picture 72, a disparity reference picture 74, and a temporal-disparity reference picture 76. Current picture 70 is in view V1 and is in time instance $T_j$. Temporal reference picture 72 is in view V1 and is in time instance $T_i$. Disparity reference picture 74 is in view V0 and is in time instance $T_j$. Temporal-disparity reference picture 76 is in view V0 and is in time instance $T_i$.

Current picture 70 includes a current PU denoted as "$D_c$". In other words, $D_c$ represents a current block in a current view (view 1). $D_c$ has a temporal motion vector $V_D$ that indicates a location in temporal reference picture 72. Video encoder 20 may determine a temporal reference block $D_r$ based on samples in picture 72 that are associated with the location indicated by the temporal motion vector $V_D$. Thus, $D_r$ denotes $D_c$'s temporal prediction block from the same view (view 1) at time $T_i$ and $V_D$ denotes the motion from $D_c$ to $D_r$.

Furthermore, video encoder 20 may determine a disparity reference block $B_c$ based on samples in disparity reference picture 74 that are associated with a location indicated by a disparity vector of $D_c$. Thus, $B_c$ denotes a reference block (i.e., the representation of $D_c$ in the reference view (view 0) at time $T_j$). The top-left position of $B_c$ can be calculated with the derived disparity vector by adding the derived disparity vector to the top-left position of $D_c$. Since $D_c$ and $B_c$ may be projections of the same object in two different views, $D_c$ and $B_c$ should share the same motion information. Therefore, $B_c$'s temporal prediction block $B_r$ in view 0 at time $T_i$ can be located from $B_c$ by applying the motion information of $V_D$.

Video encoder 20 may determine a temporal-disparity reference block $B_r$ (the predictive block of $B_c$) in temporal-disparity picture 76. As indicated above, temporal-disparity picture 76 is in the same view (i.e., view V0) as $B_r$ and is in the same time instance as $D_r$ (i.e., time instance $T_j$). Video encoder 20 may determine $B_r$ based on samples at a location indicated by the motion vector $V_D$ of $D_c$. Thus, the top-left position of $B_r$ can be calculated with the re-used motion vector $V_D$ by adding the motion vector $V_D$ to the top-left position of $B_c$. The top-left position of $B_c$ can be equal to the sum of the top-left position of $D_c$ and the disparity vector. Thus, the top-left position of $B_r$ may be equal to the sum of the coordinates of the top-left position of $D_c$, the disparity vector, and the motion vector $V_D$. In this way, as shown in FIG. 6 by arrow 78, video encoder 20 may re-use the motion vector $V_D$ for determining $B_r$.

Furthermore, in ARP, each sample in a first residual block may indicate the difference between a sample in $D_c$ and a corresponding sample of $D_r$. The first residual block may be referred to as an original residual block for $D_c$. Each sample in a second residual block may indicate a difference between a sample in $B_c$ and a corresponding sample in $B_r$. The second residual block may be referred to as a "residual predictor." Because video encoder 20 uses the motion vector $V_D$ to determine $B_r$, the residual predictor may be different than the actual residual data of $B_c$.

After video encoder 20 determines the residual predictor, video encoder 20 may multiply the residual predictor by a weighting factor. In other words, the residual of $B_c$ with motion information of $V_D$ is multiplied by a weighting factor and used as the residual predictor for the current residual. The weighting factor may be equal to 0, 0.5, or 1. Thus, three weighting factors may be used in ARP (i.e., 0, 0.5, and 1). After video encoder 20 multiplies the residual predictor by the weighting factor, the residual predictor may be referred to as a weighted residual predictor. Video encoder 20 may select, as a final weighting factor, the weighting factor that leads to a minimal rate-distortion cost for the current CU (i.e., the CU containing the current PU). Video encoder 20 may include, in the bitstream, at a CU level, data indicating a weighting index. The weighting index may indicate the final weighting factor (i.e., the weighting factor that was used to generate the weighted residual predictor) for the current CU. In some examples, weighting indexes of 0, 1, and 2 correspond to weighting factors of 0, 1, and 0.5, respectively. Selection of the weighting factor of 0 for the current CU is equivalent to not using ARP for any of the PUs of the current CU.

Video encoder 20 may then determine a final residual block for the current PU. Each sample in the final residual block for the current PU may indicate a difference between a sample in the original residual block and a corresponding sample in the weighted residual predictor. A residual block of a current CU (i.e., the CU containing the current PU) may include the final residual block for the current PU along with residual blocks, if any, for other PUs of the current CU. As described elsewhere in this disclosure, video encoder 20 may partition the residual block of the current CU among one or more transform blocks. Each of the transform blocks may be associated with a TU of the current CU. For each transform block, video encoder 20 may apply one or more transforms to the transform block to generate a transform coefficient block. Video encoder 20 may include, in a bitstream, data that represent quantized transform coefficients of the transform coefficient block.

Hence, in ARP, to ensure high correlation between residues of two views, video encoder 20 may apply motion of a current PU to a corresponding block in a reference view picture to generate residual in the base view to be used for inter-view residual prediction. In this way, the motion is aligned for the current PU and the corresponding reference block in the reference view. Moreover, an adaptive weighting factor is applied to the residue signal so that the prediction error is further reduced.

If the current PU is bi-predicted, the current PU has a RefPicList0 motion vector, a RefPicList1 motion vector, a RefPicList0 reference index, and a RefPicList1 reference index. This disclosure may refer to the reference picture indicated by the current PU's RefPicList0 reference index as the current PU's RefPicList0 target reference picture. The current PU's RefPicList1 motion vector may indicate a reference location in the current PU's RefPicList1 target reference picture. This disclosure may refer to the reference picture indicated by the current PU's RefPicList1 reference index as the current PU's RefPicList1 target reference picture. The current PU's RefPicList1 motion vector may indicate a reference location in the current PU's RefPicList1 target reference picture.

Hence, when video encoder 20 performs ARP on a bi-predicted PU, video encoder 20 may determine, based on the current PU's RefPicList0 motion vector, a reference location in the current PU's RefPicList0 target reference picture. This disclosure may refer to this reference location as the current PU's RefPicList0 reference location. Video encoder 20 may then determine a reference block that includes actual or interpolated samples of the current PU's RefPicList0 target reference picture that are associated with the current PU's RefPicList0 reference location. This disclosure may refer to this reference block as the current PU's RefPicList0 reference block.

In addition, video encoder 20 may determine, based on the current PU's RefPicList1 motion vector, a reference location in the current PU's RefPicList1 target reference picture. This disclosure may refer to this reference location as the current PU's RefPicList1 reference location. Video encoder 20 may then determine a reference block that includes actual or interpolated samples of the current PU's RefPicList1 target reference picture that are associated with the current PU's RefPicList0 reference location. This disclosure may refer to this reference block as the current PU's RefPicList1 reference block.

Video encoder 20 may determine, based on the current PU's RefPicList0 reference block and the current PU's RefPicList1 reference block, a temporal predictive block for the current PU. For example, each sample in the current PU's temporal predictive block may indicate a weighted average of corresponding samples in the current PU's RefPicList0 reference block and the current PU's RefPicList1 reference block.

Furthermore, when video encoder 20 performs ARP on a bi-predicted PU, video encoder 20 may determine, based on the current PU's RefPicList0 motion vector and a location within a disparity reference frame of a disparity reference block, a temporal-disparity reference location in a temporal-disparity reference picture. This disclosure may refer to this temporal-disparity reference location and this temporal-disparity reference picture as the RefPicList0 temporal-disparity reference location and the RefPicList0 temporal-disparity reference picture, respectively. The RefPicList0 temporal-disparity reference picture may have the same POC value as the current PU's RefPicList0 target reference picture. Video encoder 20 may then determine a sample block that includes actual or interpolated samples of the RefPicList0 temporal-disparity reference picture that are associated with the RefPicList0 temporal-disparity reference location. This disclosure may refer to this sample block as the RefPicList0 temporal-disparity reference block.

In addition, video encoder 20 may determine, based on the current PU's RefPicList1 motion vector and the location within the disparity reference frame of the disparity reference block, a temporal-disparity reference location in a temporal-disparity reference picture. This disclosure may refer to this temporal-disparity reference location and this temporal-disparity reference picture as the RefPicList1 temporal-disparity reference location and the RefPicList1 temporal-disparity reference picture, respectively. The RefPicList1 temporal-disparity reference picture may have the same POC value as the current PU's RefPicList1 target reference picture. Because the current PU's RefPicList0 target reference picture and the current PU's RefPicList1 target reference picture may be different, the RefPicList1 temporal-disparity reference picture may be different than the RefPicList0 temporal-disparity reference picture. Video encoder 20 may then determine a sample block that includes actual or interpolated samples of the RefPicList1 temporal-disparity reference picture that are associated with the RefPicList1 temporal-disparity reference location. This disclosure may refer to this sample block as the RefPicList1 temporal-disparity reference block.

Next, video encoder 20 may determine, based on the RefPicList0 temporal-disparity reference block and the RefPicList1 temporal-disparity reference block, a disparity predictive block. In some examples, each sample in the disparity predictive block is a weighted average of corresponding samples in the RefPicList0 temporal-disparity reference block and the RefPicList1 temporal-disparity reference block. Video encoder 20 may then determine a residual predictor. The residual predictor may be a block of samples. Each sample in the residual predictor may indicate a difference between a sample in the disparity reference block and a corresponding sample in the disparity predictive block. Video encoder 20 may then generate a weighted residual predictor by applying a weighting factor to the residual predictor. Video encoder 20 may then determine a final residual block for the current PU. Each sample in the current PU's final residual block may indicate a difference between a sample in the original prediction block for the current PU and corresponding samples in the current PU's temporal predictive block and the weighted residual predictor. Video encoder 20 may signal the current PU's final residual block in the bitstream.

Video decoder 30 may perform a similar process when performing ARP on a bi-predicted PU. For instance, video decoder 30 may determine the current PU's temporal predictive block and the weighted residual predictor in the sample manner described above. Video decoder 30 may determine the current PU's final residual block based on elements signaled in the bitstream. Video decoder 30 may then reconstruct the current PU's prediction block by adding the current PU's final residual block, the current PU's temporal predictive block, and the weighted residual predictor.

Zhang et al., "3D-CE4: Advanced residual prediction for multi-view coding," Joint Collaborative Team on 3D Video Coding Extension Development of ITU-T SG 16 WP 3 and ISO/IEC JTC 1/SC 29/WG 11, 3rd Meeting: Geneva, CH, 17-23 Jan. 2013, document JCT3V-O0049 (hereinafter "JCT3V-O0049"), also proposed the basic idea of ARP. In JCT3V-O0049, the main procedures of ARP can be described in the following steps. First, obtain a disparity vector as specified in the current 3D-HEVC, pointing to a target reference view. Then, in the picture of the reference view within the same access unit, the corresponding block is located by the disparity vector. Second, re-use the motion information of the current block to derive the motion information for the reference block. Apply motion compensation for the corresponding block based the same motion vector of current block and derived reference picture in the reference view for the reference block, to derive a residue block. The reference picture in the reference view (Vn) which has the same POC value as the reference picture of current view (Vm) is selected as the reference picture of the corresponding block. Third, apply the weighting factor to the residue block to get a weighted residue block and add the values of the weighted residue block to the predicted samples.

JCT3V-O0049 proposed modifications to two aspects of ARP described in JCT3V-B0051. First, the 8/4-tap luma/chroma interpolation filter used in HEVC for fractional sample interpolation process is replaced by a bi-linear filter when generating the residual predictor, i.e., generating the $B_r$ and $B_c$. In general, a bi-linear filter (i.e., bilinear interpolation) is an extension of linear interpolation for interpolating functions of two variables (e.g., x and y) on a regular 2-dimensional grid. Hence, a bi-linear filter may be a 2-tap filter. Second, in JCT3V-O0049, the proposed ARP is only applied to those CUs with the partitioning mode equal to PART_2N×2N.

Figure 7:
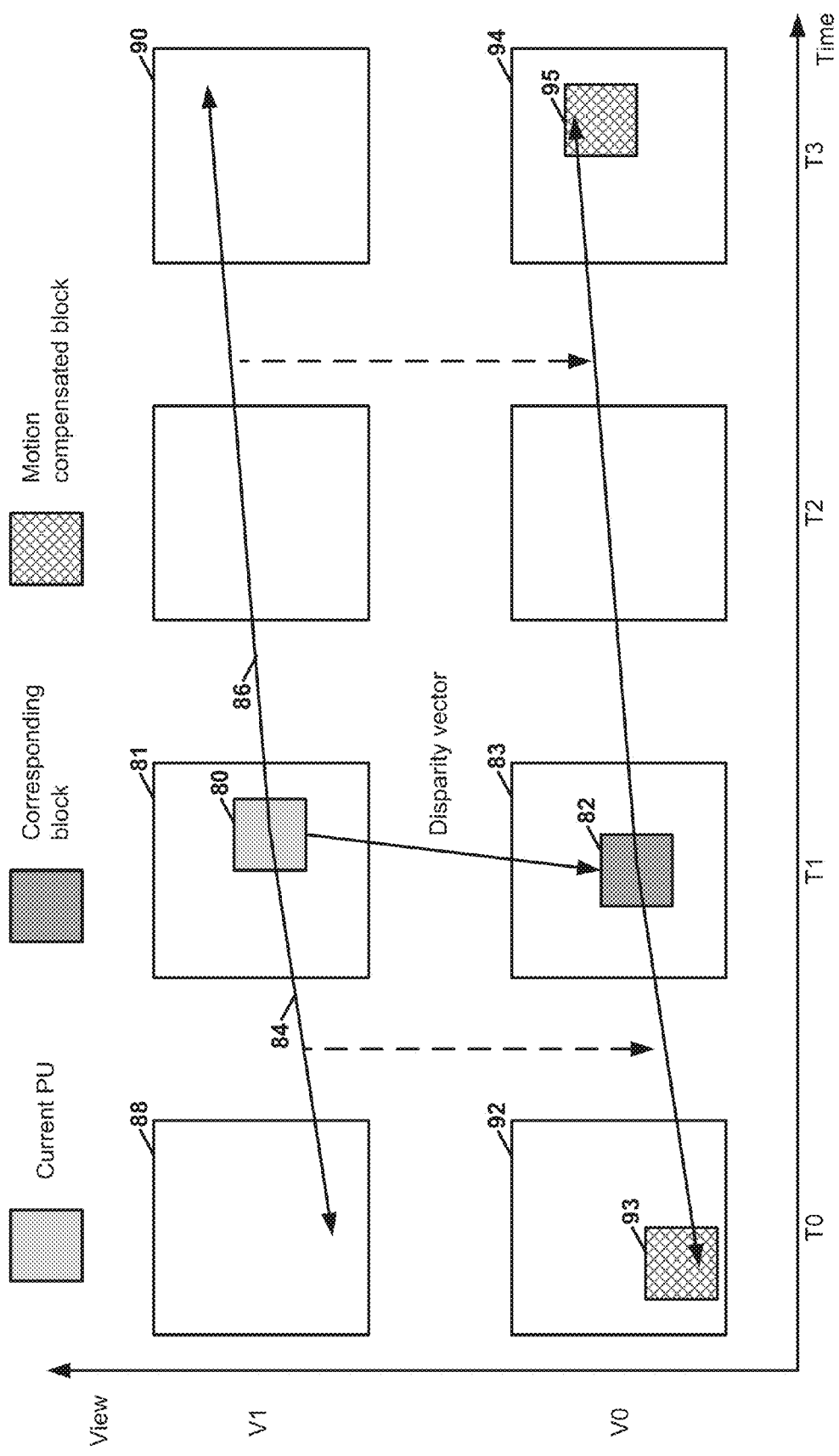
FIG. 7 is a conceptual diagram illustrating an example relationship among a current block, a reference block, and a motion compensated block in ARP.

In the ARP scheme described above, the relationship among current block, corresponding block, and motion compensated block is shown in FIG. 7. In other words, FIG. 7 is a conceptual diagram illustrating an example relationship among a current block, a reference block, and a motion compensated block in ARP. In the example of FIG. 7, a video coder is currently coding a current PU 80 in a current picture 81. Current picture 81 is in a view V1 and is in a time instance T1.

Furthermore, in the example of FIG. 7, the video coder may determine a reference block 82 (i.e., a corresponding block) that comprises actual or interpolated samples of a reference picture 83 that are associated with a location indicated by a disparity vector of current PU 80. For instance, a top-left corner of reference block 82 may be the location indicated by the disparity vector of current PU 80. Temporal-disparity reference block 95 may have the same size as the prediction block of current PU 80.

In the example of FIG. 7, current PU 80 has a first motion vector 84 and a second motion vector 86. Motion vector 84 indicates a location in temporal reference picture 88. Temporal reference picture 88 is in view V1 (i.e., the same view as current picture 81) and is in a time instance T0. Motion vector 86 indicates a location in temporal reference picture 90. Temporal reference picture 90 is in view V1 and is in a time instance T3.

In accordance with the ARP scheme described above, the video coder may determine a reference picture (i.e., reference picture 92) that is in the same view as reference picture 83 and is in the same time instance as temporal reference picture 88. In addition, the video coder may add motion vector 84 to coordinates of a top-left corner of reference block 82 to derive a temporal-disparity reference location. The video coder may determine a temporal-disparity reference block 93 (i.e., a motion compensated block). Samples in temporal-disparity reference block 93 may be actual or interpolated samples of reference picture 92 that are associated with the temporal-disparity reference location derived from motion vector 84. Temporal-disparity reference block 93 may have the same size as the prediction block of current PU 80.

Similarly, the video coder may determine a reference picture (i.e., reference picture 94) that is in the same view as reference picture 84 and is in the same time instance as temporal reference picture 90. In addition, the video coder may add motion vector 86 to coordinates of the top-left corner of reference block 82 to derive a temporal-disparity reference location. The video coder may then determine a temporal-disparity reference block 95 (i.e., a motion compensated block). Samples in temporal-disparity reference block 95 may be actual or interpolated samples of reference picture 94 that are associated with the temporal-disparity reference location derived from motion vector 86. Temporal-disparity reference block 95 may have the same size as the prediction block of current PU 80.

Furthermore, in the example of FIG. 7, the video coder may determine, based on temporal-disparity reference block 93 and temporal-disparity reference block 95, a disparity predictive block. The video coder may then determine a residual predictor. Each sample in the residual predictor may indicate a difference between a sample in reference block 82 and a corresponding sample in the disparity predictive block.

Although ARP has improved the coding efficiency of inter-view residual prediction significantly, ARP may have several problems. For example, different inter-coded PUs within one picture may have different reference pictures. Therefore, a video coder may need to access different pictures from the reference view to determine temporal-disparity reference blocks (e.g., $B_r$ in FIG. 6) for the PUs. Because a video coder only stores a limited number of reference pictures in a cache, the cache miss rate might be higher when greater numbers of reference pictures are used. In other words, since greater numbers of reference pictures are used when ARP is enabled, the use of ARP may increase the cache miss rate. When there is a high cache miss rate, the coding process slows and/or memory bandwidth requirements increase.

In another example problem in ARP, for each reference picture list, when a video coder performs ARP for a PU, the video coder may need to access three blocks (i.e., $B_r$, $B_c$, and $D_r$ in FIG. 6). However, when the video coder does not perform ARP for a PU, the video coder may only need to access one block (i.e., $D_r$). In other words, for one PU which employs ARP, it requires access to three blocks (i.e., $B_r$, $B_c$ and $D_r$) with possible interpolation while for PUs without the usage of ARP, only one block (i.e., $D_r$) is needed for one reference picture list. Therefore, the use of ARP may increase memory bandwidth requirements and computational complexity. That is, the memory bandwidth and computational complexity may increase when ARP is enabled.

Furthermore, there may be several problems with existing inter-view residual prediction techniques. For example, in some CU-based inter-view residual prediction techniques, when inter-view residual prediction is enabled for one PU, the fixed weighting factor (i.e., a weighting factor for an inter-view predicted motion vector candidate) is not adaptive to the changing quality differences between the current view and a reference view.

The techniques of this disclosure may solve the previously-mentioned problems or shortcomings with ARP and CU-based inter-view residual prediction. For example, the techniques of this disclosure may further simplify advanced inter-view residual prediction of AVC-based and/or HEVC-based multi-view, 3DV coding, and scalable video coding.

In accordance with one of the techniques of this disclosure, when a video coder performs motion compensation to generate residual predictors for PUs of a current picture/slice, the video coder may scale the motion vectors of each of the PUs towards the same reference picture (i.e., a "fixed reference picture"). The fixed reference picture may be in the same view (i.e., the "reference view") as the disparity reference blocks for the PUs of the current picture.

For example, a motion vector of the first PU of a picture may indicate a first reference picture and a motion vector of a second PU of the picture may indicate a second reference picture. In this example, when the video coder performs motion compensation to generate a residual predictor for the first PU, the video coder may scale the motion vector of the first PU based on a temporal distance between the first reference picture and the fixed reference picture. Moreover, in this example, when the video coder performs motion compensation to generate a residual predictor for the second PU, the video coder may scale the motion vector of the second PU based on the temporal distance between the second reference picture and the fixed reference picture.

After scaling the motion vector of a current PU toward the fixed reference picture, the video coder may identify, based on the scaled motion vector, a temporal-disparity reference block in the fixed reference picture. The video coder may then determine the residual predictor for the current PU. As before, each sample in the residual predictor may indicate a difference between a sample in the disparity reference block and a corresponding sample in the temporal-disparity reference block.

In this way, the motion vectors of the current PU are scaled toward a fixed picture when doing the motion compensation in the reference view to generate the residue predictor. By doing this, instead of motion compensation from different pictures due to the reason that the motion vectors of PUs in the current picture refer to different pictures, the motion compensation in the reference view may always be done from one fixed picture and the motion vector is scaled to compensate for different POC distances. The fixed reference picture may be the same for each ARP-enabled PU of the current picture. That is, for each respective PU of the current picture, no reference picture other than the fixed reference picture is accessed when performing motion compensation in the reference view to determine, based on a motion vector associated with a particular reference picture list, a temporal-disparity reference block for the respective PU. Because the temporal-disparity reference blocks used for determining the residual predictors for the PUs are all based on samples in the same fixed reference picture, the fixed reference picture is more likely to be in a reference picture cache than if the temporal-disparity reference blocks were based on samples in different pictures of the reference view. Alternatively, the techniques of this disclosure may enable a video coder to have a smaller cache.

Thus, in accordance with one or more techniques of this disclosure, video encoder 20 may scale a motion vector of a current PU of a current CU of a current picture in order to compensate for a difference between a Picture Order Count (POC) distance between the current picture and a temporal reference picture and a POC distance between the current picture and a fixed picture. In this example, the current picture is in a current view and is in a current access unit, a disparity reference picture is in a reference view and is in the current access unit, the temporal reference picture is in the current view but is not in the current access unit, a reference index of the current PU indicates a position of the temporal reference picture within a reference picture list of the current picture, and a disparity reference picture is in a reference view and is in the current access unit. Furthermore, in this example, video encoder 20 may determine a predictive block for the current PU. In addition, video encoder 20 may determine a disparity reference block based on samples of the disparity reference picture that are associated with a location indicated by a disparity vector of the current PU. Video encoder 20 may also determine, based on samples of the fixed reference picture that are associated with a location indicated by the scaled motion vector and the disparity vector of the current PU, a temporal-disparity reference block for the current PU. In addition, video encoder 20 may determine a residual predictor for the current PU. In this example, each sample of the residual predictor for the current PU indicates a difference between a sample of the temporal-disparity reference block for the current PU and a corresponding sample of the disparity reference block. Furthermore, in this example, video encoder 20 may determine a final residual block for the current CU. In this example, the final residual block comprises samples that indicate differences between samples in a coding block for the current CU, samples in the prediction block for the current PU, and samples in the residual predictor for the current PU. Video encoder 20 may include, in a bitstream, data that represent the final residual block for the current CU.

In a similar example, video decoder 30 may scale a motion vector of a current PU of a current picture in order to compensate for a difference between a Picture Order Count (POC) distance between the current picture and a temporal reference picture and a POC distance between the current picture and a fixed picture. In this example, the current picture is in a current view and is in a current access unit, a disparity reference picture is in a reference view and is in the current access unit, the temporal reference picture is in the current view but is not in the current access unit, and a reference index of the current PU indicates a position of the temporal reference picture within a reference picture list of the current PU. Video decoder 30 may determine a predictive block for the current PU. In addition, video decoder 30 may determine a disparity reference block based on samples of the disparity reference picture at a location indicated by a disparity vector of the current PU. Furthermore, video decoder 30 may determine, based on samples of the fixed reference picture at a location indicated by the scaled motion vector and the disparity vector of the current PU, a temporal-disparity reference block for the current PU. Video decoder 30 may determine a residual predictor for the current PU, wherein each sample of the residual predictor for the current PU indicates a difference between a sample of the temporal-disparity reference block for the current PU and a corresponding sample of the disparity reference block. Video decoder 30 may then reconstruct a coding block based on a signaled residual block, the residual predictor for the current PU, and the predictive block for the current PU.

In some examples, the video coder may determine an assigned picture that is in the current view. In some such examples, the fixed reference picture may be a reference picture that has the same POC value (i.e., is in the same access unit) as the assigned picture in the current view. For instance, the fixed reference picture may have a POC value that matches a POC value of a reference picture in a reference picture list for the current picture. In general, this disclosure may use the term "assigned picture" or "assigned reference picture" to refer to a picture that is in the current view. In contrast, this disclosure may use the term "fixed picture" or "fixed reference picture" to refer to a picture that is in the reference view.

In some examples, a video coder may use different fixed reference pictures for RefPicList0 and RefPicList1. For example, the video coder may determine, based on samples of a first fixed reference picture, RefPicList0 temporal-disparity reference blocks for all PUs of the current picture. In this example, the video coder may determine, based on samples of a second fixed reference picture, RefPicList1 temporal-disparity reference blocks for all PUs of the current picture. In this example, the first fixed reference picture may be different than the second fixed reference picture.

Thus, in such examples, for all pictures in RefPicList0 of the current picture, only one first assigned picture in the current view among them is fixed and for all pictures in RefPicList1 of the current picture, only one second assigned picture in the current view among them is fixed. When doing the motion compensation in the reference view to generate the residue, the picture that in the reference view and that has the same POC value as that of the first assigned picture is used for RefPicList0 and is set as the fixed reference picture. When doing the motion compensation in the reference view to generate the residue, the picture with the same POC value as that of the second assigned picture is used for RefPicList1 and is set as the fixed reference picture.

For example, a video coder may scale a first motion vector of a current PU of a current picture in order to compensate for a temporal distance between a first fixed reference picture and a first temporal reference picture. In this example, the current picture is in a current view and is in a current access unit, a disparity reference picture is in a reference view and is in the current access unit, the temporal reference picture is in the current view but is not in the current access unit, and a first reference index of the current PU indicates a position of the first temporal reference picture within a first reference picture list. Furthermore, in this example, the video coder determines a first predictive block for the current PU. In addition, the video coder determines a disparity reference block based on samples of the disparity reference picture at a location indicated by a disparity vector of the current PU. In addition, the video coder determines, based on samples of the first fixed reference picture at a location indicated by the scaled first motion vector, a temporal-disparity reference block for the current PU. In this example, a POC value of the first fixed reference picture matches a POC value of a reference picture in a first reference picture list of the current picture. In this example, a POC value of a second fixed reference picture matches a POC value of a reference picture in a second reference picture list of the current picture. Furthermore, in this example, the video coder scales a second motion vector of the current PU in order to compensate for a temporal distance between the second fixed reference picture and a second temporal reference picture. A second reference index of the current PU indicates a position, in the second reference picture list of the current picture, of the second temporal reference picture. To determine the temporal-disparity reference block for the current PU, the video coder may determine a first predictive temporal-disparity reference block based on samples of the first fixed reference picture at the location indicated by the scaled first motion vector. Furthermore, to determine the temporal-disparity reference block for the current PU, the video coder may determine a second predictive temporal-disparity reference block based on samples of the second fixed reference picture at a location indicated by the scaled second motion vector. In addition, to determine the temporal-disparity reference block for the current PU, the video coder may determine the temporal-disparity reference block for the current PU based on the first and second predictive temporal-disparity reference blocks.

In some instances of the example provided in the previous paragraph, for each respective PU of the current picture, no reference picture other than the second fixed reference picture is accessed when performing motion compensation in the reference view to determine, based on the scaled second motion vector of the current PU and the disparity vector of the current PU, a temporal-disparity reference block for the respective PU. Furthermore, in some instances of the example provided in the previous paragraph, the first fixed reference picture is the same as the second fixed reference picture.

In one example where the video coder may use different fixed reference pictures for RefPicList0 and RefPicList1, the assigned pictures may be the first entries in RefPicList0 and RefPicList1 of the current view, respectively. In other words, the assigned picture may be the first entry of the current reference picture list. In this example, the video coder may use, as the RefPicList0 and RefPicList0 fixed reference pictures in the reference view, pictures in RefPicList0 and RefPicList1 of the disparity reference block that have the same POC values as the first and second assigned pictures in the current view.

In another example where the video coder may use different fixed reference pictures for RefPicList0 and RefPicList1, the video coder may use, as the fixed reference picture for RefPicList0, a reference picture that is in the reference view and has a POC value that matches a POC value of an assigned picture in the current PU's RefPicList0 that has a smallest POC distance from the current picture. Similarly, in this example, the video coder may use, as the fixed reference picture for RefPicList1, a reference picture that is in the reference view and that has a POC value that matches a POC value of a reference picture in the current PU's RefPicList1 that has a smallest POC distance from the current picture. In this way, the video coder may determine the fixed reference picture such that a POC value of the fixed reference picture matches a POC value of an assigned picture in the current picture's reference picture list and a POC value of the assigned picture is closer to a POC value of the current picture than POC values of any other reference pictures in the reference picture list of the current picture. In another example where the video coder may use different fixed reference pictures for RefPicList0 and RefPicList1, the video coder may use, as the fixed reference picture for RefPicList0, a reference picture in the disparity reference picture's RefPicList0 that has a smallest POC distance from the current picture. Similarly, in this example, the video coder may use, as the fixed reference picture for RefPicList1, a reference picture in the disparity reference picture's RefPicList1 that has a smallest POC distance from the current picture. In other words, the video coder may determine the fixed reference picture such that a POC value of the fixed reference picture is closer to a POC value of the current picture than POC values of any other reference picture that belongs to the reference view. Thus, in these two examples, the assigned picture may be the reference picture which has the minimum POC difference with the current picture in the reference picture list of the current picture or the fixed reference picture may be the picture among reference pictures of the reference view which has the minimum POC difference.

In another example where the video coder may use different fixed reference pictures for RefPicList0 and RefPicList1, the video coder may use, as a first assigned picture, a temporal reference picture (i.e., a reference picture in the same view as the current picture) that has a smallest reference picture index among the temporal reference pictures in the current picture's RefPicList0. Furthermore, the video coder may set the RefPicList0 fixed reference picture to be a picture that is in the reference view and that has the same POC value as the first assigned picture. Similarly, in this example, the video coder may use, as a second assigned picture, a temporal reference picture (i.e., a reference picture in the same view as the current picture) that has a smallest reference picture index among the temporal reference pictures in the current picture's RefPicList1. Furthermore, the video coder may set the RefPicList1 fixed reference picture to be a picture that is in the reference view and that has the same POC value as the second assigned picture. In other words, the RefPicListX fixed reference picture (with X being 0 or 1) may be a picture that has the same POC value as an assigned reference picture, wherein the assigned reference picture is a temporal reference picture of the current block that has a smallest reference picture index in the RefPicListX of the current picture. Thus, in this example, the assigned picture may be the temporal reference picture (from the same view as the current block) which has the smallest reference picture index in a reference picture list.

In another example where the video coder may use different fixed reference pictures for RefPicList0 and RefPicList1, the video coder may use, as the RefPicList0 assigned reference picture, a reference picture that has a lowest temporal identifier among the reference pictures in the current picture's RefPicList0. Similarly, in this example, the video coder may use, as the RefPicList1 assigned reference picture, a reference picture that has a lowest temporal identifier among the reference pictures in the current picture's RefPicList1. The RefPicList0 fixed reference picture may be a picture in the disparity reference picture's RefPicList0 that has the same POC value as the RefPicList0 assigned reference picture. Similarly, the RefPicList1 fixed reference picture may be a picture in the disparity reference picture's RefPicList1 that has the same POC value as the RefPicList1 assigned reference picture. Hence, in this example, the RefPicListX fixed reference picture (with X being 0 or 1) may be a picture that is in the reference view, that is in the disparity reference picture's RefPicListX, and that has a POC value that matches a POC value of an assigned picture, wherein a temporal identifier of the assigned picture is lower than temporal identifiers of any other reference picture in RefPicListX of the current picture.

In another example where the video coder may use different fixed reference pictures for RefPicList0 and RefPicList1, the video coder may use, as the RefPicList0 fixed reference picture, a reference picture that has a lowest temporal identifier among the reference pictures in the disparity reference picture's RefPicList0. Similarly, in this example, the video coder may use, as the RefPicList1 fixed reference picture, a reference picture that has a lowest temporal identifier among the reference pictures in the disparity picture's RefPicList1. Hence, in this example, the video coder may determine the RefPicListX fixed reference picture (where X is 0 or 1) such that the temporal identifier of the fixed reference picture is lower than temporal identifiers of any other reference picture of the reference view. Thus, in these examples and the examples of the previous paragraph, the assigned picture may be the reference picture which has the lowest temporalID in the current reference picture list of the current picture or the fixed reference picture may be among reference pictures of the reference view which has the lowest temporalID.

In another example where the video coder may use different fixed reference pictures for RefPicList0 and RefPicList1, the video coder may identify, as the RefPicListX assigned picture (where X is 0 or 1), a reference picture that has a lowest quantization parameter among the reference pictures in the current picture's RefPicListX. In other words, the quantization parameter of the RefPicListX assigned picture is the lowest quantization parameter among reference pictures in RefPicListX of the current picture. In this example, the RefPicListX fixed reference picture is a reference picture in the disparity reference block's RefPicListX that has a POC value that matches the RefPicListX assigned reference picture. Hence, in this example, the video coder may determine the fixed reference picture such that the fixed reference picture has the same POC value as a reference picture that has a lowest a quantization parameter among reference pictures in the fixed reference picture of the current block. In another example where the video coder may use different fixed reference pictures for RefPicList0 and RefPicList1, the video coder may use, as the RefPicList0 fixed reference picture, a reference picture that has a lowest quantization parameter among the reference pictures in the disparity reference picture's RefPicList0. Similarly, in this example, the video coder may use, as the RefPicList1 fixed reference picture, a reference picture that has a lowest quantization parameter among the reference pictures in the disparity picture's RefPicList1. Hence, in this example, the video coder may determine the fixed reference picture such that the quantization parameter of the fixed reference picture is lower than quantization parameters of any other reference picture of the reference view. Thus, in these two examples, the assigned picture may be the reference picture which has the lowest quantization parameter in the current reference picture list of the current picture or the fixed reference picture may be the picture among reference pictures of the reference view with the lowest quantization parameter.

In another example, the video coder may use, as the RefPicList0 and/or the RefPicList1 fixed reference picture, a candidate picture that the video coder used in performing an NBDV process to derive a disparity vector for the current PU. In another example, the video coder may use, as the RefPicList0 and/or the RefPicList1 fixed reference picture, a first or a second candidate picture that the video coder used in performing an NBDV process of a picture of the reference view. In other words, the video coder may perform an NBDV derivation process to determine the disparity vector for the current PU, wherein the fixed reference picture has a POC value equal to a POC value of the first or second candidate picture used in the NBDV derivation process. Thus, in these two examples, the assigned picture may be the same as the first or second candidate pictures utilized in the NBDV process of the current picture or the picture of the reference view.

In another example, a RefPicListX assigned reference picture (where X is 0 or 1) may be signaled in a slice header, a PPS, an SPS, a VPS, or another syntax structure. In this example, the RefPicListX reference picture may be in the current view. Furthermore, in this example, the RefPicListX fixed reference picture may be in the reference view and may have the same POC value as the RefPicListX assigned reference picture. In one example where the RefPicListX assigned reference picture is signaled in a slice header, the RefPicListX assigned picture is signaled by a reference index of a picture in a reference picture list of the current picture. Thus, in this example, a reference index in the slice header may indicate a position in the current picture's RefPicList0 of the RefPicList0 assigned reference picture and another reference index in the slice header may indicate a position in the current picture's RefPicList1 of the RefPicList1 assigned reference picture. In one example, the RefPicListX fixed reference picture is signaled by reference index of a picture in a reference picture list of the picture of the reference view. Thus, in this example, a reference index in the slice header may indicate a position in the disparity reference picture's RefPicList0 of the RefPicList0 fixed reference picture and another reference index in the slice header may indicate a position in the disparity reference picture's RefPicList1 of the RefPicList1 fixed reference picture.

Furthermore, in one example, when a picture that has the same POC value as the assigned picture (i.e., a reference picture in the current view) is not included in a reference picture list of the reference view, the video coder may use the first entry in the reference picture list of the reference view as the fixed reference picture. In this way, a video coder may use a first entry in a reference picture list of the reference video unit as the fixed reference picture when the reference picture list of the reference video unit does not include the reference picture that has the POC value that matches the POC value of the assigned picture.

In another example, when a picture within the same access unit of the assigned picture of the current view is not present in a reference picture list of the disparity reference picture (i.e., the inter-view reference picture), the video coder may set the fixed picture to be a reference picture (e.g., a temporal reference picture) of the reference picture list, following certain selection criteria as mentioned above, e.g., smallest reference index, smallest POC distance to the current picture, or other criteria. Thus, when a reference picture having a same POC value as an assigned reference picture is not present in a reference picture list of the disparity reference picture, the video coder may set the fixed reference picture to be another picture in the reference picture list of the disparity reference picture.

Furthermore, when ARP is enabled for a current PU and the video coder performs the motion compensation in the current view to determine the residual block for the current PU, the video coder may scale a motion vector of the current PU to a reference picture that is in the current view and that has the same POC value as the fixed reference picture. The video coder may then use the scaled motion vector for the current PU to determine a predictive block for the current PU. In other words, when doing the motion compensation in the current view to get the residual, the motion vector is scaled to the assigned picture when ARP is enabled for the current block/PU. Thus, the video coder may determine the temporal predictive block of the current PU based on samples of a reference picture in the current view that has the same POC value as the fixed reference picture at a location indicated by the scaled motion vector. For example, to determine the predictive block for the current PU, the video coder may determine the predictive block based on samples of an assigned reference picture that are associated with a location indicated by the scaled motion vector, wherein a POC value of the assigned reference picture matches a POC value of the fixed reference picture and the assigned reference picture is in the same view as the current picture.

Furthermore, in one alternative example, when the ARP is indicated to be used (e.g., when the weighting factor is not equal to 0), the reference picture index is not signaled for PUs coded with AMVP mode and the reference picture index is set to the index of the assigned picture for the non-zero weighting factor. For example, video encoder 20 does not include, in a PU, a syntax element indicating a reference index for the PU when ARP is enabled for the PU. Instead, in this example, video decoder 30 may automatically determine (i.e., infer) that the reference index for the PU indicates a fixed reference picture that is associated with the weighting factor.

In accordance with some example techniques of this disclosure, a video coder may round the motion vectors of PUs to integer precision. Furthermore, the video coder may use the rounded motion vectors to generate the residual predictor and/or generate the residual of the current PU. Furthermore, in one alternative example, the video coder may also round the disparity vector to integer precision when generating the residual predictor in the reference view. In one alternative example, the video coder only invokes the process of rounding the motion vectors and/or the disparity vector when the video coder is generating the residual predictor in the reference view. Hence, in the examples above, after scaling the motion vector, the video coder may round the motion vector of the current PU to integer precision; and to determine the temporal-disparity reference block, the video coder may determine, based on the rounded scaled motion vector and the position of the disparity reference block, the residual predictor for the current PU. More particularly, the video coder may determine, based on the rounded scaled motion vector and the position of the disparity reference block, the temporal-disparity reference block. Furthermore, in one example, the rounding process may be defined as: my=(mv>>2)<<2, meaning mv[0]=(mv[0]>>2)<<2 and mv[1]=(mv[1]>>2)<<2. In another example, the rounding process may be defined as: mv[i]=((mv[i]+2)>>2)<<2, or mv[i]=((mv[i]+sign(mv[i])*2)>>2)<<2, for i equal to 0 or 1. In this example, my denotes the motion vector, >> denotes the right shift operation, << denotes the left shift operation, mv[0] denotes the horizontal component of the motion vector, and mv[1] denotes the vertical component of the motion vector.

HEVC may use an 8/4-tap luma/chroma interpolation filter for a fractional sample interpolation process when determining motion compensated blocks. In some examples of this disclosure, a video coder may instead use a bi-linear filter even when generating a motion-compensated block of the current PU. In other words, the 8/4-tap luma/chroma interpolation filter used in HEVC for fractional sample interpolation process may be replaced by a bi-linear filter even when generating the motion-compensated block of the current PU, i.e., generating the $D_r$. Thus, when determining a predictive block for a current PU, the video coder may apply a bi-linear filter to luma and/or chroma components of the temporal reference picture. In one alternative example, the video coder may apply the bi-linear filter only to the luma or only to the chroma component. In another example, the video coder may apply the bi-linear filter to both luma and chroma components. Furthermore, in some examples, when determining the predictive block for the current PU, the video coder may apply a bi-linear filter to luma and chroma components of the assigned reference picture.

Furthermore, in some examples, when a CU is inter-coded, ARP may be enabled only to the luma component or only to the chroma component. For example, video decoder 30 may perform ARP to reconstruct a luma coding block of a current CU, but not a chroma coding block of the current CU, or vice versa.

In some examples, a video coder allocates additional memory to store weighting factor indices of inter-coded PUs. Furthermore, when the video coder constructs a merge candidate list for a PU, each candidate in the merge candidate list includes, in addition to the motion vector and reference index, a weighting factor index. Therefore, if a decoded merge candidate index indicates that a particular candidate is to be chosen for the current PU, the video coder may set the weighting factor index of the current PU and/or the current CU to be the weighting factor index of the current PU. In an alternative example, only when the current PU is partitioned as 2N×2N, such a merging process of taking weighting factor index is used. In other words, in this example, the video coder uses a weighing factor specified by a merge candidate only when the current CU has only a single PU. In another example, the video coder only performs such a merging process when a spatial merging candidate is used (i.e., when the selected merging candidate index refers to a candidate derived from spatial neighboring blocks).

In accordance with an additional technique of this disclosure, a video coder may perform a process to further improve the coding efficiency of the CU-based inter-view residual prediction scheme in 3D-HEVC without motion compensation at the reference view. In accordance with this technique, instead of enabling inter-view residual prediction (with a weighting factor always equal to 1) when the mode of one PU is merge/skip, the merging candidate index equals 0 and indicates a motion vector candidate (i.e., a merge candidate) derived from the reference block of the reference view through inter-view motion prediction and the CU (to which the PU belongs) is partitioned as 2N×2N (i.e., partitioned according to PART_2N×2N mode). Inter-view residual prediction may be disallowed in other situations. In other words, inter-view residual prediction may be enabled for a PU when a merging candidate index for the PU is equal to 0 and the selected merging candidate for the PU (i.e., the merging candidate indicated by the merging candidate index for the PU) is derived from a reference block of a reference view. When inter-view residual prediction is enabled in the same situation as mentioned above, a weighting factor index is further transmitted to enable weighting factors that are not equal to 1 or 0.

In one alternative example, video encoder 20 may signal one bit to indicate the weighting factor equal to 0.5 or 1 when the merging candidate index is equal to 0 and the selected merging candidate is derived from a reference block of a reference view. In other words, in this alternative example, video encoder 20 may signal one bit to indicate the weighting factor equal to 0.5 or 1 in the situation that inter-view residual prediction is enabled as mentioned above.

In another alternative example, inter-view residual prediction may only be enabled for a PU when the PU is coded with merge mode, a merging candidate index (i.e., merge_idx) for the PU is equal to 0, and a partitioning mode of the current CU (i.e., the CU to which the PU belongs) is equal to 2N×2N. Otherwise, in this example, inter-view residual prediction is always disabled. For instance, inter-view residual prediction is always disabled for a PU when the PU is not coded with merge mode, when the PU is coded with merge mode but a merging candidate index for the PU is not equal to 0, or a partitioning mode of the current CU is not equal to 2N×2N. In this example, when inter-view residual prediction is enabled for a PU, video encoder 20 may signal a weighting factor index for the PU. Thus, video encoder 20 may or may not signal a weighting factor index for the PU depending only on the motion signaling mode (i.e., merge mode, skip mode, AMVP mode, etc.), the partition size, and the merge_idx of the PU.

In some examples where CU-based inter-view residual prediction is enabled for a PU only when the PU is coded using merge mode, the merge_idx of the PU is equal to 0, and the partitioning mode of the current CU is equal to 2N×2N, a weighting factor index can be 0, 1, or 2. The weighting factor index values of 0, 1, and 2 may correspond to weighting factors of 0, 1, and 0.5, respectively. However, other mappings of weighting factor indexes to weighting factors may be possible.

Alternatively, in some examples where CU-based inter-view residual prediction is enabled for a PU only when the PU is coded using merge mode, where the merge_idx of the PU is equal to 0, and where the partitioning mode of the current CU is equal to 2N×2N, a weighting factor index can be a 1-bit flag. The semantics of the 1-bit flag may depend on the situation that is derived after the merge candidate list construction. For example, if the merging candidate indicated by the merge_idx of the PU (i.e., merging candidate at the first position of the merging candidate list) is derived from a reference view, the 1-bit flag equal to 0 or 1 indicates that the weighting factor is equal to 0.5 or 1, respectively. In an alternative example, if the merging candidate indicated by the merge_idx of the PU is derived from a reference view, the 1-bit flag equal to 0 or 1 indicates that the weighting factor is equal to 1 or 0.5, respectively. In this alternative example, inter-view residual prediction is always enabled, with possibly different weighting factors and a different mapping of weighting factor indexes to weight factors. Otherwise, if the merging candidate indicated by the merge_idx of the PU is not derived from a reference view, the 1-bit flag equal to 0 or 1 indicates that the weighting factor is equal to 0 or 1, respectively. In an alternative example, if the merging candidate indicated by the merge_idx of the PU is not derived from a reference view, the 1-bit flag equal to 0 or 1 indicates the weighting factor is equal to 1 or 0, respectively. In another alternative example, if the merging candidate indicated by the merge_idx of the PU is not derived from a reference view, the 1-bit flag shall always be equal to 0, indicating that inter-view residual prediction is disabled.

For the scalable coding of HEVC (i.e., SHVC), the following may apply. When GRP is applied for SHVC, the weighting factor index is only signaled for a PU when the reference picture of one PU (indicated by the reference index and the reference picture lists of the current slice) is the same as that of the co-located block (which is indicated by the reference index of the PU in the reference layer picture and its reference picture lists).

Figure 8:
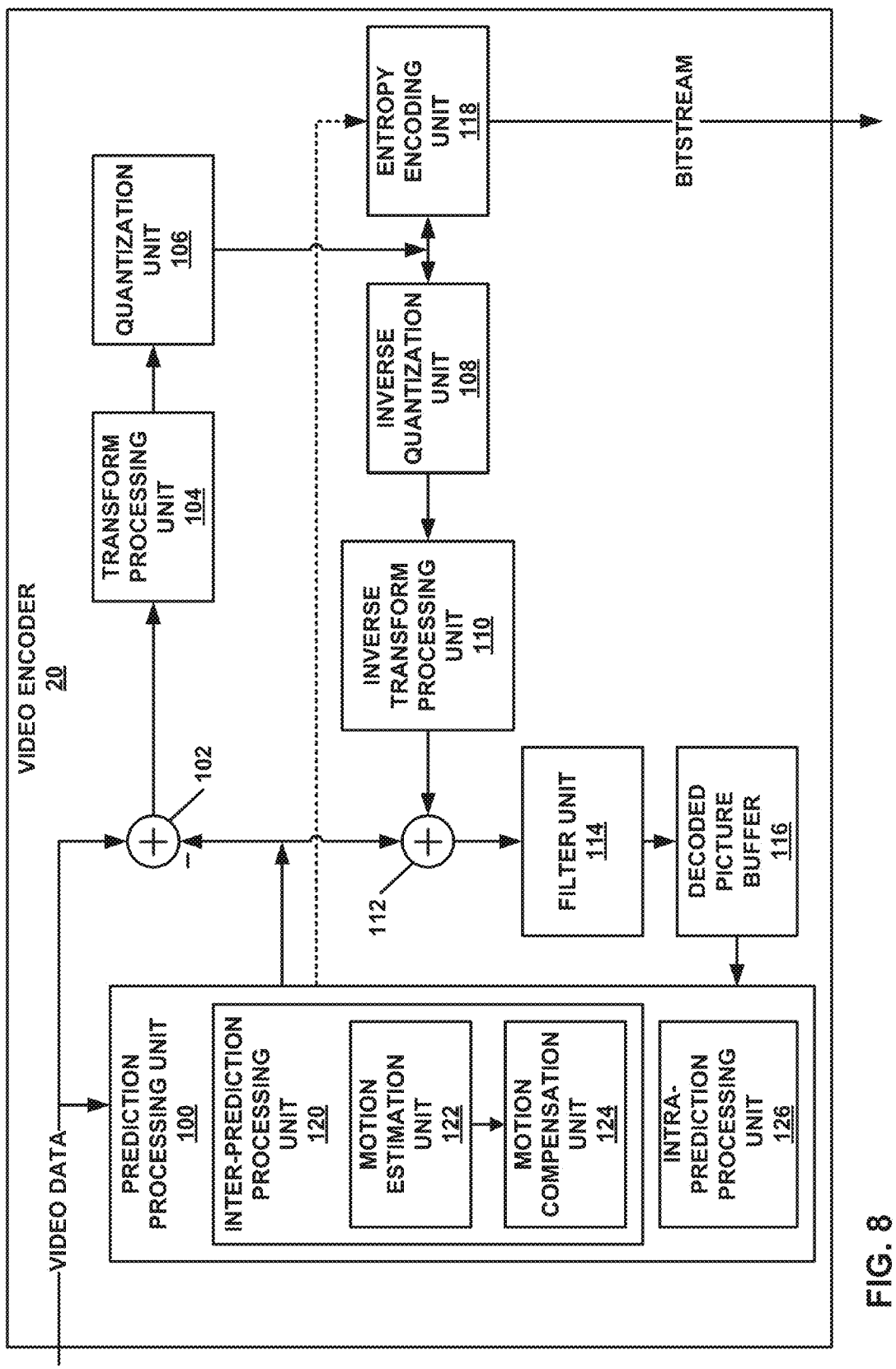
FIG. 8 is a block diagram illustrating an example video encoder that may implement the techniques described in this disclosure.

FIG. 8 is a block diagram illustrating an example video encoder 20 that may implement the techniques of this disclosure. FIG. 8 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 8, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

If a PU is in a P slice, motion estimation unit 122 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a prediction block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-predictive inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

As described elsewhere in this disclosure, video encoder 20 may support ARP. In the example of FIG. 8, inter-prediction processing unit 120 may scale, based at least in part on a temporal difference between a fixed reference picture and a temporal reference picture, a motion vector of a current PU of a current picture. In addition, inter-prediction processing unit 120 may determine a predictive block for the current PU, determine a disparity reference block based on samples of the disparity reference picture at a location indicated by a disparity vector of the current PU, and determine, based on samples of the fixed reference picture at a location indicated by the scaled motion vector and the disparity vector of the current PU, a temporal-disparity reference block for the current PU. Inter-prediction processing unit 120 may then determine a residual predictor for the current PU. Each sample of the residual predictor for the current PU indicates a difference between a sample of the temporal-disparity reference block for the current PU and a corresponding sample of the disparity reference block.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive blocks for the PU. When performing intra prediction using a particular intra prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding blocks of a CU and the selected predictive luma, Cb and Cr blocks of the PUs of the CU, luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. That is, the decoded video blocks in a given frame or picture are then stored in a reference picture memory (e.g., decoded picture buffer 116), which may store reference pictures used for subsequent motion compensation. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118.

Figure 9:
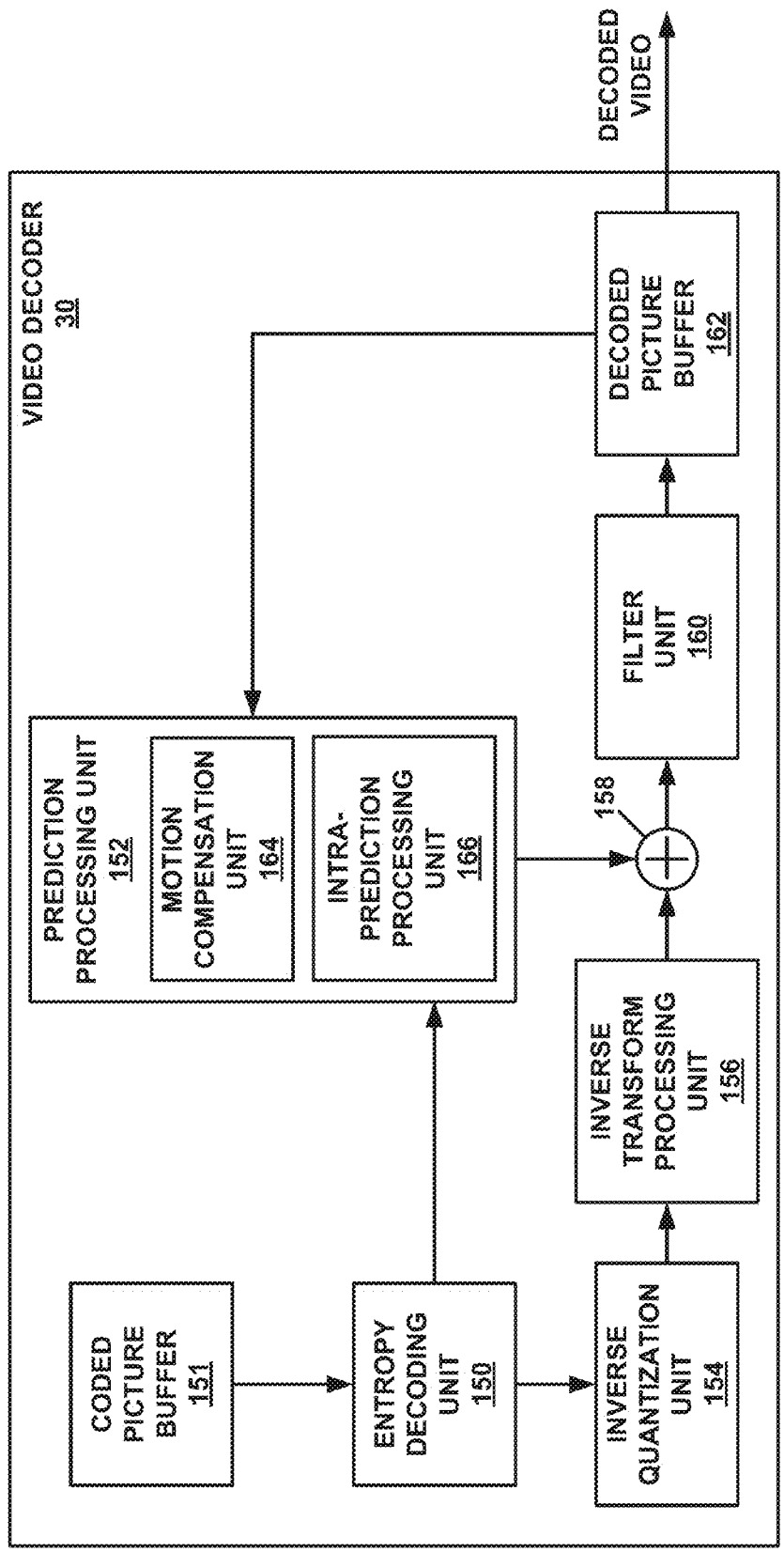
FIG. 9 is a block diagram illustrating an example video decoder that may implement the techniques described in this disclosure.

FIG. 9 is a block diagram illustrating an example video decoder 30 that is configured to implement the techniques of this disclosure. FIG. 9 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 9, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

A coded picture buffer (CPB) 151 may receive and store encoded video data (e.g., NAL units) of a bitstream. Entropy decoding unit 150 may receive NAL units from CPB 151 and parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice.

In addition to decoding syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize, i.e., de-quantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive luma, Cb, and Cr blocks for the PU.

As described elsewhere in this disclosure, video decoder 30 may support ARP. In the example of FIG. 9, prediction processing unit 152 may scale, based at least in part on a temporal difference between a fixed reference picture and a temporal reference picture, a motion vector of a current PU of a current picture. In addition, prediction processing unit 152 may determine a predictive block for the current PU, determine a disparity reference block based on samples of the disparity reference picture at a location indicated by a disparity vector of the current PU, and determine, based on samples of the fixed reference picture at a location indicated by the scaled motion vector and the disparity vector of the current PU, a temporal-disparity reference block for the current PU. Prediction processing unit 152 may then determine a residual predictor for the current PU. Each sample of the residual predictor for the current PU indicates a difference between a sample of the temporal-disparity reference block for the current PU and a corresponding sample of the disparity reference block.

Reconstruction unit 158 may use the residual values from the luma, Cb, and Cr transform blocks associated with TUs of a CU and the predictive luma, Cb, and Cr blocks of the PUs of the CU, i.e., either intra-prediction data or inter-prediction data, as applicable, to reconstruct the luma, Cb, and Cr coding blocks of the CU. For example, reconstruction unit 158 may add samples of the luma, Cb, and Cr transform blocks to corresponding samples of the predictive luma, Cb, and Cr blocks to reconstruct the luma, Cb, and Cr coding blocks of the CU.

Filter unit 160 may perform a deblocking operation to reduce blocking artifacts associated with the luma, Cb, and Cr coding blocks of the CU. Video decoder 30 may store the luma, Cb, and Cr coding blocks of the CU in decoded picture buffer 162. Decoded picture buffer 162 may provide reference pictures for subsequent motion compensation, intra prediction, and presentation on a display device, such as display device 32 of FIG. 1. That is, the decoded video blocks in a given frame or picture are then stored in a reference picture memory (e.g., decoded picture buffer 162), which may store reference pictures used for subsequent motion compensation. For instance, video decoder 30 may perform, based on the luma, Cb, and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Figure 10A:
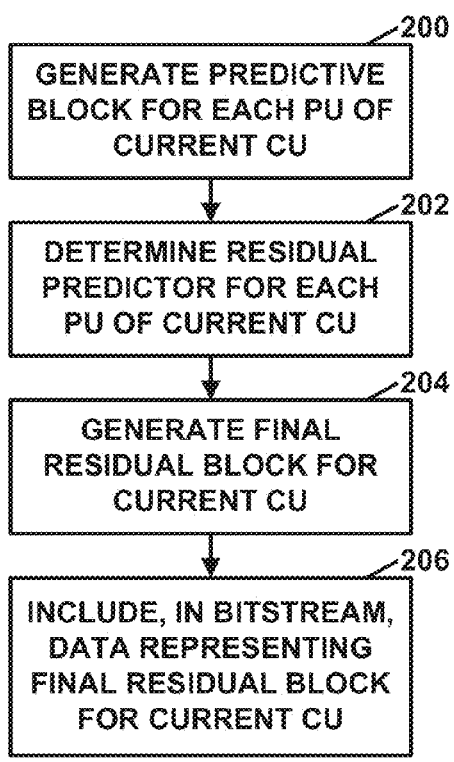
FIG. 10A is a flowchart illustrating an example operation of a video encoder to encode a current coding unit (CU), in accordance with one or more techniques of this disclosure.

FIG. 10A is a flowchart illustrating an example operation of video encoder 20 to encode a current CU, in accordance with one or more techniques of this disclosure. Video encoder 20 may perform the example operation of FIG. 10A when using ARP to encode the current CU. In the example of FIG. 10A, video encoder 20 may generate a predictive block for each PU of the current CU (200). Video encoder 20 may determine a predictive block for a PU based on one or more reference blocks. For instance, each sample in a predictive block for a PU may be equal to a corresponding sample in a reference block or equal to a weighted average of corresponding samples in two reference blocks. Each of the one or more reference blocks may include actual or interpolated samples of a temporal reference picture.

Furthermore, video encoder 20 may determine a residual predictor for each PU of the current CU (202). In some examples, video encoder 20 may perform the example operation of FIG. 11 to determine the residual predictor for a PU. After video encoder 20 determines the residual predictors for each PU of the current CU, video encoder 20 may generate a final residual block for the current CU (204). In some examples, each sample in the final residual block for the current CU may indicate a difference between a sample in a coding block of the current CU and corresponding samples in a predictive block for a PU of the current CU and the residual predictor for the current CU.

Video encoder 20 may include, in a bitstream, data representing the final residual block for the current CU (206). As described elsewhere in this disclosure, to include, in the bitstream, data representing the final residual block for the current CU, video encoder 20 may partition the final residual block into one or more transform blocks, apply a transform and quantization to each of the transform blocks, entropy-encode particular syntax elements representing quantized coefficients, and include the resulting encoded syntax elements in the bitstream.

Figure 10B:
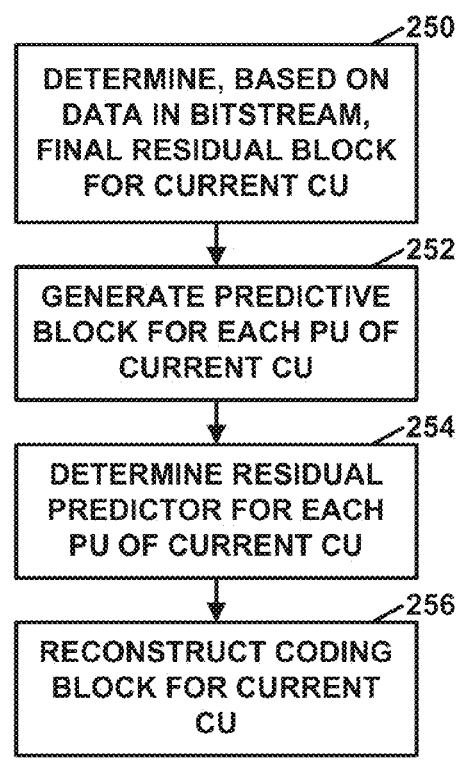
FIG. 10B is a flowchart illustrating an example operation of a video decoder to decode a current CU, in accordance with one or more techniques of this disclosure.

FIG. 10B is a flowchart illustrating an example operation of video decoder 30 to decode a current CU, in accordance with one or more techniques of this disclosure. Video decoder 30 may perform the example operation of FIG. 10B when using ARP to decode the current CU. In the example of FIG. 10B, video decoder 30 may determine, based on data in a bitstream, a final residual block for the current CU (250). For example, video decoder 30 may obtain, from the bitstream, syntax elements that indicate quantized coefficients associated with TUs of the current CU. Furthermore, in this example, video decoder 30 may apply inverse quantization and an inverse transform to the quantized coefficients to determine the final residual block for the current CU.

Furthermore, video decoder 30 may generate a predictive block for each PU of the current CU (252). Video decoder 30 may determine a predictive block for a PU based on one or more reference blocks. For instance, each sample in a predictive block for a PU may be equal to a corresponding sample in a reference block or equal to a weighted average of corresponding samples in two reference blocks. Each of the one or more reference blocks may include actual or interpolated samples of a temporal reference picture.

In addition, video decoder 30 may determine a residual predictor for each PU of the current CU (254). Video decoder 30 may perform the example operation of FIG. 11 to determine a residual predictor for a PU of the current CU. Video decoder 30 may then reconstruct a coding block for the current CU (256). In some examples, each sample in the reconstructed coding block for the current CU is equal to a sum of corresponding samples in the final residual block for the current CU, a predictive block for a PU of the current CU, and the residual predictor.

Figure 11:
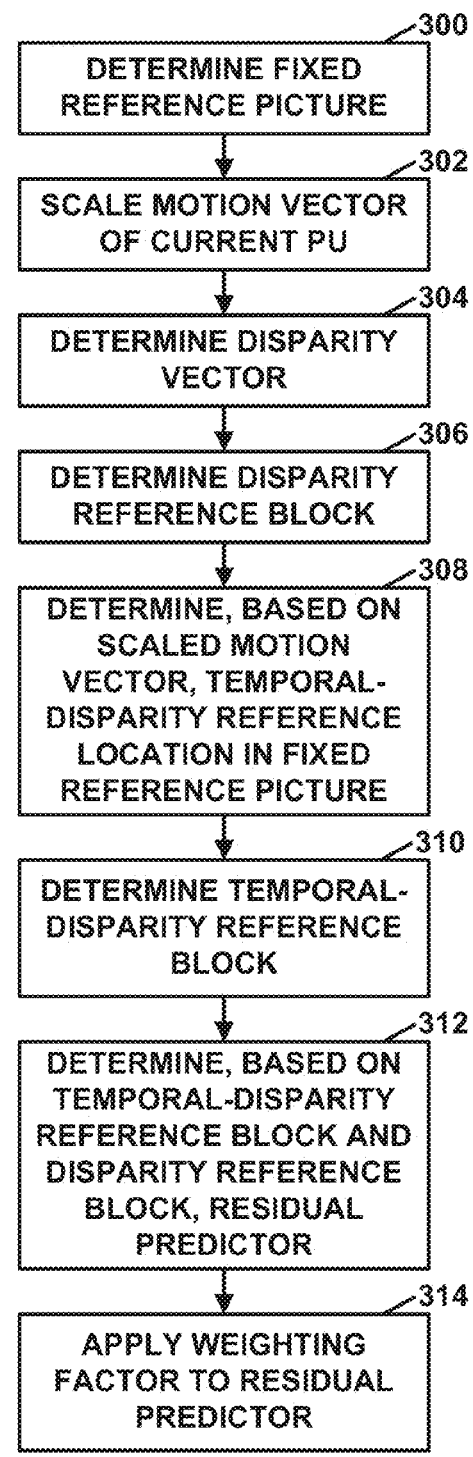
FIG. 11 is a flowchart illustrating an example operation of a video coder to determine a residual predictor for a current PU, in accordance with one or more techniques of this disclosure.

FIG. 11 is a flowchart illustrating an example operation of a video coder to determine a residual predictor for a current PU, in accordance with one or more techniques of this disclosure. In the example of FIG. 11, the video coder (e.g., video encoder 20 or video decoder 30) determines a fixed reference picture (300). The video coder may determine the fixed reference picture in accordance with any of the example techniques for determining a fixed reference picture provided elsewhere in this disclosure.

Furthermore, in the example of FIG. 11, the video coder scales a motion vector (e.g., a RefPicList0 motion vector or a RefPicList1 motion vector) of the current PU based on a POC distance in order to compensate for a difference between a Picture Order Count (POC) distance between the current picture and a temporal reference picture and a POC distance between the current picture and a fixed picture (302). For example, the video coder may scale a RefPicList0 motion vector for the current PU based on a POC distance. The POC distance may be a difference between a POC value of the current picture and a POC value of the current PU's RefPicList0 target reference picture. In this example, the video coder may scale a RefPicList1 motion vector for the current PU based on a POC distance between the current PU's RefPicList1 target reference picture and the fixed reference picture. Alternatively, the POC distance may be a difference between a POC value of the current picture and a POC value of the fixed reference picture.

In addition, the video coder may determine a disparity vector for the current PU (304). The video coder may then determine a disparity reference block (306). Samples in the disparity reference block may be actual or interpolated samples in a disparity reference picture that are associated with a location indicated by the disparity vector for the current PU. Furthermore, the video coder may determine, based on the scaled motion vector and a position in the disparity reference picture indicated by the current PU's disparity vector, a temporal-disparity reference location in the fixed reference picture (308). The video coder may then determine a temporal-disparity reference block (310). Samples in the temporal-disparity reference block may be actual or interpolated samples of the temporal-disparity reference picture that are associated with the temporal-residual disparity reference location.

Next, the video coder may determine, based on the temporal-disparity reference block and the disparity reference block, a residual predictor (312). In some examples, each sample in the residual predictor indicates a difference between a sample in the disparity reference block and a corresponding sample in the temporal-disparity reference block. After determining the residual predictor, the video coder may apply a weighting factor to the residual predictor (314).

Figure 12:
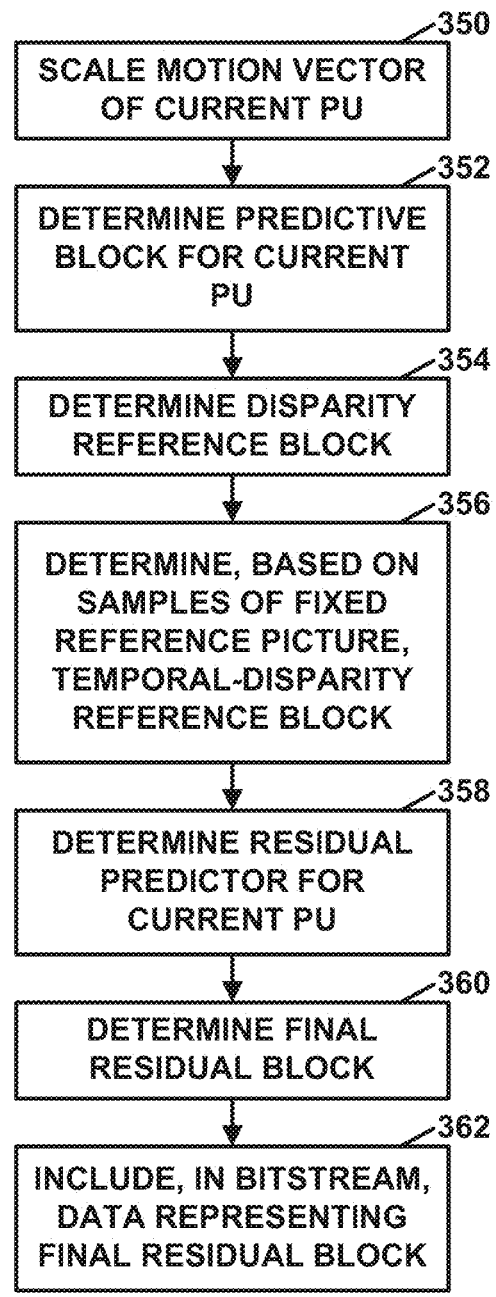
FIG. 12 is a flowchart illustrating an example operation of a video encoder, in accordance with one or more techniques of this disclosure.

FIG. 12 is a flowchart illustrating an example operation of video encoder 20, in accordance with one or more techniques of this disclosure. In the example of FIG. 12, video encoder 20 scales a motion vector of a current PU of a current CU of a current picture in order to compensate for a difference between a Picture Order Count (POC) distance between the current picture and a temporal reference picture and a POC distance between the current picture and a fixed picture (350). In the example of FIG. 12, the current picture is in a current view and is in a current access unit, a disparity reference picture is in a reference view and is in the current access unit, the temporal reference picture is in the current view but is not in the current access unit, a reference index of the current PU indicates a position of the temporal reference picture within a reference picture list of the current picture.

Furthermore, in the example of FIG. 12, video encoder 20 determines a predictive block for the current PU (352). In addition, video encoder 20 may determine a disparity reference block based on samples of the disparity reference picture that are associated with a location indicated by a disparity vector of the current PU (354). Video encoder 20 may also determine, based on samples of the fixed reference picture that are associated with a location indicated by the scaled motion vector and the disparity vector of the current PU, a temporal-disparity reference block for the current PU (356). In addition, video encoder 20 may determine a residual predictor for the current PU (358). In this example, each sample of the residual predictor for the current PU indicates a difference between a sample of the temporal-disparity reference block for the current PU and a corresponding sample of the disparity reference block. Furthermore, in this example, video encoder 20 may determine a final residual block for the current CU (360). In this example, the final residual block comprises samples that indicate differences between samples in a coding block for the current CU, samples in the prediction block for the current PU, and samples in the residual predictor for the current PU. The final residual block may also comprise samples that indicate differences between samples in the coding block for the current CU, samples in prediction blocks for one or more other PUs of the current CU, and samples in residual predictors for the one or more other PUs of the current CU. Video encoder 20 may include, in a bitstream, data that represent the final residual block for the current CU (362).

Figure 13:
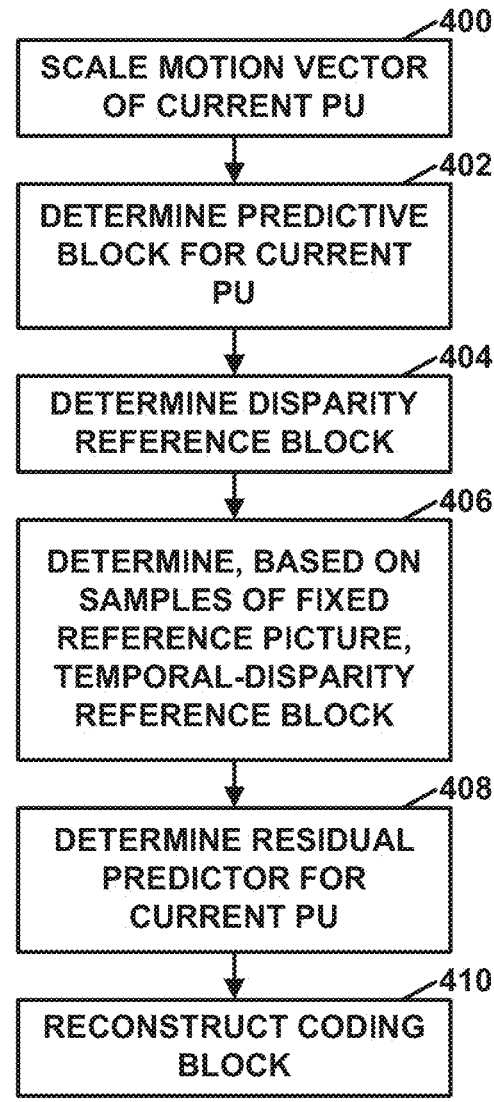
FIG. 13 is a flowchart illustrating an example operation of a video decoder, in accordance with one or more techniques of this disclosure.

FIG. 13 is a flowchart illustrating an example operation of video decoder 30, in accordance with one or more techniques of this disclosure. In the example of FIG. 13, video decoder 30 may scale a motion vector of a current PU of a current picture in order to compensate for a difference between a Picture Order Count (POC) distance between the current picture and a temporal reference picture and a POC distance between the current picture and a fixed picture (400). In the example of FIG. 13, the current picture is in a current view and is in a current access unit, a disparity reference picture is in a reference view and is in the current access unit, the temporal reference picture is in the current view but is not in the current access unit, and a reference index of the current PU indicates a position of the temporal reference picture within a reference picture list of the current picture.

Furthermore, in the example of FIG. 13, video decoder 30 determines a predictive block for the current PU (402). In addition, video decoder 30 determines a disparity reference block based on samples of the disparity reference picture at a location indicated by a disparity vector of the current PU (404). Video decoder 30 also determines, based on samples of the fixed reference picture at a location indicated by the scaled motion vector and the disparity vector of the current PU, a temporal-disparity reference block for the current PU (406). In addition, video decoder 30 determines a residual predictor for the current PU (408). Each sample of the residual predictor for the current PU may indicate a difference between a sample of the temporal-disparity reference block for the current PU and a corresponding sample of the disparity reference block. In the example of FIG. 13, video decoder 30 reconstructs a coding block based on a signaled residual block, the residual predictor for the current PU, and the predictive block for the current PU (410).

In a first example, this disclosure describes a method of decoding video data, the method comprising: performing a residual prediction process in response to determining that residual prediction is enabled for a current video unit, wherein the current video unit belongs to a current picture that is in a current view of a current access unit, the residual prediction process comprising: decoding, from a bitstream, a weighting factor index; scaling, based at least in part on a temporal difference between a fixed reference picture and a reference picture indicated by a reference index of the current video unit, a motion vector of the current video unit; determining, based at least in part on a disparity vector of the current video unit, a reference video unit in a reference view of the current access unit; determining, based at least in part on the scaled motion vector, a position of a sample block of the reference video unit, and samples of the fixed reference picture, a reference block of the fixed reference picture; determining, based at least in part on the sample block of the reference video unit and the reference block of the fixed reference picture, a residual predictor block; and determining, based at least in part on a signaled residual block for the current video unit, the weighting factor index, and the residual predictor block, a residual block for the current video unit; and reconstructing, based at least in part on the residual block for the current video unit and a predictive block for the current video unit, a sample block for the current video unit.

Furthermore, in the first example, the fixed reference picture is in the reference view and has a POC value that matches a POC value of a reference picture in a reference picture list for a current slice of the current picture. In this example the method may further comprise replacing a first entry in a reference picture list of the reference video unit when the reference picture list of the reference video unit does not include the reference picture that has the POC value that matches the POC value of the fixed reference picture.

In the first example, the fixed reference picture is a first fixed reference picture, the reference index of the current video unit is a first reference index of the current video unit, the motion vector of the current video unit is a first motion vector of the current video unit, a POC value of the first fixed reference picture matches a POC value of a reference picture in a first reference picture list for a current slice of the current picture, a POC value of a second fixed reference picture matches a POC value of a reference picture in a second reference picture list for the current slice, the method further comprises: scaling, based at least in part on a temporal difference between the second fixed reference picture and a reference picture indicated by a second reference index of the current video unit, a second motion vector of the current video unit; and determining, based at least in part on the scaled motion vector, the position of the sample block of the reference video unit, and samples of the second fixed reference picture, a reference block of the second fixed reference picture; and wherein determining the residual predictor block comprises: determining, based at least in part on the reference block of the first fixed reference picture and the reference block of the second fixed reference picture, a combined reference block; and determining, based at least in part on differences between the sample block of the reference video unit and the combined reference block, the residual predictor block.

In the first example, the fixed reference picture may correspond to the first entry in a reference picture list of a current slice of the current picture. Furthermore, in the first example, a POC value of the fixed reference picture may be closer to a POC value of the current picture than POC values of any other reference pictures in a reference picture list of a current slice of the current picture. In addition, in the first example, a POC value of the fixed reference picture may be closer to a POC value of the current picture than POC values of any other reference pictures that belong to the reference view and that are in a reference picture list of a current slice of the current picture. Furthermore, in the first example, a temporal identifier of the fixed reference picture may be lower than temporal identifiers of any other reference picture in a reference picture list of a current slice of the current picture. Furthermore, in the first example, a temporal identifier of the fixed reference picture is lower than temporal identifiers of any other reference picture that belongs to the reference view and that are in a reference picture list of a current slice of the current picture. Furthermore, in the first example, a quantization parameter of the fixed reference picture may be lower than quantization parameters of any other reference picture in a reference picture list of a current slice of the current picture. Furthermore, in the first example, a quantization parameter of the fixed reference picture may be lower than quantization parameters of any other reference picture that belongs to the reference view and that are in a reference picture list of the current picture. Furthermore, in the first example, the method may further comprise performing a NBDV derivation process to determine the disparity vector for the current video unit, and the fixed reference picture is a first or a second candidate picture used in the NBDV derivation process. Furthermore, in the first example, the fixed reference picture may be signaled in a slice header, a picture parameter set, or a video parameter set. Furthermore, in the first example, the method may further comprise determining, based at least in part on the scaled motion vector for the current video unit, the predictive block for the current video unit. Furthermore, in the first example, the method may further comprise after scaling the motion vector, rounding the motion vector of the current video unit to integer precision; and determining the reference block of the fixed reference picture may comprise determining, based on the rounded scaled motion vector and the position of the sample block of the reference video unit, the reference block of the fixed reference picture. Furthermore, in the first example, wherein the motion vector of the current video unit may have sub-pixel precision, determining the reference block of the fixed reference picture may comprise applying a bi-linear interpolation filter to generate the reference block of the fixed reference picture, and the method may further comprise applying the bi-linear interpolation filter to samples of the reference picture indicated by the reference index of the current video unit to generate the predictive block for the current video unit. Furthermore, in the first example, the residual prediction process may be enabled for a luma block of the current video unit, but not a chroma block of the current video unit. Furthermore, in the first example, the residual prediction process may be enabled for a chroma block of the current video unit, but not a luma block of the current video unit. Furthermore, in the first example, the method may further comprise: generating a merge candidate list for the current video unit, the merge candidate list including one or more merge candidates, wherein each of the one or more merge candidates includes a motion vector, a reference index and a weighting factor index; and determining a selected merge candidate from the merge candidate list, wherein the motion vector of the selected merge candidate is the motion vector of the current video unit and the reference index of the selected merge candidate is the reference index of the current video unit, determining the residual predictor block may comprise: determining the residual predictor block based at least in part on differences between the sample block of the reference video unit and the reference block; and modifying the residual predictor block such that, for each respective sample in the residual predictor block, the respective sample is approximately equal to an original value of the respective sample multiplied by a weighting factor associated with the weighting factor index of the selected merge candidate. Furthermore, in the first example, the current video unit may be a current PU of a current CU, the method may further comprise: when the current PU is coded using merge mode, a merging candidate index of the current PU is equal to 0, and the current CU is partitioned according to a 2N×2N partitioning mode: decoding, from a bitstream, a weighting factor index for the current PU; and modifying the residual predictor block such that, for each respective sample in the residual predictor block, the respective sample is approximately equal to an original value of the respective sample multiplied by a weighting factor associated with the weighting factor index; and when the current PU is not coded using merge mode, the merging candidate index of the current PU is not equal to 0, or the current CU is not partitioned according to a 2N×2N partitioning mode: determining the residual block for the current PU based on the signaled residual block for the current PU and not the residual predictor block. Furthermore, in the first example, the fixed reference picture may be a reference picture in a reference picture list of a slice of the reference picture indicated by the reference index of the current video unit, the fixed reference picture has the same POC value as an assigned picture in a reference picture list of a current slice of the current picture, and the assigned picture is a temporal reference picture that has a smallest reference picture index in the reference picture list of the current slice of the current picture. Furthermore, in the first example, when a picture within the same access unit as an assigned picture of the current view is not present in a reference picture list of the reference picture indicated by the reference index of the current video unit, the fixed reference picture may be a temporal reference picture in a reference picture list of a current slice of the current picture. Furthermore, the methods of the first example may be applied to scalable video coding, wherein a view is treated as a layer and the disparity vector is treated as zero motion vector. Furthermore, a video decoding device comprising one or more processors may be configured to perform any of the methods of the first example. Furthermore, a computer-readable storage medium may have instructions stored thereon that, when executed, configure a video decoding device to perform any of the methods of the first example.

In a second example, a video encoder performs a method of encoding video data, the method comprising: performing a residual prediction process in response to determining that residual prediction is enabled for a current video unit, wherein the current video unit belongs to a current picture that is in a current view of a current access unit, the residual prediction process comprising: scaling, based at least in part on a temporal difference between a fixed reference picture and a reference picture indicated by a reference index of the current video unit, a motion vector of the current video unit; determining, based at least in part on a disparity vector of the current video unit, a reference video unit in a reference view of the current access unit; determining, based at least in part on the scaled motion vector, a position of a sample block of the reference video unit, and samples of the fixed reference picture, a reference block of the fixed reference picture; determining, based at least in part on the sample block of the reference video unit and the reference block of the fixed reference picture, a residual predictor block; determining, based at least in part on a sample block for the current video unit and a current-view reference block, an initial residual block for the current video unit, wherein the current-view reference block is based on samples, in the reference picture indicated by the reference index of the current video unit, at a location indicated by the motion vector of the current video unit; determining, based at least in part on the initial residual block for the current video unit and the residual predictor block, a final residual block for the current video unit; and signaling, in a bitstream, the final residual block for the current video unit. Furthermore, in the second example, the fixed reference picture may be in the reference view and may have a POC value that matches a POC value of a reference picture in a reference picture list for a current slice of the current picture. Furthermore, in the second example, the method may further comprise replacing a first entry in a reference picture list of the reference video unit when the reference picture list of the reference video unit does not include the reference picture that has the POC value that matches the POC value of the fixed reference picture. Furthermore, in the second example, the fixed reference picture may be a first fixed reference picture, the reference index of the current video unit may be a first reference index of the current video unit, the motion vector of the current video unit is a first motion vector of the current video unit, a POC value of the first fixed reference picture may match a POC value of a reference picture in a first reference picture list for a current slice of the current picture, a POC value of a second fixed reference picture may match a POC value of a reference picture in a second reference picture list for the current slice, the method may further comprise: scaling, based at least in part on a temporal difference between the second fixed reference picture and a reference picture indicated by a second reference index of the current video unit, a second motion vector of the current video unit; and determining, based at least in part on the scaled motion vector, the position of the sample block of the reference video unit, and samples of the second fixed reference picture, a reference block of the second fixed reference picture; and wherein determining the residual predictor block comprises: determining, based at least in part on the reference block of the first fixed reference picture and the reference block of the second fixed reference picture, a combined reference block; and determining, based at least in part on differences between the sample block of the reference video unit and the combined reference block, the residual predictor block. Furthermore, in the second example, the fixed reference picture may correspond to the first entry in a reference picture list of a current slice of the current picture. Furthermore, in the second example, a POC value of the fixed reference picture may be closer to a POC value of the current picture than POC values of any other reference pictures in a reference picture list of a current slice of the current picture. Furthermore, in the second example, a POC value of the fixed reference picture may be closer to a POC value of the current picture than POC values of any other reference pictures that belong to the reference view and that are in a reference picture list of a current slice of the current picture. Furthermore, in the second example, a temporal identifier of the fixed reference picture may be lower than temporal identifiers of any other reference picture in a reference picture list of a current slice of the current picture. Furthermore, in the second example, a temporal identifier of the fixed reference picture may be lower than temporal identifiers of any other reference picture that belongs to the reference view and that are in a reference picture list of a current slice of the current picture. Furthermore, in the second example, a quantization parameter of the fixed reference picture may be lower than quantization parameters of any other reference picture in a reference picture list of a current slice of the current picture. Furthermore, in the second example, a quantization parameter of the fixed reference picture may be lower than quantization parameters of any other reference picture that belongs to the reference view and that are in a reference picture list of the current picture. Furthermore, in the second example, the method further may comprise performing a NBDV derivation process to determine the disparity vector for the current video unit, and wherein the fixed reference picture is a first or a second candidate picture used in the NBDV derivation process. Furthermore, in the second example, the fixed reference picture may be signaled in a slice header, a picture parameter set, or a video parameter set. Furthermore, in the second example, the method may further comprise determining, based at least in part on the scaled motion vector for the current video unit, the predictive block for the current video unit. Furthermore, in the second example, the method may further comprise after scaling the motion vector, rounding the motion vector of the current video unit to integer precision; and determining the reference block of the fixed reference picture comprises determining, based on the rounded scaled motion vector and the position of the sample block of the reference video unit, the reference block of the fixed reference picture. Furthermore, in the second example, the motion vector of the current video unit may have sub-pixel precision, wherein determining the reference block of the fixed reference picture may comprise applying a bi-linear interpolation filter to generate the reference block of the fixed reference picture, and wherein the method may further comprise applying the bi-linear interpolation filter to samples of the reference picture indicated by the reference index of the current video unit to generate the predictive block for the current video unit. Furthermore, in the second example, the residual prediction process may be enabled for a luma block of the current video unit, but not a chroma block of the current video unit. Furthermore, in the second example, the residual prediction process may be enabled for a chroma block of the current video unit, but not a luma block of the current video unit. Furthermore, in the second example, the method may further comprise: generating a merge candidate list for the current video unit, the merge candidate list including one or more merge candidates, wherein each of the one or more merge candidates includes a motion vector, a reference index and a weighting factor index; and selecting a merge candidate from the merge candidate list, wherein the motion vector of the selected merge candidate is the motion vector of the current video unit and the reference index of the selected merge candidate is the reference index of the current video unit, wherein determining the residual predictor block comprises: determining the residual predictor block based at least in part on differences between the sample block of the reference video unit and the reference block; and modifying the residual predictor block such that, for each respective sample in the residual predictor block, the respective sample is approximately equal to an original value of the respective sample multiplied by a weighting factor associated with the weighting factor index of the selected merge candidate. Furthermore, in the second example, the current video unit may be a current PU of a current CU, the method may further comprise: when the current PU is coded using merge mode, a merging candidate index of the current PU is equal to 0, and the current CU is partitioned according to a 2N×2N partitioning mode: including, in the bitstream, a weighting factor index for the current PU; and modifying the residual predictor block such that, for each respective sample in the residual predictor block, the respective sample is approximately equal to an original value of the respective sample multiplied by a weighting factor associated with the weighting factor index; and when the current PU is not coded using merge mode, the merging candidate index of the current PU is not equal to 0, or the current CU is not partitioned according to a 2N×2N partitioning mode: determining the residual block for the current PU based on the signaled residual block for the current PU and not the residual predictor block. Furthermore, in the second example, the fixed reference picture may be a reference picture in a reference picture list of a slice of the reference picture indicated by the reference index of the current video unit, the fixed reference picture may have the same POC value as an assigned picture in a reference picture list of a current slice of the current picture, and the assigned picture may be a temporal reference picture that has a smallest reference picture index in the reference picture list of the current slice of the current picture. Furthermore, in the second example, when a picture within the same access unit as an assigned picture of the current view is not present in a reference picture list of the reference picture indicated by the reference index of the current video unit, the fixed reference picture may be a temporal reference picture in a reference picture list of a current slice of the current picture. A video encoding device may comprise means for performing any of the methods of the second example. A computer-readable storage medium may have instructions stored thereon that, when executed, configure a video encoding device to perform any of the methods of the second example.

In a third example, a video decoder may perform a method of decoding video data, the method comprising: decoding, from a SVC bitstream, a weighting factor index for a current PU in a current layer of the bitstream; determining a reference PU, wherein the reference PU is in a same time instance as the current PU and in a reference layer of the bitstream; determining, based on a motion vector of the current PU, a position of a sample block of the reference PU, and samples of a reference layer picture, a reference block of the reference layer picture, wherein the reference layer picture is in the reference layer and in a different time instance than the current PU or the reference PU; determining, based at least in part on a sample block of the reference PU and the reference block of the reference layer picture, a residual predictor block; and generating, based on a signaled residual block for the current PU, a predictive block for the current PU, a weighting factor associated with the weighting factor index, and the residual predictor block, a reconstructed sample block for the current PU. A video decoding device may comprises one or more processors configured to perform the method of the third example. Furthermore, a video decoding device may comprise means for performing the method of the third example. A computer-readable medium may have instructions stored thereon that, when executed, configure a video decoding device to perform the method of the third example.

In a fourth example, a video encoder may perform a method of encoding video data, the method comprising: signaling, in a SVC bitstream, a weighting factor index for a current PU in a current layer of the bitstream; determining a reference PU, wherein the reference PU is in a same time instance as the current PU and in a reference layer of the bitstream; determining, based on a motion vector of the current PU, a position of the reference PU, and sample of a reference layer picture, a reference block of the reference layer picture, wherein the reference layer picture is in the reference layer and in a different time instance than the current PU or the reference PU; determining, based at least in part on a sample block of the reference PU and the reference block of the reference layer picture, a residual predictor block; determining, based at least in part on a sample block for the current PU and a current-view reference block, an initial residual block for the current PU, wherein the current-view reference block is based on samples, in the reference picture indicated by the reference index of the current PU, at a location indicated by the motion vector of the current PU; determining, based on the initial residual block for the current PU, a predictive block for the current PU, a weighting factor associated with the weighting factor index, and the residual predictor block, a final residual block for the current PU; and signaling, in a bitstream, the final residual block for the current PU. A video decoding device may comprise one or more processors configured to perform the method of the fourth example. A video encoding device may comprise means for performing the method of the fourth example. In a fifth example, a computer-readable medium may have instructions stored thereon that, when executed, configure a video decoding device to perform the method of the fourth example.

In a sixth example, a video decoder may perform a method of decoding video data, the method comprising: determining, based at least in part on a disparity vector of a current video unit that belongs to a current picture in a current view of a current access unit, a reference video unit in a reference view of the current access unit; rounding a motion vector of the current video unit from sub-pel precision to integer-pel precision; determining, based at least in part on the rounded motion vector, a position of a sample block of the reference video unit, and samples of a reference picture in the reference view of a reference access unit, a reference block; determining, based at least in part on differences between the sample block of the reference video unit and the reference block, a residual predictor block; determining, based at least in part on a signaled residual block for the current video unit and the residual predictor block, a residual block for the current video unit; and reconstructing, based at least in part on the residual block for the current video unit and a predictive block for the current video unit, a sample block for the current video unit. Furthermore, in the sixth example, the method may further comprise rounding the disparity vector of the current video unit from sub-pel precision to integer-pel precision. Furthermore, in the sixth example, the reference picture may be a first reference picture and the method may further comprise determining, based at least in part on the rounded motion vector, a position of a sample block of the current video unit, and samples of a second reference picture, the predictive block for the current video unit, wherein a reference index of the current video unit indicates the second reference picture. Furthermore, in the sixth example, the reference picture may be a first reference picture, prior to rounding the motion vector of the current video unit, the motion vector may be a sub-pel motion vector, and the method may further comprise determining, based at least in part on the sub-pel motion vector, a position of a sample block of the current video unit, and samples of a second reference picture, the predictive block for the current video unit, wherein a reference index of the current video unit indicates the second reference picture. Furthermore, in the sixth example, a horizontal component of the rounded motion vector may be equal to (mv[0]>>2)<<2 and a vertical component of the rounded motion vector may be equal to (mv[1]>2)<<2, wherein mv[0] denotes a horizontal component of the motion vector prior to rounding and mv[1] denotes a vertical component of the motion vector prior to rounding. Furthermore, in the sixth example, a horizontal component of the rounded motion vector may be equal to ((mv[0]+2)>>2)<<2 and a vertical component of the rounded motion vector is equal to ((mv[1]+2)>>2)<<2, wherein mv[0] denotes a horizontal component of the motion vector prior to rounding and mv[1] denotes a vertical component of the motion vector prior to rounding. Furthermore, in the sixth example, a horizontal component of the rounded motion vector may be equal to ((mv[0]+sign(mv[0])*2)>>2)<<2 and a vertical component of the rounded motion vector may be equal to ((mv[1]+sign(mv[1])*2)>>2)<<2, wherein mv[0] denotes a horizontal component of the motion vector prior to rounding, mv[1] denotes a vertical component of the motion vector prior to rounding, and sign( ) is a function that return 1 if a parameter of the function is greater than or equal to 0 and returns 0 otherwise. A video decoding device may comprise one or more processors configured to perform any of the methods of the sixth example. A video decoding device may comprise means for performing any of the methods of the sixth example. A computer-readable storage medium may have instructions stored thereon that, when executed, configure a video decoding device to perform any of the methods of the sixth example.

In a seventh example, a video encoder may perform a method of encoding video data, the method comprising: determining, based at least in part on a disparity vector of a current video unit that belongs to a current picture in a current view of a current access unit, a reference video unit in a reference view of the current access unit; rounding a motion vector of the current video unit from sub-pel precision to integer-pel precision; determining, based at least in part on the rounded motion vector, a position of a sample block of the reference video unit, and samples of a first reference picture in the reference view of a reference access unit, a first reference block; determining, based at least in part on differences between the sample block of the reference video unit and the first reference block, a residual predictor block; determining, based at least in part on the motion vector of the current video unit and samples within a second reference picture, a second reference block, wherein a reference index of the current video unit indicates the second reference picture; determining, based at least in part on a sample block for the current video unit and the second reference block, an initial residual block for the current video unit; determining, based at least in part on differences between the initial residual block for the current video unit and the residual predictor block, a final residual block for the current video unit; and signaling, in a bitstream, the final residual block for the current video unit. Furthermore, in the seventh example, the method may further comprise rounding the disparity vector of the current video unit from sub-pel precision to integer-pel precision. Furthermore, in the seventh example, determining the second reference block may comprise determining, based at least in part on the rounded motion vector and the samples within the second reference picture, the second reference block. Furthermore, in the seventh example, prior to rounding the motion vector of the current video unit, the motion vector may be a sub-pel motion vector, and determining the second reference block may comprise determining, based at least in part on the sub-pel motion vector and samples within second reference picture, the second reference block. Furthermore, in the seventh example, a horizontal component of the rounded motion vector may be equal to (mv[0]>>2)<<2 and a vertical component of the rounded motion vector may be equal to (mv[1]>>2)<<2, wherein mv[0] denotes a horizontal component of the motion vector prior to rounding and mv[1] denotes a vertical component of the motion vector prior to rounding. Furthermore, in the seventh example, a horizontal component of the rounded motion vector may be equal to ((mv[0]+2)>>2)<<2 and a vertical component of the rounded motion vector may be equal to ((mv[1]+2)>>2)<<2, wherein mv[0] denotes a horizontal component of the motion vector prior to rounding and mv[1] denotes a vertical component of the motion vector prior to rounding. Furthermore, in the seventh example, a horizontal component of the rounded motion vector may be equal to ((mv[0]+sign(mv[0])*2)>>2)<<2 and a vertical component of the rounded motion vector may be equal to ((mv[1]+sign(mv[1])*2)>>2)<<2, wherein mv[0] denotes a horizontal component of the motion vector prior to rounding, mv[1] denotes a vertical component of the motion vector prior to rounding, and sign( ) is a function that return 1 if a parameter of the function is greater than or equal to 0 and returns 0 otherwise. A video encoding device comprising one or more processors may be configured to perform any of the methods of the seventh example. A video encoding device may comprise means for performing any of the methods of the seventh example. A computer-readable storage medium may have instructions stored thereon that, when executed, configure a video encoding device to perform any of the methods of the seventh example.

In an eighth example, a video decoder may perform a method of decoding video data, the method comprising: determining, based at least in part on a disparity vector of a current video unit that belongs to a current picture in a current view of a current access unit, a reference video unit in a reference view of the current access unit, wherein a motion vector of the current video unit has sub-pel precision; applying a bi-linear interpolation filter to samples of a reference picture in order to generate a reference block that corresponds to a region within the reference picture, wherein the reference picture is in the reference view of a reference access unit and the motion vector indicates a spatial displacement between a sample block of the reference video unit and the region within the reference picture; determining, based at least in part on the sample block of the reference video unit and the reference block, a residual predictor block; determining, based at least in part on a signaled residual block for the current video unit and the residual predictor block, a final residual block for the current video unit; and reconstructing, based at least in part on the final residual block for the current video unit and a predictive block for the current video unit, a sample block for the current video unit. A video decoding device comprising one or more processors may be configured to perform the method of the eighth example. A video decoding device may comprise means for performing the method of the eighth example. A computer-readable storage medium may have instructions stored thereon that, when executed, configure a video decoding device to perform the method of the eighth example.

In a ninth example, a video encoder may perform a method of encoding video data, the method comprising: determining, based at least in part on a disparity vector of a current video unit that belongs to a current picture in a current view of a current access unit, a reference video unit in a reference view of the current access unit, wherein a motion vector of the current video unit has sub-pel precision; applying a bi-linear interpolation filter to samples of a reference picture in order to generate a first reference block, wherein the first reference block corresponds to a region within the reference picture, the reference picture is in the reference view of a reference access unit, and the motion vector indicates a spatial displacement between a sample block of the reference video unit and the region within the reference picture; determining, based at least in part on differences between a sample block of the reference video unit and the first reference block, a residual predictor block; determining, based at least in part on the motion vector of the current video unit and samples within a second reference picture, a second reference block, wherein a reference index of the current video unit indicates the second reference picture; determining, based at least in part on differences between a sample block for the current video unit and the second reference block, an initial residual block for the current video unit; determining, based at least in part on differences between the initial residual block for the current video unit and the residual predictor block, a final residual block for the current video unit; and signaling, in a bitstream, the final residual block for the current video unit. A video encoding device may comprise one or more processors configured to perform the method of the ninth example. A video encoding device may comprise means for performing the method of the ninth example. A computer-readable storage medium may have instructions stored thereon that, when executed, configure a video encoding device to perform the method of the ninth example.

In a tenth example, a video decoder may perform a method of decoding video data, the method comprising: performing a residual prediction process for a luma block of a current video unit that belongs to a current picture in a current view of a current access unit, but not a chroma block of the current video unit, wherein the current video unit belongs to a current picture that is in a current view of a current access unit, the residual prediction process comprising: determining, based at least in part on a disparity vector of the current video unit, a reference video unit in a reference view of the current access unit; determining, based at least in part on a motion vector of the current video unit, a position of a luma sample block of the reference video unit, and luma samples of a reference picture, a luma reference block; determining, based at least in part on the luma sample block of the reference video unit and the luma reference block of the reference picture, a luma residual predictor block; and determining, based at least in part on a signaled luma residual block for the current video unit and the luma residual predictor block, a luma residual block for the current video unit; and reconstructing, based at least in part on the luma residual block for the current video unit and a luma predictive block for the current video unit, a luma sample block for the current video unit. A video decoding device may comprise one or more processors configured to perform the method of the tenth example. A video decoding device may comprise means for performing the method of the tenth example. A computer-readable storage medium may have instructions stored thereon that, when executed, configure a video decoding device to perform the method of the tenth example.

In an eleventh example, a video encoder may perform a method of encoding video data, the method comprising: performing a residual prediction process for a luma block of a current video unit, but not a chroma block of the current video unit, wherein the current video unit belongs to a current picture that is in a current view of a current access unit, the residual prediction process comprising: determining, based at least in part on a disparity vector of the current video unit, a reference video unit in a reference view of the current access unit; determining, based at least in part on a motion vector of the current video unit, a position of a luma sample block of the reference video unit, and luma samples of a reference picture, a first luma reference block; determining, based at least in part on the luma sample block of the reference video unit and the first luma reference block, a luma residual predictor block; determining, based at least in part on the motion vector of the current video unit and luma samples within a second reference picture, a second luma reference block, wherein a reference index of the current video unit indicates the second reference picture; determining, based at least in part on differences between a luma sample block for the current video unit and the second luma reference block, an initial luma residual block for the current video unit; determining, based at least in part on differences between the initial luma residual block for the current video unit and the luma residual predictor block, a final luma residual block for the current video unit; and signaling, in a bitstream, the final luma residual block for the current video unit. A video encoding device may comprise one or more processors configured to perform the method of the eleventh example. A video encoding device may comprise means for performing the method of the eleventh example. A computer-readable storage medium may have instructions stored thereon that, when executed, configure a video encoding device to perform the method of the eleventh example.

In an twelfth example, a video decoder may perform a method of decoding video data, the method comprising: performing a residual prediction process for a chroma block of a current video unit, but not a luma block of the current video unit, wherein the current video unit belongs to a current picture that is in a current view of a current access unit, the residual prediction process comprising: determining, based at least in part on a disparity vector of the current video unit, a reference video unit in a reference view of the current access unit; determining, based at least in part on a motion vector of the current video unit, a position of a luma sample block of the reference video unit, and chroma samples of a reference picture, a chroma reference block; determining, based at least in part on differences between a chroma sample block of the reference video unit and the chroma reference block, a chroma residual predictor block; and determining, based at least in part on a signaled chroma residual block for the current video unit and the chroma residual predictor block, a chroma residual block for the current video unit; and reconstructing, based at least in part on the chroma residual block for the current video unit and a chroma predictive block for the current video unit, a chroma sample block for the current video unit. A video decoding device may comprise one or more processors configured to perform the method of the twelfth example. A video decoding device may comprise means for performing the method of the twelfth example. A computer-readable storage medium may have instructions stored thereon that, when executed, configure a video decoding device to perform the method of the twelfth example.

In a thirteenth example, a video encoder may perform a method of encoding video data, the method comprising: performing a residual prediction process for a chroma block of a current video unit, but not a luma block of the current video unit, wherein the current video unit belongs to a current picture that is in a current view of a current access unit, the residual prediction process comprising: determining, based at least in part on a disparity vector of the current video unit, a reference video unit in a reference view of the current access unit; determining, based at least in part on a motion vector of the current video unit, a position of a luma sample block of the reference video unit, and chroma samples of a reference picture, a first chroma reference block; determining, based at least in part on differences between a chroma sample block of the reference video unit and the first chroma reference block, a chroma residual predictor block; determining, based at least in part on the motion vector of the current video unit and chroma samples within a second reference picture, a second chroma reference block, wherein a reference index of the current video unit indicates the second reference picture; determining, based at least in part on differences between a chroma sample block for the current video unit and the second chroma reference block, an initial chroma residual block for the current video unit; determining, based at least in part on differences between the initial chroma residual block for the current video unit and the chroma residual predictor block, a final chroma residual block for the current video unit; and signaling, in a bitstream, the final chroma residual block for the current video unit. A video encoding device may comprise one or more processors configured to perform the method of the thirteenth example. A video encoding device may comprise means for performing the method of the thirteenth example. A computer-readable storage medium may have instructions stored thereon that, when executed, configure a video encoding device to perform the method of the thirteenth example.

In a fourteenth example, a video decoder may perform a method of decoding video data, the method comprising: determining, based at least in part on a disparity vector of a current video unit that belongs to a current picture in a current view of a current access unit, a reference video unit in a reference view of the current access unit; generating a merge candidate list for the current video unit, the merge candidate list including one or more merge candidates, wherein each of the one or more merge candidates includes a motion vector, a reference index and a weighting factor index; determining a selected merge candidate from the merge candidate list, wherein the motion vector of the selected merge candidate is a motion vector of the current video unit and the reference index of the selected merge candidate is a reference index of the current video unit; determining, based at least in part on the motion vector of the current video unit, a position of a sample block of the reference video unit, and samples of a reference picture, a reference block; determining, based at least in part on differences between the sample block of the reference video unit and the reference block, a residual predictor block; modifying the residual predictor block such that, for each respective sample in the residual predictor block, the respective sample is approximately equal to an original value of the respective sample multiplied by a weighting factor associated with the weighting factor index of the selected merge candidate; determining, based at least in part on a signaled residual block for the current video unit and the residual predictor block, a residual block for the current video unit; and reconstructing, based at least in part on the residual block for the current video unit and a predictive block for the current video unit, a sample block for the current video unit. Furthermore, in the fourteenth example, the reference picture may be a fixed reference picture and the method may further comprise scaling, based at least in part on a temporal difference between the fixed reference picture and a reference picture indicated by the reference index of the current video unit, the motion vector of the current video unit. Furthermore, in the fourteenth example, the method may further comprise rounding the motion vector of the current video unit from sub-pel precision to integer-pel precision. A video decoding device may comprise one or more processors configured to perform any of the methods of the fourteenth example. A video decoding device may comprise means for performing any of the methods of the fourteenth example.

In a fifteenth example, a video encoder may perform a method of encoding video data, the method comprising: determining, based at least in part on a disparity vector of a current video unit that belongs to a current picture in a current view of a current access unit, a reference video unit in a reference view of the current access unit; generating a merge candidate list for the current video unit, the merge candidate list including one or more merge candidates, wherein each of the one or more merge candidates includes a motion vector, a reference index and a weighting factor index; determining a selected merge candidate from the merge candidate list, wherein the motion vector of the selected merge candidate is a motion vector of the current video unit and the reference index of the selected merge candidate is a reference index of the current video unit; determining, based at least in part on the motion vector of the current video unit, a position of a sample block of the reference video unit, and samples of a first reference picture, a first reference block; determining, based at least in part on differences between the sample block of the reference video unit and the first reference block, a residual predictor block; modifying the residual predictor block such that, for each respective sample in the residual predictor block, the respective sample is approximately equal to an original value of the respective sample multiplied by a weighting factor associated with the weighting factor index of the selected merge candidate; determining, based at least in part on the motion vector of the current video unit and samples within a second reference picture, a second reference block, wherein the reference index of the current video unit indicates the second reference picture; determining, based at least in part on differences between a sample block for the current video unit and the second reference block, an initial residual block for the current video unit; determining, based at least in part on differences between the initial residual block for the current video unit and the residual predictor block, a final residual block for the current video unit; and signaling, in a bitstream, the final residual block for the current video unit. Furthermore, in the fifteenth example, the first reference picture may be a fixed reference picture and the method may further comprise scaling, based at least in part on a temporal difference between the fixed reference picture and the second reference picture, the motion vector of the current video unit. Furthermore, in the fifteenth example, the method may further comprise rounding the motion vector of the current video unit from sub-pel precision to integer-pel precision. A video encoding device may comprise one or more processors configured to perform any of the methods of the fifteenth example. A video encoding device may comprise means for performing any of the methods of the fifteenth example. A computer-readable storage medium may have instructions stored thereon that, when executed, configure a video encoding device to perform any of the methods of the fifteenth example.

In a sixteenth example, a video decoder may perform a method of decoding video data, the method comprising: determining, based at least in part on a disparity vector of a current PU that belongs to a current CU of a current picture in a current view of a current access unit, a reference PU in a reference view of the current access unit; determining, based at least in part on a motion vector of the current PU, a position of a sample block of the reference PU, and samples of a reference picture, a reference block; determining, based at least in part on differences between the sample block of the reference PU and the reference block, a residual predictor block; when the current PU is coded using merge mode, a merging candidate index of the current PU is equal to 0, and the current CU is partitioned according to a 2N×2N partitioning mode: decoding, from a bitstream, a weighting factor index for the current PU; and modifying the residual predictor block such that, for each respective sample in the residual predictor block, the respective sample is approximately equal to an original value of the respective sample multiplied by a weighting factor associated with the weighting factor index; determining, based at least in part on a signaled residual block for the current PU and the residual predictor block, a final residual block for the current PU; and when the current PU is not coded using merge mode, the merging candidate index of the current PU is not equal to 0, or the current CU is not partitioned according to a 2N×2N partitioning mode, determining the final residual block for the current PU based on a signaled residual block for the current PU and not the residual predictor block; and reconstructing, based at least in part on the final residual block for the current PU and a predictive block for the current PU, a sample block for the current CU. Furthermore, in the sixteenth example, the weighting factor index may be allowed to be equal to 0, 1, or 2, wherein a weighting factor index equal to 0 is associated with a weighting factor of 0, a weighting factor index equal to 1 is associated with a weighting factor of 1, and a weighting factor index equal to 2 is associated with a weighting factor of 0.5. Furthermore, in the sixteenth example, the weighting factor index may be a 1-bit flag. Furthermore, in the sixteenth example, when the merging candidate index of the current PU is equal to 0, a merging candidate at position 0 of a merge candidate list is derived from a view other than the current view, and the weighting factor index is equal to 0, the weighting factor associated with the weighting factor index may be equal to a first value; when the merging candidate index of the current PU is equal to 0, the merging candidate at position 0 of the merge candidate list is derived from a view other than the current view, and the weighting factor index is equal to 1, the weighting factor associated with the weighting factor index may be equal to a second value. Furthermore, in the sixteenth example, the first value may be equal to 0.5 and the second value may be equal to 1. Furthermore, in the sixteenth example, the first value may be equal to 1 and the second value may be equal to 0.5. Furthermore, in the sixteenth example, when the merging candidate index of the current PU is not equal to 0 or a merging candidate at position 0 of a merge candidate list is not derived from a view other than the current view, and the weighting factor index is equal to 0, the weighting factor associated with the weighting factor index may be equal to a first value; when the merging candidate index of the current PU is not equal to 0 or the merging candidate at position 0 of the merge candidate list is not derived from a view other than the current view, and the weighting factor index is equal to 1, the weighting factor associated with the weighting factor index may be equal to a second value. Furthermore, in the sixteenth example, wherein the first value may be equal to 0 and the second value may be equal to 1. Furthermore, in the sixteenth example, the first value may be equal to 1 and the second value may be equal to 0. Furthermore, in the sixteenth example, when the merging candidate index of the current PU is not equal to 0 or a merging candidate at position 0 of a merge candidate list is not derived from a view other than the current view, the weighting factor index may always be equal to 0. A video decoding device may comprise one or more processors configured to perform any of the methods of the sixteenth example. A video decoding device comprising means for performing any of the methods of the sixteenth example. A computer-readable storage medium may have instructions stored thereon that, when executed, configure a video decoding device to perform any of the methods of the sixteenth example.

In a seventeenth example, a video encoder may perform a method of encoding video data, the method comprising: determining, based at least in part on a disparity vector of a current PU that belongs to a current CU of a current picture in a current view of a current access unit, a reference PU in a reference view of the current access unit; determining, based at least in part on a motion vector of the current PU, a position of a sample block of the reference PU, and samples of a reference picture, a first reference block; determining, based at least in part on differences between the sample block of the reference PU and the first reference block, a residual predictor block; determining, based at least in part on the motion vector of the current PU and samples within a second reference picture, a second reference block, wherein a reference index of the current PU indicates the second reference picture; determining, based at least in part on a sample block for the current PU and the second reference block, an initial residual block for the current PU; when the current PU is coded using merge mode, a merging candidate index of the current PU is equal to 0, and the current CU is partitioned according to a 2N×2N partitioning mode: modifying the residual predictor block such that, for each respective sample in the residual predictor block, the respective sample is approximately equal to an original value of the respective sample multiplied by a weighting factor associated with a weighting factor index; determining, based at least in part on differences between the initial residual block for the current PU and the modified residual predictor block, a final residual block for the current PU; and signaling, in a bitstream, the weighting factor index and the final residual block; when the current PU is not coded using merge mode, the merging candidate index of the current PU is not equal to 0, or the current CU is not partitioned according to a 2N×2N partitioning mode: determining the final residual block for the current PU based on the initial residual block for the current PU and not the residual predictor block; and signaling, in the bitstream, the final residual block. Furthermore, in the seventeenth example, the weighting factor index may be allowed to be equal to 0, 1, or 2, wherein a weighting factor index equal to 0 is associated with a weighting factor of 0, a weighting factor index equal to 1 is associated with a weighting factor of 1, and a weighting factor index equal to 2 is associated with a weighting factor of 0.5. Furthermore, in the seventeenth example, the weighting factor index may be a 1-bit flag. Furthermore, in the seventeenth example, when the merging candidate index of the current PU is equal to 0, a merging candidate at position 0 of a merge candidate list is derived from a view other than the current view, and the weighting factor index is equal to 0, the weighting factor associated with the weighting factor index may be equal to a first value; when the merging candidate index of the current PU is equal to 0, the merging candidate at position 0 of the merge candidate list is derived from a view other than the current view, and the weighting factor index is equal to 1, the weighting factor associated with the weighting factor index may be equal to a second value. Furthermore, in the seventeenth example, the first value may be equal to 0.5 and the second value may be equal to 1. Furthermore, in the seventeenth example, the first value may be equal to 1 and the second value may be equal to 0.5. Furthermore, in the seventeenth example, when the merging candidate index of the current PU is not equal to 0 or a merging candidate at position 0 of a merge candidate list is not derived from a view other than the current view, and the weighting factor index is equal to 0, the weighting factor associated with the weighting factor index may be equal to a first value; when the merging candidate index of the current PU is not equal to 0 or the merging candidate at position 0 of the merge candidate list is not derived from a view other than the current view, and the weighting factor index is equal to 1, the weighting factor associated with the weighting factor index may be equal to a second value. Furthermore, in the seventeenth example, the first value may be equal to 0 and the second value may be equal to 1. Furthermore, in the seventeenth example, the first value may be equal to 1 and the second value may be equal to 0. Furthermore, in the seventeenth example, when the merging candidate index of the current PU is not equal to 0 or a merging candidate at position 0 of a merge candidate list is not derived from a view other than the current view, the weighting factor index may always be equal to 0. A video encoding device may comprise one or more processors configured to perform any of the methods of the seventeenth example. A video encoding device may comprise means for performing any of the methods of the seventeenth example. A computer-readable storage medium may have instructions stored thereon that, when executed, configure a video encoding device to perform any of the methods of the seventeenth example.

Any details of any of the examples above may be combined with other examples, consistent with this disclosure. In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data performed by a video decoder, the method comprising:

scaling a motion vector of a current prediction unit (PU) of a current picture in order to compensate for a difference between a Picture Order Count (POC) distance between the current picture and a temporal reference picture and a POC distance between the current picture and a fixed reference picture in a reference view,
wherein the current picture is in a current view and is in a current access unit, a disparity reference picture is in the reference view and is in the current access unit, the temporal reference picture is in the current view but is not in the current access unit, and a reference index of the current PU indicates a position of the temporal reference picture within a reference picture list of the current picture;

determining a predictive block for the current PU;

determining a disparity reference block based on samples of the disparity reference picture that are associated with a location indicated by a disparity vector of the current PU;

determining, based on samples of the fixed reference picture, a temporal-disparity reference block for the current PU, a top-left position of the temporal-disparity reference block being associated with a location indicated by a sum of a top-left position of the current PU, the scaled motion vector, and the disparity vector of the current PU;

determining a residual predictor for the current PU, wherein each sample of the residual predictor for the current PU indicates a difference between a sample of the temporal-disparity reference block for the current PU and a corresponding sample of the disparity reference block; and reconstructing a coding block based on a signaled residual block, the residual predictor for the current PU, and the predictive block for the current PU.

2. The method of claim 1, wherein, for each respective PU of the current picture, no reference picture other than the fixed reference picture is accessed when performing motion compensation in the reference view to determine, based on a motion vector associated with the reference picture list of the current picture and the disparity vector of the respective PU, a temporal-disparity reference block for the respective PU.

3. The method of claim 1, wherein:

the fixed reference picture is a first fixed reference picture, the reference picture list of the current picture is a first reference picture list of the current picture, the temporal reference picture is a first temporal reference picture, the temporal-disparity reference block is a first temporal-disparity reference block, and the motion vector of the current PU is a first motion vector of the current PU, a Picture Order Count (POC) value of the first fixed reference picture matches a POC value of a reference picture in the first reference picture list of the current picture, a POC value of a second fixed reference picture matches a POC value of a reference picture in a second reference picture list of the current picture, and the method further comprises scaling a second motion vector of the current PU in order to compensate for a temporal distance between the second fixed reference picture and a second temporal reference picture, wherein a second reference index of the current PU indicates a position, in the second reference picture list of the current picture, of the second temporal reference picture; and wherein determining the temporal-disparity reference block for the current PU comprises:
determining a first predictive temporal-disparity reference block based on samples of the first fixed reference picture at the location indicated by the scaled first motion vector;
determining a second predictive temporal-disparity reference block based on samples of the second fixed reference picture at a location indicated by the scaled second motion vector; and
determining the temporal-disparity reference block for the current PU based on the first and second predictive temporal-disparity reference blocks.

4. The method of claim 3, wherein, for each respective PU of the current picture, no reference picture other than the second fixed reference picture is accessed when performing motion compensation in the reference view to determine, based on the scaled second motion vector of the current PU and the disparity vector of the current PU, a temporal-disparity reference block for the respective PU.

5. The method of claim 1, wherein determining the predictive block for the current PU comprises determining the predictive block based on samples of an assigned reference picture that are associated with a location indicated by the scaled motion vector, wherein a Picture Order Count (POC) value of the assigned reference picture matches a POC value of the fixed reference picture and the assigned reference picture is in the same view as the current picture.

6. The method of claim 1, wherein the fixed reference picture has a picture order count (POC) value that matches a POC value of a reference picture in the reference picture list of the current picture.

7. The method of claim 1, further comprising:
determining an assigned picture that is in the current view;
when a reference picture list of the disparity reference picture includes a particular reference-view picture that has the same POC value as the assigned picture, setting the fixed reference picture to be the particular reference-view picture,
wherein one of the following criteria characterizes the assigned reference picture:
the assigned picture has a smallest reference picture index in the reference picture list of the current picture;
the POC value of the assigned picture is closer to a POC value of the current picture than POC values of any other reference pictures in the reference picture list of the current picture;
a temporal identifier of the assigned picture is lower than temporal identifiers of any other reference picture in the reference picture list of the current picture;
a quantization parameter of the assigned picture is a lowest quantization parameter among reference pictures in the reference picture list of the current PU; and
the assigned reference picture is signaled in a slice header, a picture parameter set, or a video parameter set.

8. The method of claim 7, further comprising when the reference picture list of the disparity reference picture does not include any reference picture that has the same POC value as the assigned picture, setting the fixed reference picture to be another picture in the reference picture list of the disparity reference picture.

9. The method of claim 1, where the fixed reference picture satisfies one of the following criteria:
the fixed reference picture has a smallest reference picture index in a reference picture list of the disparity reference picture;
a POC value of the fixed reference picture is closer to a POC value of the current picture than POC values of any other reference picture that belongs to the reference view;
a temporal identifier of the fixed reference picture is lower than temporal identifiers of any other reference picture of the reference view; and
a quantization parameter of the fixed reference picture is lower than quantization parameters of any other reference picture of the reference view.

10. The method of claim 1, wherein the method further comprises performing a neighboring blocks-based disparity vector (NBDV) derivation process to determine the disparity vector for the current PU, and
wherein the fixed reference picture has a POC value equal to a POC value of candidate picture used first or second in the NBDV derivation process.

11. The method of claim 1,
wherein the method further comprises after scaling the motion vector, rounding the scaled motion vector of the current PU to integer precision; and
wherein determining the temporal-disparity reference block comprises determining, based on the rounded scaled motion vector and the position of the disparity reference block, the residual predictor for the current PU.

12. The method of claim 1, wherein determining the predictive block for the current PU comprises applying a bi-linear filter to luma and chroma components of the temporal reference picture.

13. The method of claim 1, wherein determining the predictive block for the current PU comprises applying a bi-linear filter to only one of luma or chroma components of the temporal reference picture.

14. A method of encoding video data performed by a video encoder, the method comprising:
scaling a motion vector of a current prediction unit (PU) of a current coding unit (CU) of a current picture in order to compensate for a difference between a Picture Order Count (POC) distance between the current picture and a temporal reference picture and a POC distance between the current picture and a fixed reference picture in a reference view,
wherein the current picture is in a current view and is in a current access unit, a disparity reference picture is in the reference view and is in the current access unit, the temporal reference picture is in the current view but is not in the current access unit, and a reference index of the current PU indicates a position of the temporal reference picture within a reference picture list of the current picture;
determining a predictive block for the current PU;
determining a disparity reference block based on samples of the disparity reference picture that are associated with a location indicated by a disparity vector of the current PU;
determining, based on samples of the fixed reference picture, a temporal-disparity reference block for the current PU, a top-left position of the temporal-disparity reference block being associated with a location indicated by a sum of a top-left position of the current PU the scaled motion vector, and the disparity vector of the current PU;
determining a residual predictor for the current PU, wherein each sample of the residual predictor for the current PU indicates a difference between a sample of the temporal-disparity reference block for the current PU and a corresponding sample of the disparity reference block;
determining a final residual block for the current CU, wherein the final residual block comprises samples that indicate differences between samples in a coding block for the current CU, samples in the prediction block for the current PU, and samples in the residual predictor for the current PU; and
transforming samples in the final residual block to produce transform coefficients.

15. The method of claim 14, wherein, for each respective PU of the current picture, no reference picture other than the fixed reference picture is accessed when performing motion compensation in the reference view to determine, based on a motion vector associated with the reference picture list of the current picture and the disparity vector of the respective PU, a temporal-disparity reference block for the respective PU.

16. The method of claim 14, wherein:
the fixed reference picture is a first fixed reference picture, the reference picture list of the current picture is a first reference picture list of the current picture, the temporal reference picture is a first temporal reference picture, the temporal-disparity reference block is a first temporal-disparity reference block, and the motion vector of the current PU is a first motion vector of the current PU,
a Picture Order Count (POC) value of the first fixed reference picture matches a POC value of a reference picture in the first reference picture list of the current picture,
a POC value of a second fixed reference picture matches a POC value of a reference picture in a second reference picture list of the current picture, and
the method further comprises scaling a second motion vector of the current PU in order to compensate for a temporal distance between the second fixed reference picture and a second temporal reference picture, wherein a second reference index of the current PU indicates a position, in the second reference picture list of the current picture, of the second temporal reference picture; and
wherein determining the temporal-disparity reference block for the current PU comprises:
determining a first predictive temporal-disparity reference block based on samples of the first fixed reference picture at the location indicated by the scaled first motion vector;
determining a second predictive temporal-disparity reference block based on samples of the second fixed reference picture at a location indicated by the scaled second motion vector; and
determining the temporal-disparity reference block for the current PU based on the first and second predictive temporal-disparity reference blocks.

17. The method of claim 16, wherein, for each respective PU of the current picture, no reference picture other than the second fixed reference picture is accessed when performing motion compensation in the reference view to determine, based on the scaled second motion vector of the current PU and the disparity vector of the current PU, a temporal-disparity reference block for the respective PU.

18. The method of claim 14, wherein determining the predictive block for the current PU comprises determining the predictive block based on samples of an assigned reference picture that are associated with a location indicated by the scaled motion vector, wherein a Picture Order Count (POC) value of the assigned reference picture matches a POC value of the fixed reference picture and the assigned reference picture is in the same view as the current picture.

19. The method of claim 14, wherein the fixed reference picture has a picture order count (POC) value that matches a POC value of a reference picture in the reference picture list for the current picture.

20. The method of claim 14, further comprising:
determining an assigned picture that is in the current view;
when a reference picture list of the disparity reference picture includes a particular reference-view picture that has the same POC value as the assigned picture, setting the fixed reference picture to be the particular reference-view picture,
wherein one of the following criteria characterizes the assigned reference picture:
the assigned picture has a smallest reference picture index in the reference picture list of the current picture;
the POC value of the assigned picture is closer to a POC value of the current picture than POC values of any other reference pictures in the reference picture list of the current picture;
a temporal identifier of the assigned picture is lower than temporal identifiers of any other reference picture in the reference picture list of the current picture;
a quantization parameter of the assigned picture is a lowest quantization parameter among reference pictures in the reference picture list of the current PU; and
the assigned reference picture is signaled in a slice header, a picture parameter set, or a video parameter set.

21. The method of claim 20, further comprising when the reference picture list of the disparity reference picture does not include any reference picture that has the same POC value as the assigned picture, setting the fixed reference picture to be another picture in the reference picture list of the disparity reference picture.

22. The method of claim 14, where the fixed reference picture satisfies one of the following criteria:
the fixed reference picture has a smallest reference picture index in a reference picture list of the disparity reference picture;
a POC value of the fixed reference picture is closer to a POC value of the current picture than POC values of any other reference picture that belongs to the reference view;
a temporal identifier of the fixed reference picture is lower than temporal identifiers of any other reference picture of the reference view; and
a quantization parameter of the fixed reference picture is lower than quantization parameters of any other reference picture of the reference view.

23. The method of claim 14, wherein the method further comprises performing a neighboring blocks-based disparity vector (NBDV) derivation process to determine the disparity vector for the current PU, and
wherein the fixed reference picture has a POC value equal to a POC value of a candidate picture used first or second in the NBDV derivation process.

24. The method of claim 14,
wherein the method further comprises after scaling the motion vector, rounding the scaled motion vector of the current PU to integer precision; and
wherein determining the temporal-disparity reference block comprises determining, based on the rounded scaled motion vector and the position of the disparity reference block, the residual predictor for the current PU.

25. The method of claim 14, wherein determining the predictive block for the current PU comprises applying a bi-linear filter to luma and chroma components of the temporal reference picture.

26. The method of claim 14, wherein determining the predictive block for the current PU comprises applying a bi-linear filter to only one of luma or chroma components of the temporal reference picture.

27. A video coding device comprising:
a memory that stores reference pictures; and
a video coder, the video coder being a video encoder or a video decoder, the video coder being implemented as circuitry, software, or a combination of hardware and software, the video coder configured to:
scale a motion vector of a current prediction unit (PU) of a current coding unit (CU) of a current picture in order to compensate for a difference between a Picture Order Count (POC) distance between the current picture and a temporal reference picture and a POC distance between the current picture and a fixed reference picture in a reference view,
wherein the current picture is in a current view and is in a current access unit, a disparity reference picture is in the reference view and is in the current access unit, the temporal reference picture is in the current view but is not in the current access unit, and a reference index of the current PU indicates a position of the temporal reference picture within a reference picture list of the current picture;
determine a predictive block for the current PU;
determine a disparity reference block based on samples of the disparity reference picture that are associated with a location indicated by a disparity vector of the current PU;
determine, based on samples of the fixed reference picture, a temporal-disparity reference block for the current PU, a top-left position of the temporal-disparity reference block being associated with a location indicated by a sum of a top-left position of the current PU, the scaled motion vector and the disparity vector of the current PU; and
determine a residual predictor for the current PU, wherein each sample of the residual predictor for the current PU indicates a difference between a sample of the temporal-disparity reference block for the current PU and a corresponding sample of the disparity reference block.

28. The video coding device of claim 27, wherein, for each respective PU of the current picture, no reference picture other than the fixed reference picture is accessed when performing motion compensation in the reference view to determine, based on a motion vector associated with the reference picture list of the current picture and the disparity vector of the respective PU, a temporal-disparity reference block for the respective PU.

29. The video coding device of claim 27, wherein:
the fixed reference picture is a first fixed reference picture, the reference picture list of the current picture is a first reference picture list of the current picture, the temporal reference picture is a first temporal reference picture, the temporal-disparity reference block is a first temporal-disparity reference block, and the motion vector of the current PU is a first motion vector of the current PU,
a Picture Order Count (POC) value of the first fixed reference picture matches a POC value of a reference picture in the first reference picture list of the current picture,
a POC value of a second fixed reference picture matches a POC value of a reference picture in a second reference picture list of the current picture, and
the video coder is further configured to scale a second motion vector of the current PU in order to compensate for a temporal distance between the second fixed reference picture and a temporal reference picture, wherein a second reference index of the current PU indicates a position, in the second reference picture list of the current picture, of the second temporal reference picture; and
wherein to determine the temporal-disparity reference block for the current PU, the video coder:
determines a first predictive temporal-disparity reference block based on samples of the first fixed reference picture at the location indicated by the scaled first motion vector;
determines a second predictive temporal-disparity reference block based on samples of the second fixed reference picture at a location indicated by the scaled second motion vector; and
determines the temporal-disparity reference block for the current PU based on the first and second predictive temporal-disparity reference blocks.

30. The video coding device of claim 29, wherein, for each respective PU of the current picture, no reference picture other than the second fixed reference picture is accessed when performing motion compensation in the reference view to determine, based on the scaled second motion vector of the current PU and the disparity vector of the current PU, a temporal-disparity reference block for the respective PU.

31. The video coding device of claim 27, wherein to determine the predictive block for the current PU, the video coder determines the predictive block based on samples of an assigned reference picture that are associated with a location indicated by the scaled motion vector, wherein a Picture Order Count (POC) value of the assigned reference picture matches a POC value of the fixed reference picture and the assigned reference picture is in the same view as the current picture.

32. The video coding device of claim 27, wherein the fixed reference picture has a picture order count (POC) value that matches a POC value of the reference picture in a reference picture list of the current picture.

33. The video coding device of claim 27, wherein the video coder is configured to:
determine an assigned picture that is in the current view;
when a reference picture list of the disparity reference picture includes a particular reference-view picture that has the same POC value as the assigned picture, set the fixed reference picture to be the particular reference-view picture,
wherein one of the following criteria characterizes the assigned reference picture:
the assigned picture has a smallest reference picture index in the reference picture list of the current picture;
the POC value of the assigned picture is closer to a POC value of the current picture than POC values of any other reference pictures in the reference picture list of the current picture;
a temporal identifier of the assigned picture is lower than temporal identifiers of any other reference picture in the reference picture list of the current picture;
a quantization parameter of the assigned picture is a lowest quantization parameter among reference pictures in the reference picture list of the current PU; and
the assigned reference picture is signaled in a slice header, a picture parameter set, or a video parameter set.

34. The video coding device of claim 33, wherein the video coder is configured such that when the reference picture list of the disparity reference picture does not include any reference picture that has the same POC value as the assigned picture, the one or more processors set the fixed reference picture to be another picture in the reference picture list of the disparity reference picture.

35. The video coding device of claim 27, where the fixed reference picture satisfies one of the following criteria:
the fixed reference picture has a smallest reference picture index in a reference picture list of the disparity reference picture;
a POC value of the fixed reference picture is closer to a POC value of the current picture than POC values of any other reference picture that belongs to the reference view;
a temporal identifier of the fixed reference picture is lower than temporal identifiers of any other reference picture of the reference view; and
a quantization parameter of the fixed reference picture is lower than quantization parameters of any other reference picture of the reference view.

36. The video coding device of claim 27, wherein the video coder is further configured to perform a neighboring blocks-based disparity vector (NBDV) derivation process to determine the disparity vector for the current PU, and
wherein the fixed reference picture has a POC value equal to a POC value of a candidate picture used first or second in the NBDV derivation process.

37. The video coding device of claim 27,
wherein the video coder is further configured to round, after scaling the motion vector, the motion vector of the current PU to integer precision; and
wherein to determine the temporal-disparity reference block, the video coder determines, based on the rounded scaled motion vector and the position of the disparity reference block, the residual predictor for the current PU.

38. The video coding device of claim 27, wherein the video coder is configured to apply a bi-linear filter to luma and chroma components of the temporal reference picture.

39. The video coding device of claim 27, wherein the video coder is configured to apply a bi-linear filter to only one of luma or chroma components of the temporal reference picture.

40. The video coding device of claim 27, wherein the video coder is further configured to reconstruct a coding block based on a signaled residual block, the residual predictor for the current PU, and the predictive block for the current PU.

41. The video coding device of claim 27, wherein the video coder is further configured to:
   determine a final residual block for the current CU, wherein the final residual block comprises samples that indicate differences between samples in a coding block for the current CU, samples in the prediction block for the current PU, and samples in the residual predictor for the current PU; and
   transform samples in the final residual block to produce transform coefficients.

42. The video coding device of claim 27, wherein the video coder is configured to:
   scale the motion vector of the current PU to the fixed reference picture; and
   use the scaled motion vector of the current PU to determine the predictive block.

43. A video coding device comprising:
   means for scaling a motion vector of a current prediction unit (PU) of a current coding unit (CU) of a current picture in order to compensate for a difference between a Picture Order Count (POC) distance between the current picture and a temporal reference picture and a POC distance between the current picture and a fixed reference picture in a reference view,
      wherein the current picture is in a current view and is in a current access unit, a disparity reference picture is in the reference view and is in the current access unit, the temporal reference picture is in the current view but is not in the current access unit, and a reference index of the current PU indicates a position of the temporal reference picture within a reference picture list of the current picture;
   means for determining a predictive block for the current PU;
   means for determining a disparity reference block based on samples of the disparity reference picture that are associated with a location indicated by a disparity vector of the current PU;
   means for determining, based on samples of the fixed reference picture, a temporal-disparity reference block for the current PU, a top-left position of the temporal-disparity reference block being associated with a location indicated by a sum of a top-left position of the current PU, the scaled motion vector, and the disparity vector of the current PU; and
   means for determining a residual predictor for the current PU, wherein each sample of the residual predictor for the current PU indicates a difference between a sample of the temporal-disparity reference block for the current PU and a corresponding sample of the disparity reference block.

44. A non-transitory computer-readable storage medium having instructions stored thereon that, when executed, configure a video coding device to:
   scale a motion vector of a current prediction unit (PU) of a current coding unit (CU) of a current picture in order to compensate for a difference between a Picture Order Count (POC) distance between the current picture and a temporal reference picture and a POC distance between the current picture and a fixed reference picture in a reference view,
      wherein the current picture is in a current view and is in a current access unit, a disparity reference picture is in the reference view and is in the current access unit, the temporal reference picture is in the current view but is not in the current access unit, and a reference index of the current PU indicates a position of the temporal reference picture within a reference picture list of the current picture;
   determine a predictive block for the current PU;
   determine a disparity reference block based on samples of the disparity reference picture that are associated with a location indicated by a disparity vector of the current PU;
   determine, based on samples of the fixed reference picture, a temporal-disparity reference block for the current PU, a top-left position of the temporal-disparity reference block being associated with a location indicated by a sum of a top-left position of the current PU, the scaled motion vector, and the disparity vector of the current PU; and
   determine a residual predictor for the current PU, wherein each sample of the residual predictor for the current PU indicates a difference between a sample of the temporal-disparity reference block for the current PU and a corresponding sample of the disparity reference block.

* * * * *